Oct. 27, 1942.　　　L. L. RUSTAD　　　2,300,236
SYSTEM AND CORRELATED APPLIANCES FOR PRODUCING
ILLUMINATED MOVING WORDS
Filed Dec. 4, 1939　　　29 Sheets-Sheet 1

Inventor:
Louis L. Rustad.

Inventor:
Louis L. Rustad.
By /s/ Whiteley
Attorney.

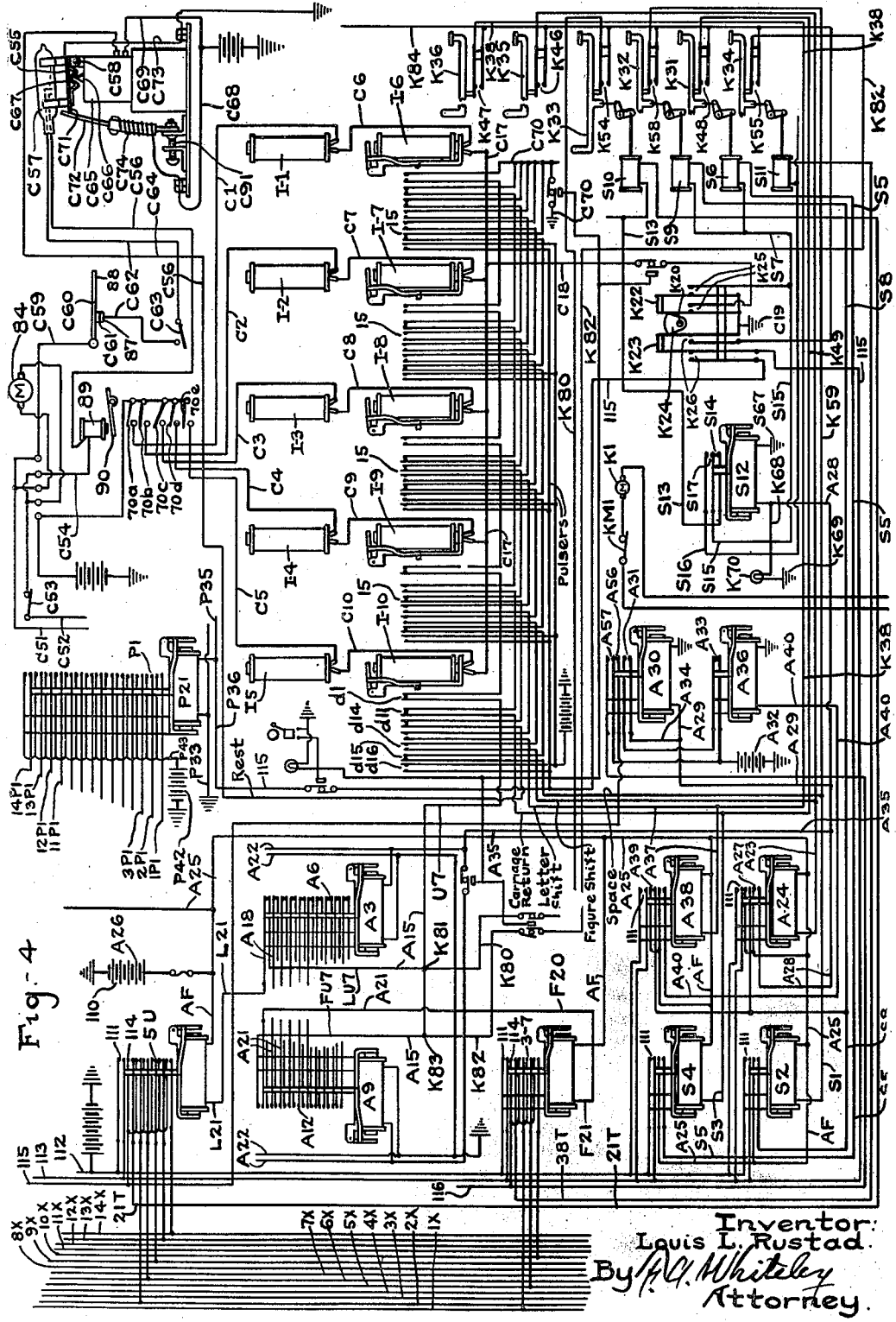

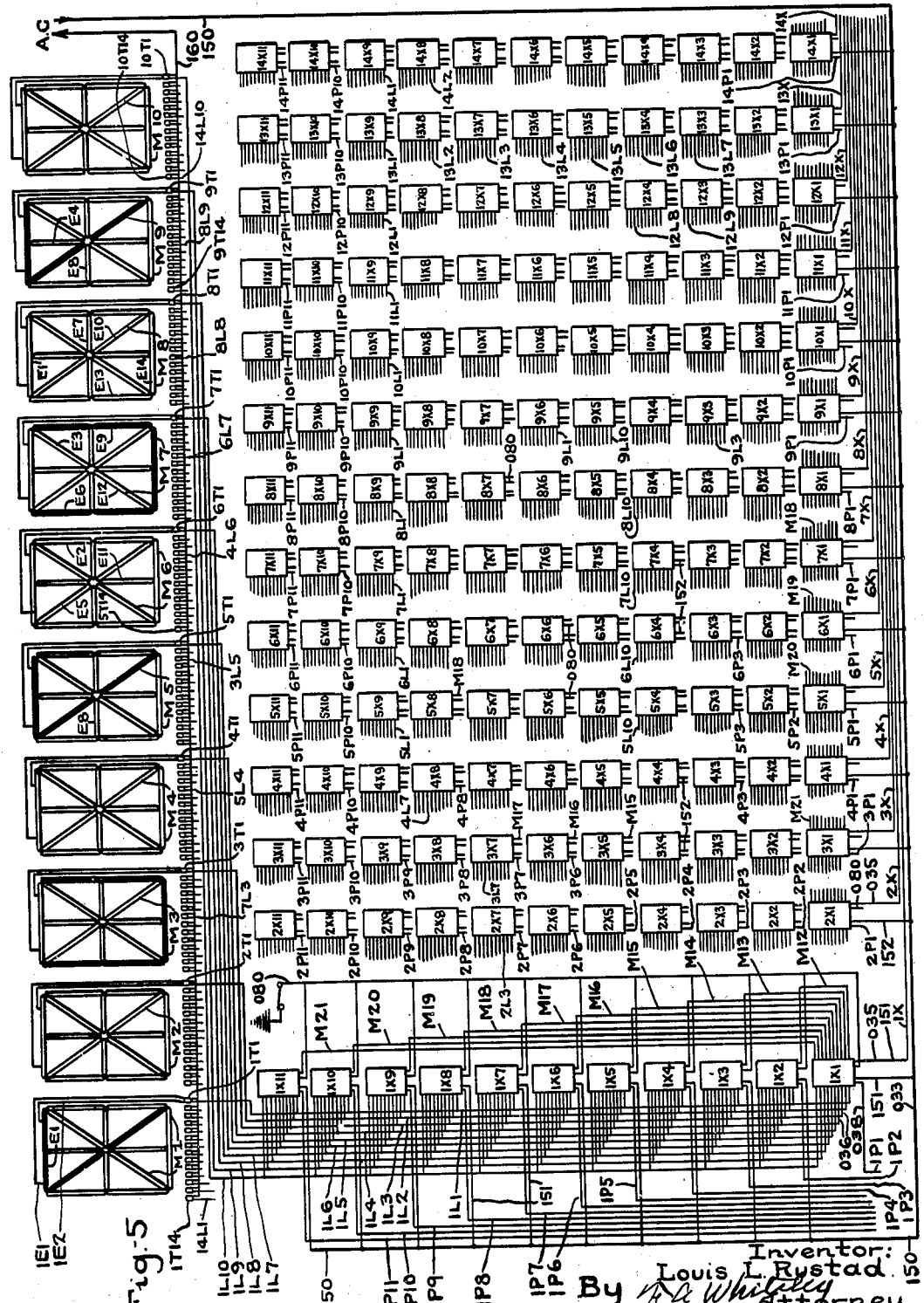

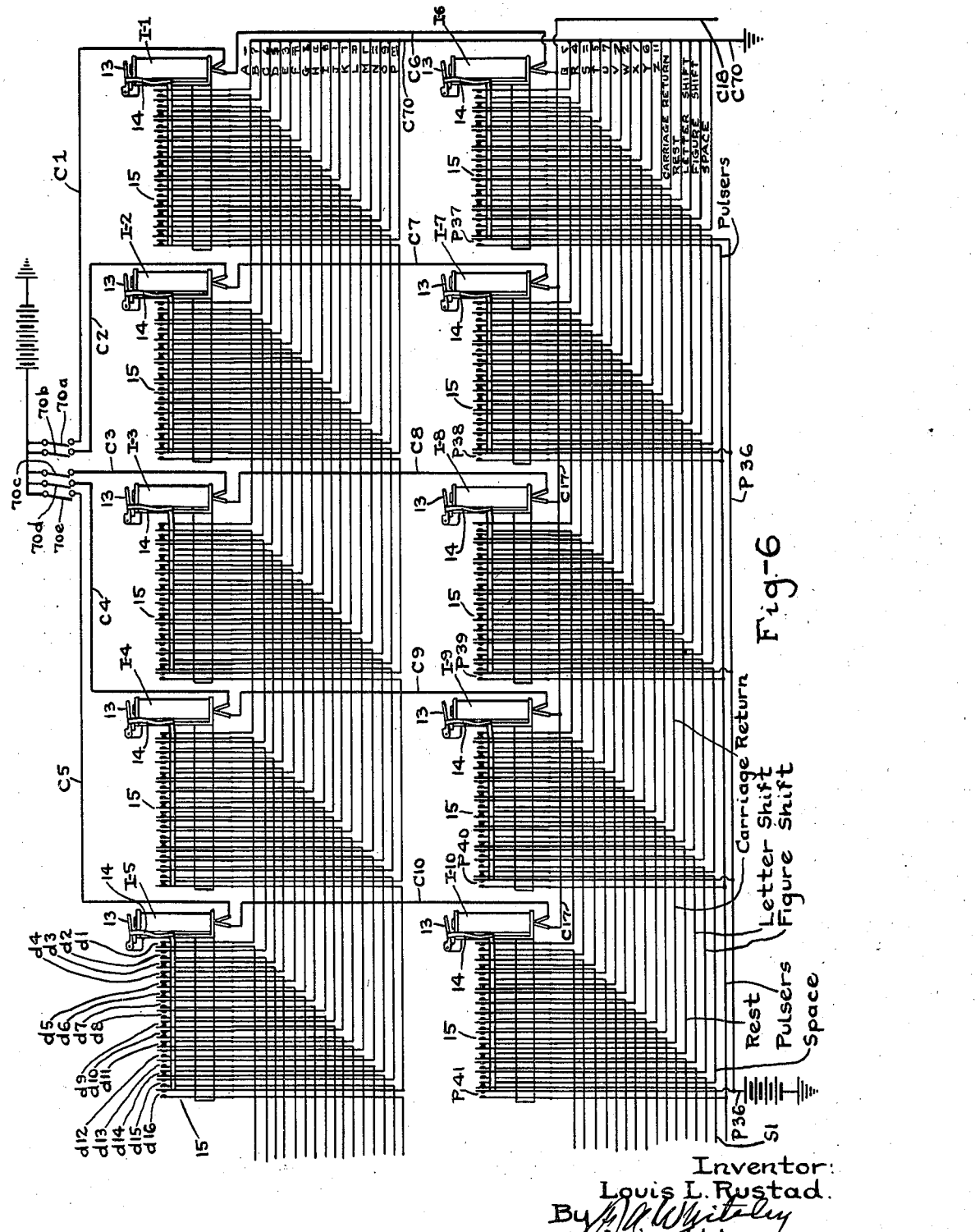

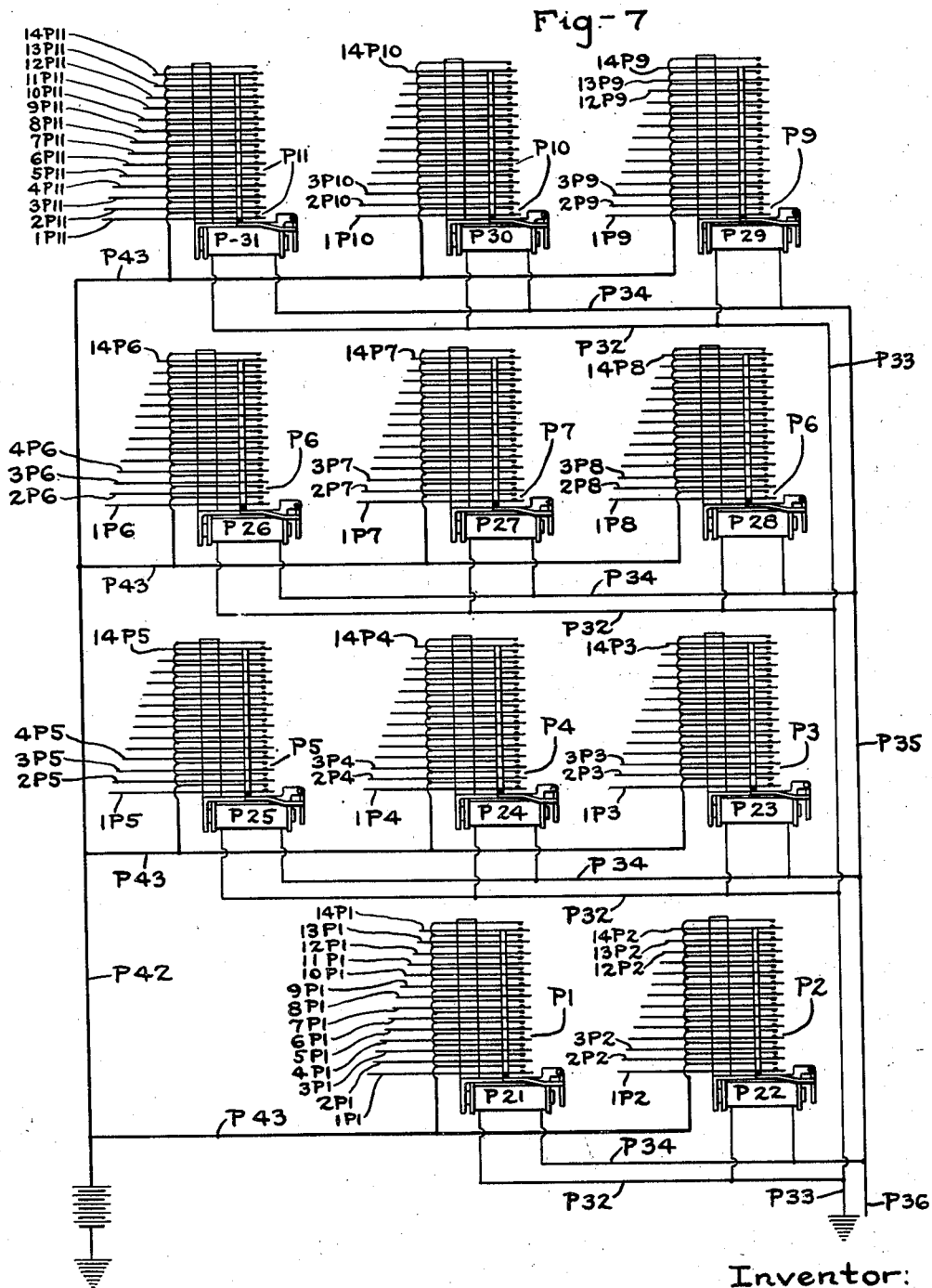

Oct. 27, 1942.  L. L. RUSTAD  2,300,236
SYSTEM AND CORRELATED APPLIANCES FOR PRODUCING
ILLUMINATED MOVING WORDS
Filed Dec. 4, 1939  29 Sheets-Sheet 15
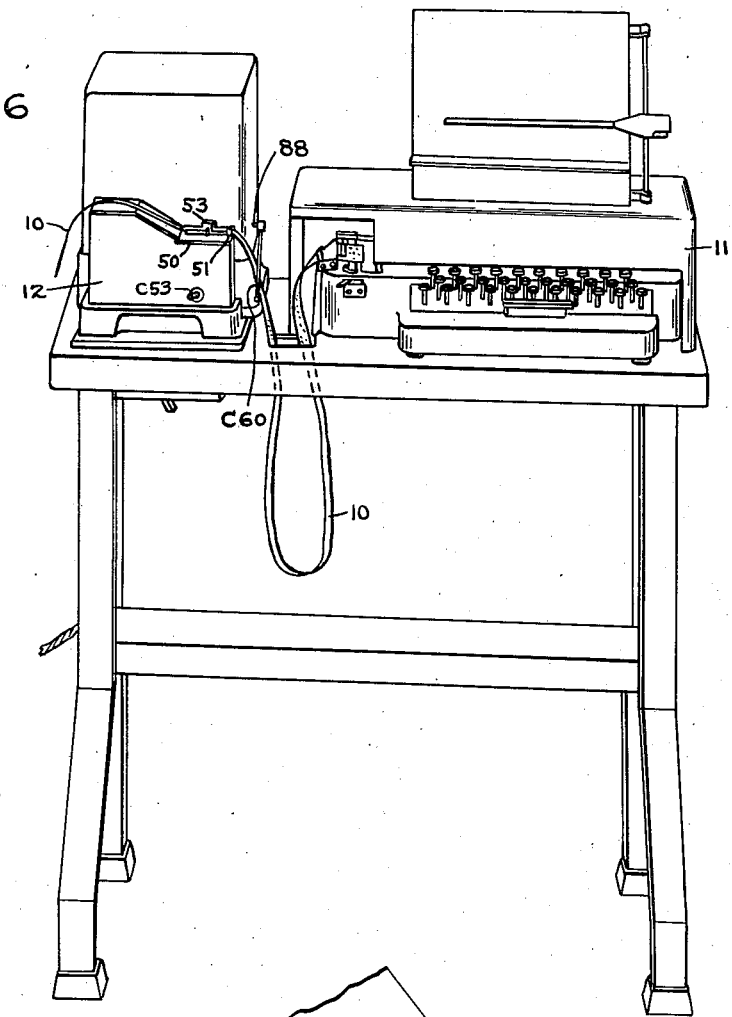
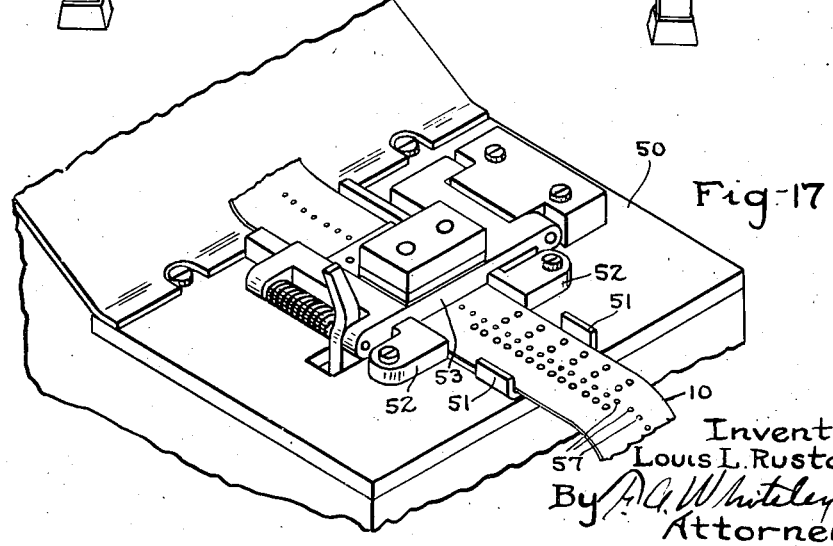

Inventor:
Louis L. Rustad.
By [signature]
Attorney.

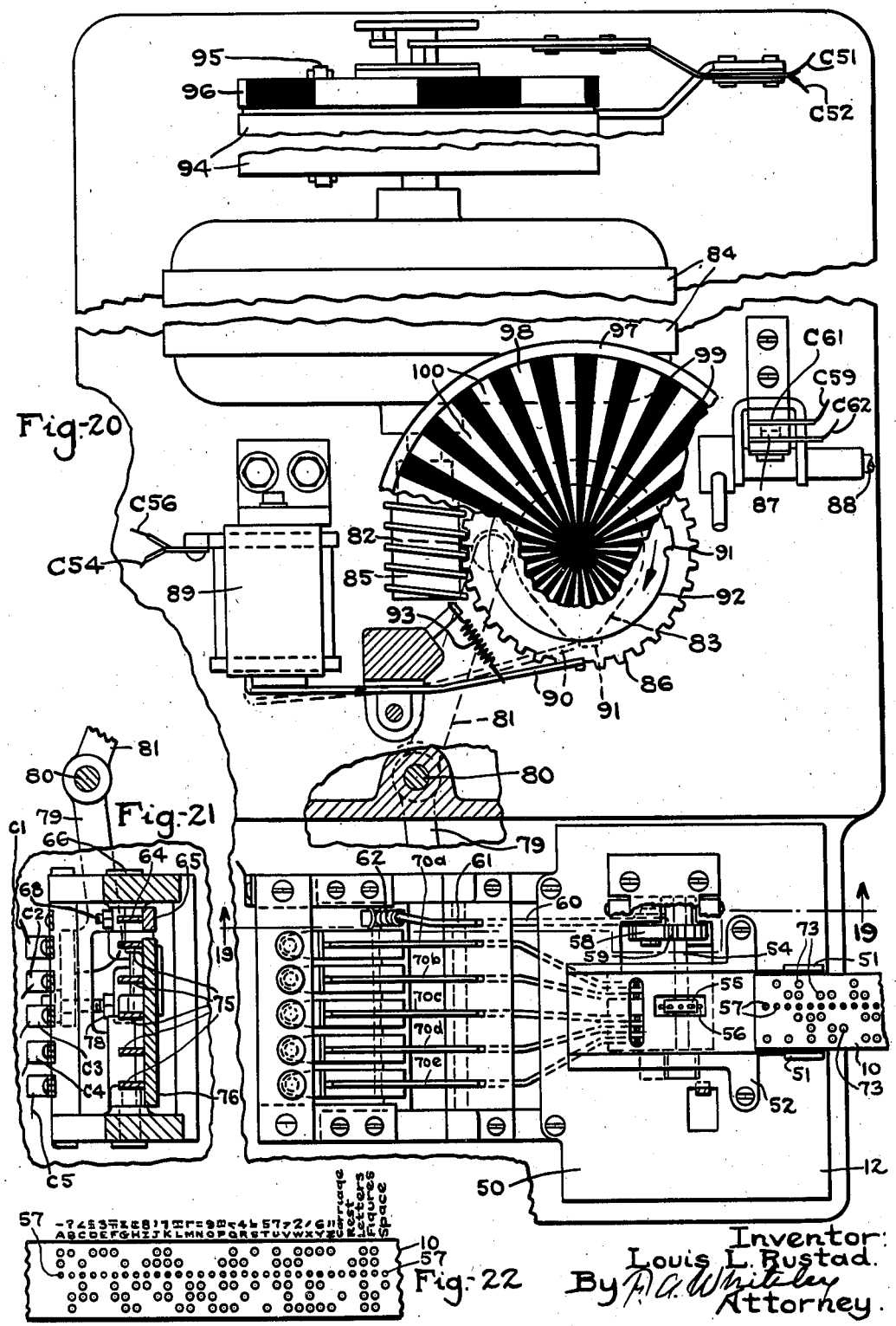

Oct. 27, 1942.  L. L. RUSTAD  2,300,236
SYSTEM AND CORRELATED APPLIANCES FOR PRODUCING
ILLUMINATED MOVING WORDS
Filed Dec. 4, 1939    29 Sheets-Sheet 18
Fig-23
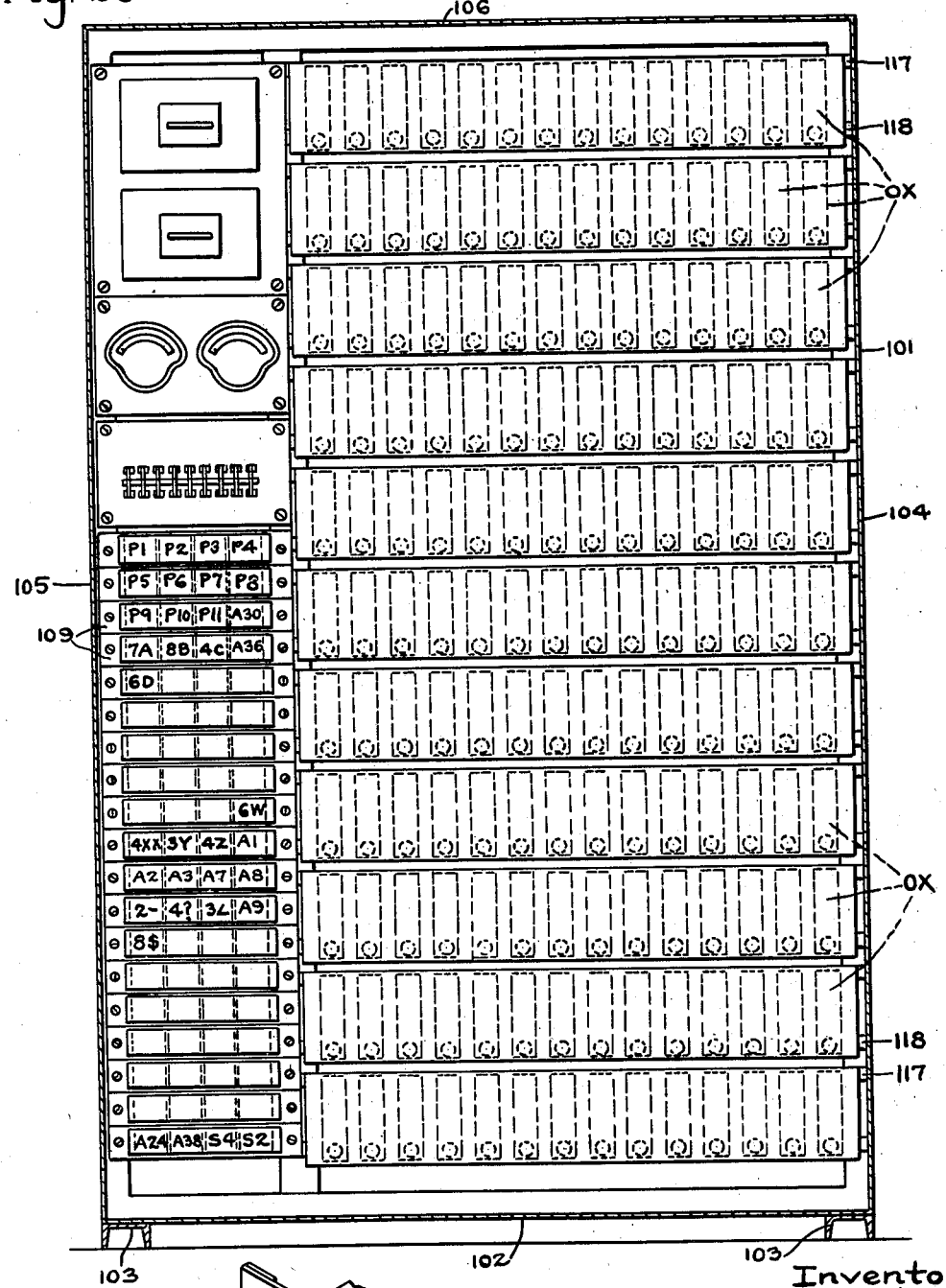
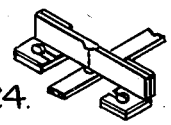
Fig-24.
Inventor:
Louis L. Rustad.
By (signature)
Attorney.

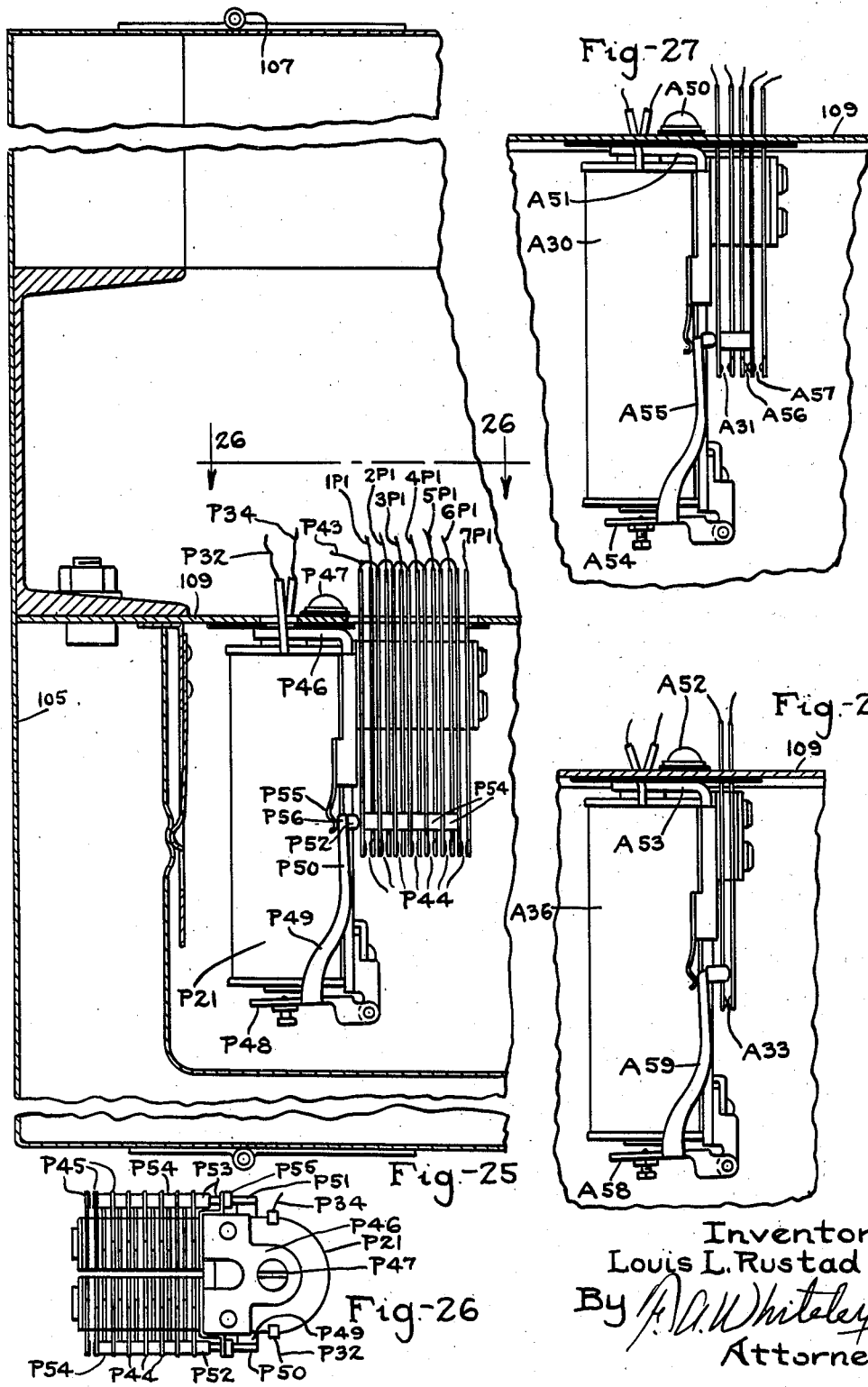

Inventor:
Louis L. Rustad.
By (signature)
Attorney.

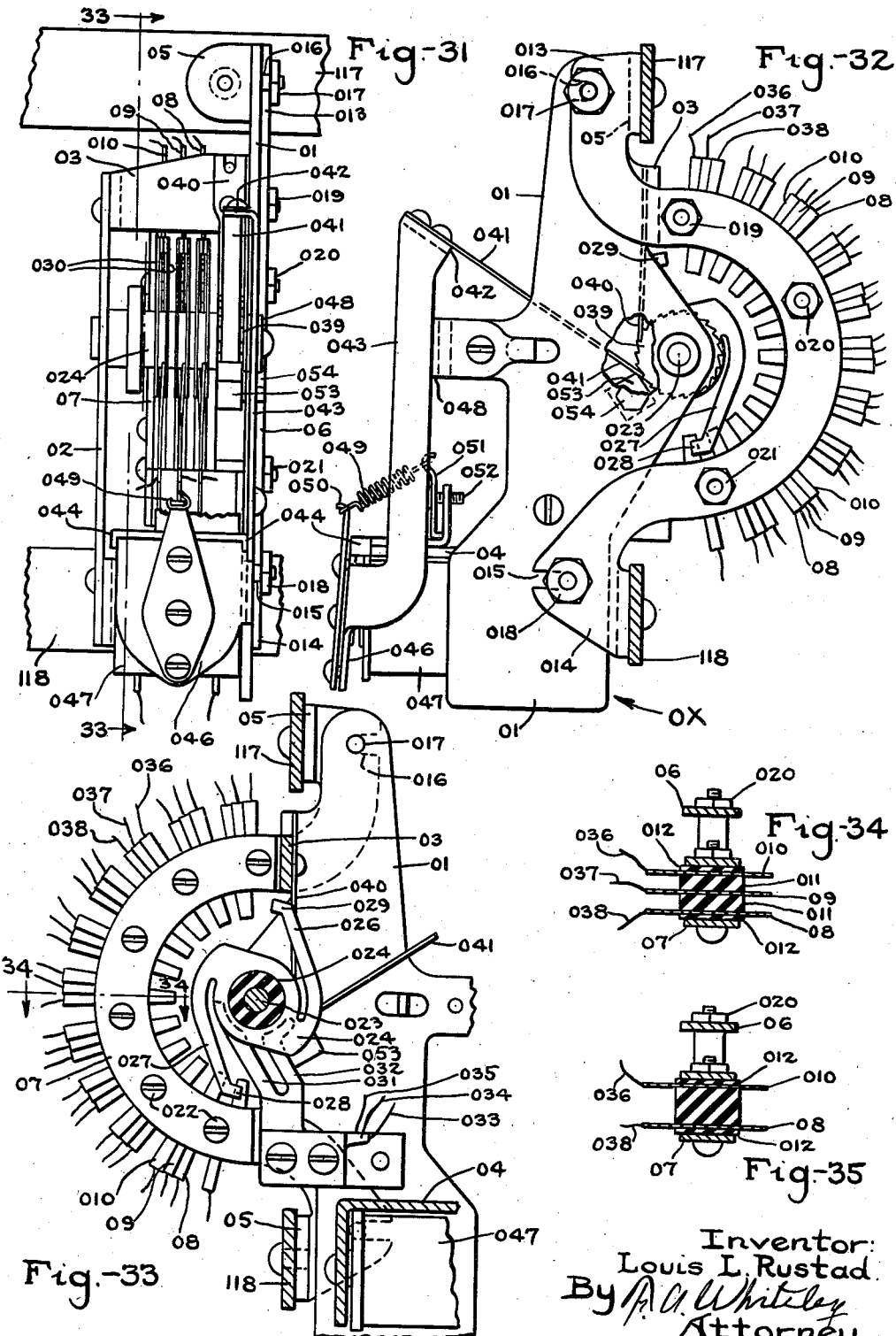

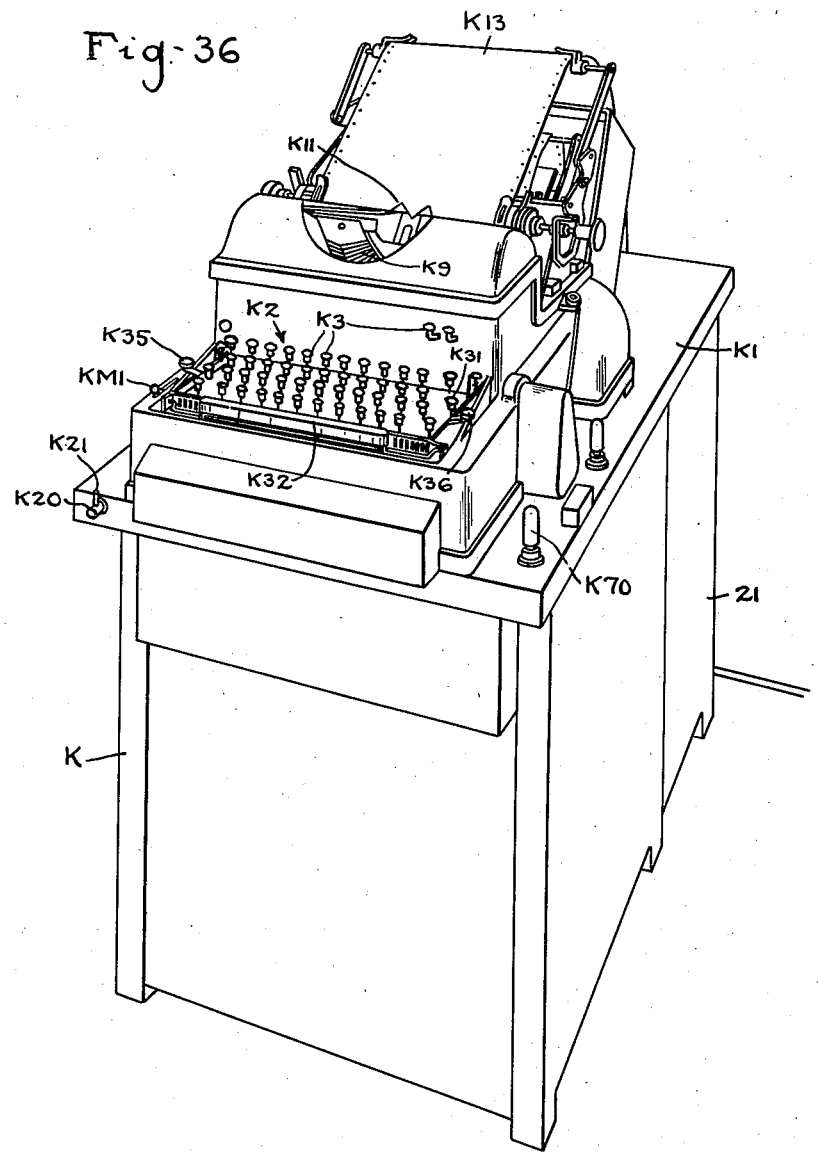

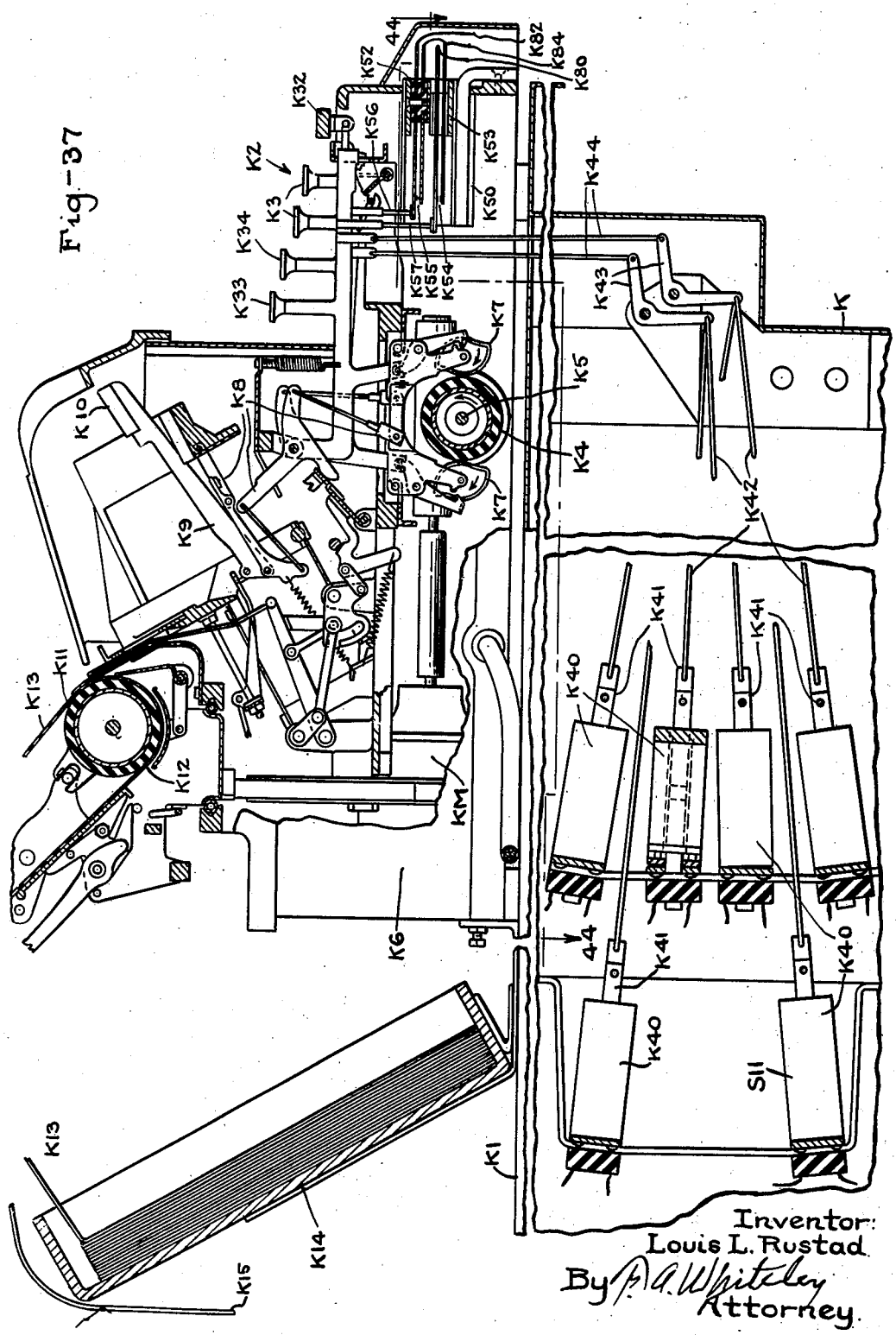

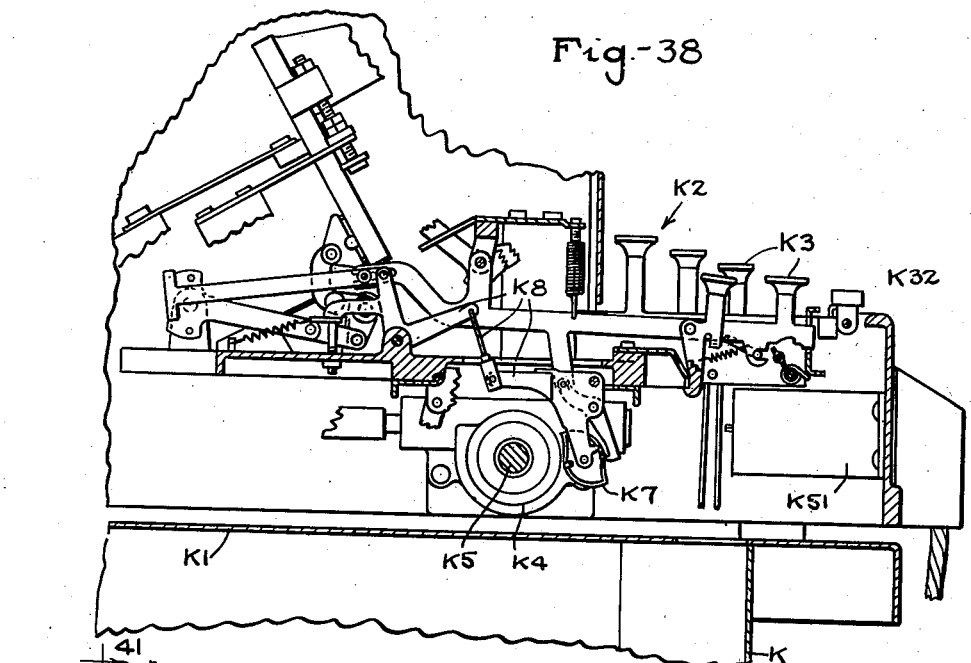
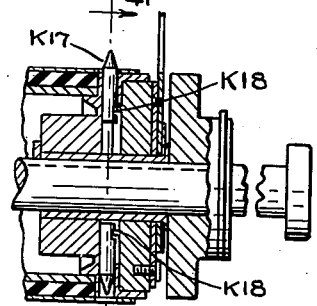
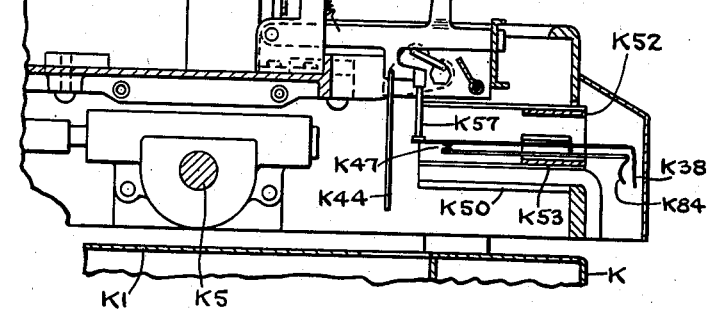
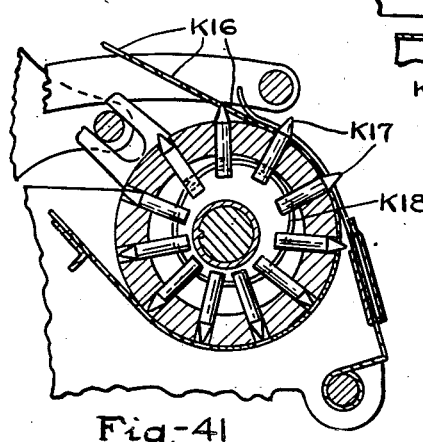
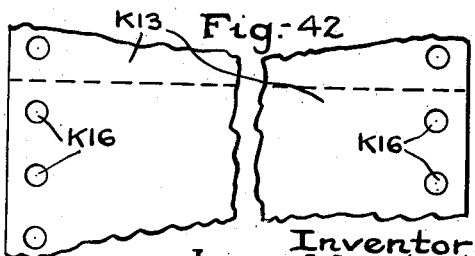

Inventor:
Louis L. Rustad.
By A. A. Whiteley
Attorney.

Oct. 27, 1942.　　　　L. L. RUSTAD　　　　2,300,236
SYSTEM AND CORRELATED APPLIANCES FOR PRODUCING
ILLUMINATED MOVING WORDS
Filed Dec. 4, 1939　　　29 Sheets-Sheet 27
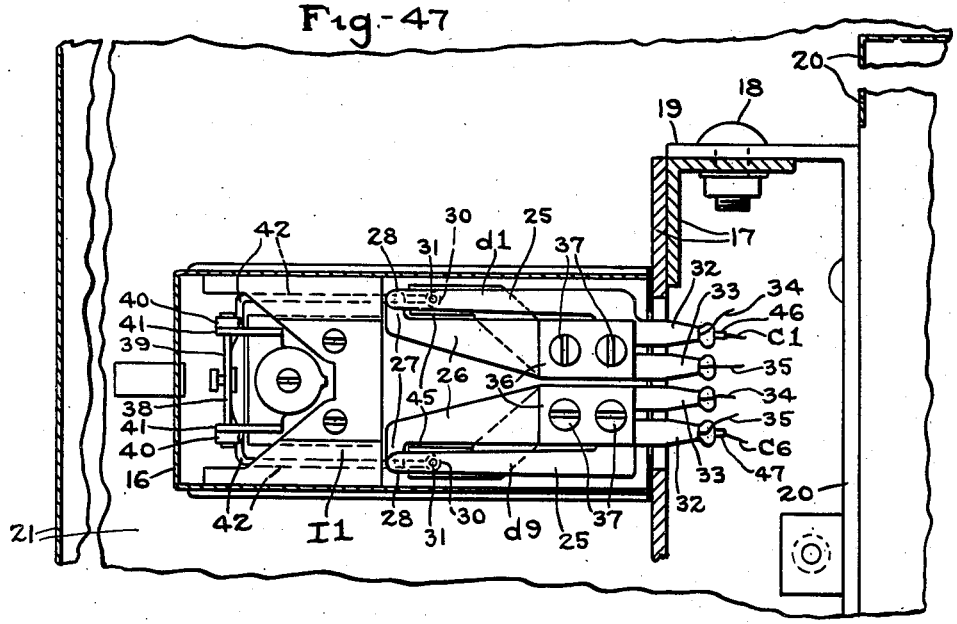
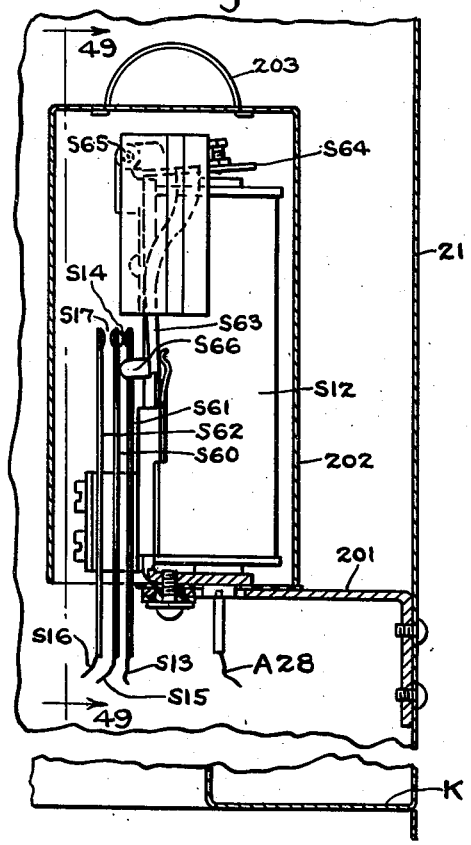
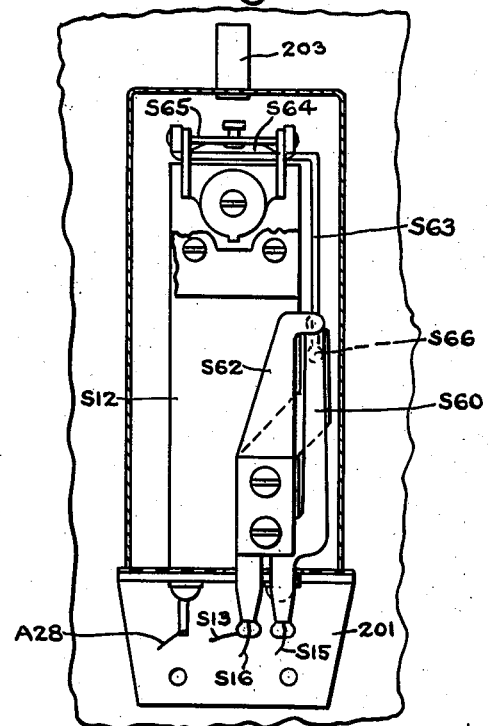
Inventor
Louis L. Rustad.
By P. A. Whitley
Attorney.

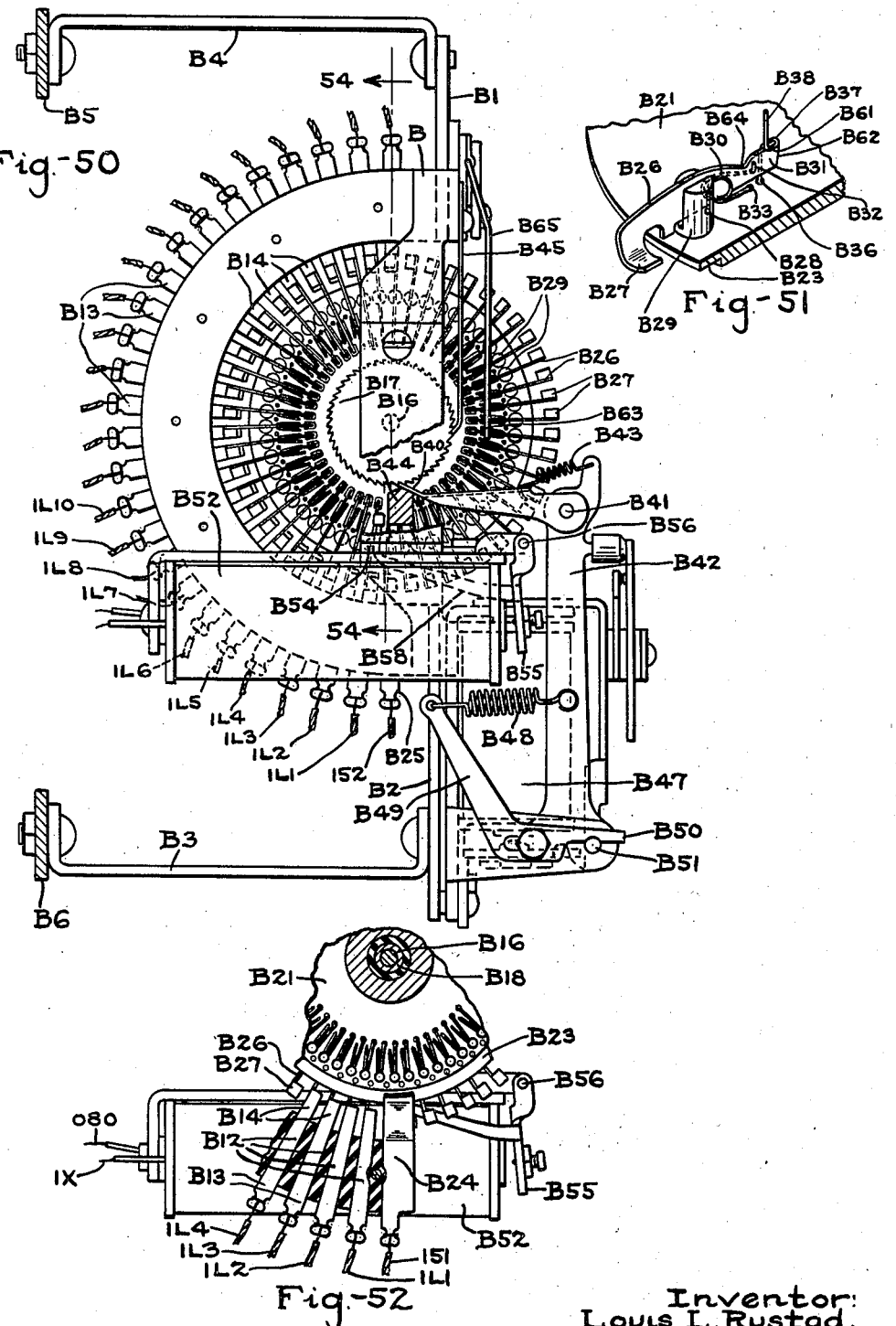

Oct. 27, 1942.　　　L. L. RUSTAD　　　2,300,236
SYSTEM AND CORRELATED APPLIANCES FOR PRODUCING
ILLUMINATED MOVING WORDS
Filed Dec. 4, 1939　　　29 Sheets-Sheet 29

Inventor:
Louis L. Rustad.
By M. A. Whiteley
Attorney.

Patented Oct. 27, 1942

2,300,236

UNITED STATES PATENT OFFICE 2,300,236

SYSTEM AND CORRELATED APPLIANCES FOR PRODUCING ILLUMINATED MOVING WORDS

Louis L. Rustad, Minneapolis, Minn., assignor to Telesignwriter Company of America, Incorporated, Minneapolis, Minn., a corporation Application December 4, 1939, Serial No. 307,496

11 Claims. (Cl. 177—346)

My invention comprises a system and correlated appliances for producing illuminated moving words. Broadly stated it is the purpose of my invention to cause elements forming words and the like to appear on a display member and move progressively from right to left along said member to display traveling reading matter. This moving display is in effect a moving sign, or what might be called traveling sign-writing, and may be employed for advertising purposes, for disseminating news broadcasts of various types and for all purposes effectively served by such moving sign-writing.

Carrying out the above purpose it is an object of my invention to provide a series of monogram devices comprising as an entirety what may be called a sign-writing display member. Each of said monograms will consist of a multiplicity of elements, preferably separate neon lighting tubes, each of said elements being severally connected in its own independent electric circuit, and the elements being so related that groups of said elements can be severally lighted to produce all of the letters of the alphabet and all ordinal numerals and all requisite punctuation or other marks commonly used in the written language. The several independent circuits of each monogram are each adapted to be severally closed to carry suitable currents of electricity through the circuit to effect lighting of the element or part on the monogram in said circuit. Each of said monograms preferably is identical in character and has the same independent lighting elements and independent lighting circuits and is capable of producing through the lighting of groups of said elements the same identical characters.

Another object of my invention is to provide automatic signal set-up means, which may be a tape punched with transverse rows of holes and which may be called a "code tape"; and to provide means for feeding the tape a step at a time to cause electrical contact members to pass through holes to close selector circuits going to a selector mechanism which I have called the interpreter. The interpreter comprises relays energized by the circuits closed and in effect interprets the signals set up from the code tape by operating through other instrumentalities to effect closing of the lighting circuits going to the selected elements of the monograms to light selected groups of said elements and display on the monograms the illuminated characters which have been selected. The punching of the code tape may be effected manually for setting up letters or characters in the code of the tape, or may be punched through the intervention of a telegraph, or in certain contemplated developments of the invention, may be punched through operation of radio waves.

It is a highly important object of my invention to cause the closing of lighting circuit switches to be effected by electrical pulsing operations, in which the initial pulse is caused by one means, which I have called initial pulser group contact relays, and thereafter successive closings of sets of switches to carry the display character from monogram to monogram across the length of the display sign are effected by means of continuous pulser relays.

It is a further important object of my invention to provide an initial pulser group contact relay for each combination of monogram elements to be lighted to produce each character to be employed, and to provide means whereby the interpreter selects and energizes the particular initial pulser group contact relay set up from the contacts made by the code tape and at the same time acts on the continuous pulser whereby each character set up, that is the group of elements of the monogram comprising it, will have its lighting circuits initially closed in the first monogram and thereafter the continuous pulser above referred to will successively close the same group of circuits for each of the monograms making up the sign, causing the character to be initially illuminated on the first monogram and to be successively illuminated on each of the successive monograms of the entire display sign.

It is a further object of my invention to provide in the interpreter, groups of relays such that closing of groups of circuits corresponding to characters set up on the code will provide a contact set-up to energize the initial-pulser group-contact relays for the particular characters set up. And in order to simplify and avoid too great complication, it is a further object of my invention to employ alternate relays in connection with the interpreter relays, one set of said alternate relays selecting and energizing initial-pulser group-contact relays, say, for letters of the alphabet, and the other set of alternate relays, being the same for figures, punctuation marks and the like.

It is a further highly important object of my invention to provide a group of what I have called "combination holding and orientating cycle switches" for each separate element and its lighting circuit of any one monogram, and to provide a group of said switches for each of said elements corresponding in number to the number of monograms employed plus one. There thus will be in said group, one of said cycle switches for closing a lighting circuit to the particular element of the monogram for each of the several monograms making up the entire line. By this means when an element (actually a group of elements in making up a letter or character) has been selected by the interpreter and put into initial display on the first of the monograms by its initial-pulser group-contact relay, the element or group of elements will have its or their lighting circuits successively closed for each of the monograms making up the entire line, and the element or the group of elements displaying the letter or character on the monograms will successively be lighted up on each of the monograms making up the sign, and hence will appear to travel along the sign, the direction of travel being from the right to the left, in the manner in which words pass the eye of a reader in ordinary scanning of a line of reading matter.

It is a further object of my invention to provide, in conjunction with the first "holding and orientating cycle switch" of any series, a master switch which is moved simultaneously with the orientating cycle switch. This master switch is adapted, in any of its successive positions as it is pulsed through from the first active position to the home or inactive position, to form a circuit with a cycle switch of the series corresponding in position to any position of the circuit closing element of the master switch, such that an initial pulse from an initial-pulser group-contact relay will be carried through or orientated to the said orientating switch in circuit with the master switch and will move it from its inactive to active position, from which it will be carried completely through by the continuous pulser relay. In this way successive elements selected by the interpreter relay will always find a combination holding and orientating cycle switch available for receiving an initial pulse from the initial-pulser group-contact relay to successively close lighting circuits for that element (or group of elements). The result will be to display the selected character on the first of the monograms from the initial pulse and then successively to display it through all of the monograms on the sign from the pulses of the continuous pulser, even though the same element, or group of elements forming a character has been previously selected, or selected several times, and is or are then being displayed on other than the first monograms.

It is a further object of my invention to provide continuous pulser mechanism to operate the relays of the "combination holding and orientating cycle switches" after such orientating cycle switches have been put in active position by the initial pulse caused by the interpreter to be made by the initial pulser group-contact relay. This continuous pulser is rendered operative by or from the interpreter in connection with each selection indicated and set up from the code tape. That is, each time the code tape is stepped and there are holes punched to make contacts for selection of a character, the continuous pulser is caused to make one pulse. Each said pulse renders the corresponding relays of selected orientating cycle switches active so each pulse actuates those switches and moves them from position to position and effects closing of lighting circuits from one monogram to another to the end of the sign.

It is a further object of my invention to provide a novel and distinctive mechanism for switching in the lighting circuits. I have designated these mechanisms as "combination holding and orientating cycle switches". These switches comprise a rotating member embodying wipers or contact arms and a group of contacts corresponding in numbers to the number of monograms employed in the sign, the wipers being connected with a relay adapted by a single electric pulse to move the rotary member one step. The wipers are so held relative to the aforesaid contacts that in one position, which I have designated the "home position," there will be no continuous pulser contact and the assemblage will be inoperative. The initial pulse to cause an initial contact is effected by selection of the character in the interpreter and the resulting operation of its corresponding initial-pulser group-contact relay, which takes the contact arm from the "home" position to the first of the continuous pulser contacts.

Thereafter the orientating cycle switch continues to be operated by reason of energizing of its relay by the continuous pulser until the contacts are again brought into the home position, after which the orientating cycle switch remains inactive until again selected by the interpreter and given an initial pulse by the initial-pulser group-contact relay.

The above stated objects of my invention relate to operation of the system through a code tape which is fed through a mechanism which I have called the "code interpreter feed," and which makes contacts according to the number and relation of holes in each transverse row of the tape. My system also is adapted to work efficiently in connection with an electric typewriter. This operation functions in two ways—

First, when the code tape is being fed to cause display of moving characters upon the monograms of the sign, means are provided to cause the interpreter automatically to operate the typewriter so that as each character is selected by the interpreter to be displayed on the sign the typewriter writes the character upon a suitable roll of paper, with the result that the words and figures being displayed are recorded by the typewriter, and a permanent record of everything that appears on the sign is made.

Second, the typewriter is so set in the circuits going to the initial-pulser group-contact relays that an operator may type out the letters forming words and characters which will comprise the traveling-writing display on the sign, and in so typing these letters and characters the initial-pulser group-contact relays are energized so that simultaneously the operator makes a typewritten record of matter going over the sign and causes the system and appliances to display that matter on the sign.

It is therefore a primary and highly important object of my invention to combine with an electric typewriter the system and apparatus for displaying letters and characters on the monograms of the sign so that when the sign is being automatically operated from a code tape or by other automatic means, a permanent record of what is displayed on the sign is made by the electric typewriter. Further, that manual operation of the electric typewriter will at the same time make a typewritten record of what is to be sent over the sign and will cause actuation of the various co-related instrumentalities to effect display of said letters and characters upon the monograms of the sign as the said letters and characters are typed.

It is a further object of my invention to provide in an electrical typewriter of usual construction means associated with the keys and typing mechanism of the typewriter, for closing circuits to the initial-pulser group-contact relays corresponding to the type or character of the respective keys, and in this manner the mere act of typing matter to make a printed record thereof will cause operation of the instrumentalities of the system simultaneously to reproduce on the monograms the characters printed on the permanent record as manually typed.

It is a further object of my invention to provide, in association with the typing means of an electric typewriter of usual construction, relays which are in circuit in parallel with the circuits selected and closed to any initial pulser group-contact relay representing a character or letter, so that actuation of said "initial-pulser group-contact" relay will be accompanied by simultaneous actuation of the aforesaid typewriter relay to effect automatic typing on a permanent record of the characters selected in the interpreter by operation of the interpreter feed of the code tape.

*General statement of mode of operation*

The above objects heretofore stated somewhat in detail are attained by instrumentalities associated and operating as follows:

In the example given herein, there are monograms embodying fourteen neon tube elements each of which constitutes a member having an independent lighting circuit and from which by lighting groups of said members or elements all letters and characters for the traveling signwriting can be made. And in the example shown ten monograms are employed, so that at all times ten characters, or characters and spaces between sets of characters, may be displayed simultaneously, and since the same characters are caused to travel progressively from monogram to monogram from right to left aross the sign, the effect upon the eye is that of characters, and the words and symbols which they make up, moving or traveling from right to left across the sign, and it is these traveling letters, words and symbols which produce the illuminated signwriting which is the ultimate object of my invention. And while I have shown monograms with fourteen independent members or elements and the use of ten of these monograms, it will be apparent that I am not limiting myself to monograms with any specified numbers of elements or parts, or to the use of any specified numbers of such monograms, as it is obvious that a greater or less number in each case may be employed within the scope of my invention, as circumstances may require.

With the set-up as above outlined, it will be clear that since each monogram has fourteen independent members or elements to be lighted there must be fourteen independent lighting circuits, and that since there are ten of these monograms shown there must be fourteen independent lighting circuits for each of ten monograms, and the means for lighting groups of elements or members in the ten monograms must include means for simultaneously closing groups of lighting circuits in any number or all of the monograms simultaneously and for progressively and continuously closing lighting circuits for new groups or elements in each of the ten lighting circuits.

By reference to the diagrammatic set-up of Figure 1 the various steps of the system and the relation of its parts may readily be traced and followed.

Starting with automatic operation, a punched code tape is given a step-by-step timed movement through what I have designated as the code interpreter feed. The tape is provided with a series of transverse rows of holes, in the example shown there being provision for five holes in each transverse row (not counting the central holes by which the tape is fed). The position of these holes is such that as the tape is fed contacts will be made closing electric circuits wherever there is a hole. With provision for five holes in each transverse row thirty-two different combinations of holes can be effected which may correspond to thirty-two different set-ups—letters, figures, punctuation marks and the like, and also spaces.

In what I have called the interpreter on the diagram, and which is in fact the system of character selectors for ultimate lighting on the sign, I employ a series of what may be called code interpreter relays. In the examples shown there are ten of these relays in double banks of five each wherein corresponding pairs are connected to operate simultaneously. I do not, however, limit myself to any specified number or arrangement of interpreter relays. As shown, the five double sets of relays correspond to the five circuits which may be closed by operation of the code tape through the interpreter feed. Without going into details it is sufficient here to state that the circuit closing combinations effected by the transverse punchings on the code tape actuate corresponding interpreter relays. The relays act to open or close groups of contacts with the result that a single circuit is closed permitting current to pass to the initial-pulser group-contact relay to effect correlated operation thereof as hereinafter described. That is, the closing of circuits by means of the punchings of the code tape will cause the interpreter to select and cause operation of the "initial-pulser group-contact" relay corresponding to the letter selected by the interpreter which the punching of the code tape has set up.

The corresponding members of the two banks of interpreter relays operate simultaneously, but the action of the relays of the upper bank works to close or open different contacts from those which are closed or opened by the lower relays of the lower bank, so a double number of combinations can be served with such simultaneous operation of the relays of the two banks. However, the greatest number of combinations of a 5-hole punched code tape is thirty-two, which is much less than the number of combinations required for signwriting when there is included in addition to letters the ordinal numerals and other characters such as punctuation marks. In order, therefore, to provide a sufficient number of combinations for selection of all letters and other characters I provide what I have denominated as alternate relays with code controlled automatic shift from one to the other. As clearly shown in the diagram, one set of alternate relays is for permitting transmission of impulses from the interpreter to the selected "initial-pulser group-contact" relays for letters and the other set of alternate relays for accomplishing the same result for "initial-pulser group-contact" relays for figures. When, therefore, as in Figure 1, the circuit through the alternate figure relays is open and the circuit through the alternate letter relays is closed, the selected impulses will pass directly through the alternate letter relays to the "initial-pulser group-contact" relays for letters. If, however, a character or figure is selected there will automatically be a shift whereby the alternate relays for letters will open their circuits and the alternate relays for figures will close their circuits and the impulse will pass directly through the alternate figure relays.

By these instrumentalities there is made available not thirty-two selections but sixty-four selections by which all desired selected letters and characters may be caused to be displayed.

The code interpreter feed and the interpreter may be regarded as selector controls. The code interpreter feed sets up the contact combinations for a character selection. The interpreter, operating through the alternate relays, may properly be designated as interpreting the code signals and selecting from that interpretation the "initial-pulser group-contact" relay which corresponds in its ultimate operation with the letter character so selected. These control instrumentalities, together with the typewriter arrangement, which will later be described, may, if desired, be positioned at points remote from the sign itself, as, for example, in offices of advertising agencies or in editorial rooms of newspapers. In this sense these instrumentalities may be referred to as remote controls.

These remote controls select the characters to be displayed and render operative the instrumentalities which effect their display. These instrumentalities comprise what I have called "initial-pulser group-contact relays," "continuous pulser relays" and "combination holding and orientating cycle switches." There is one "initial-pulser group-contact" relay for each letter or character, which closes the group of circuits for initially energizing the orientating cycle switches to produce the first or starting pulse by which the character is caused to be displayed on the first of the monograms. It will be understood that the initial pulse as designated here means a momentary closing of a circuit sufficient to cause one operation of an orientating cycle switch. Thereafter the continuous pulser will operate the orientating cycle switch or switches to display that character successively on each of the monograms making up the entire sign.

These operating instrumentalities, comprising the "initial-pulser group-contact" relays, the "continuous pulser relays" and the "combination holding and orientating cycle switches" are compactly housed in a cabinet which is specially constructed and designed for positioning the operating instrumentalities effectively for assembly, inspection and correction of troubles.

From the diagram it will be noted that the interpreter, through either one or the other of the alternate relays (for letters or figures), selects and energizes successive "initial-pulser group-contact relays." These relays have the effect of closing the circuits to the group of "combination holding and orientating cycle switches" which operate the several elements on the monogram to produce a letter, figure or other character. This energizing does not in and of itself close any of the lighting circuits, but pulses the "combination holding and orientating cycle switches" one step from what I have called the home position, that is a circuit-breaking position, to the first circuit "closing" position in the lighting circuit. From there on the "holding and orientating cycle switches" are pulsed step by step by the continuous pulser to successive positions for closing the same lighting circuits for each of the successive monograms, thereby causing the displayed character to travel from monogram to monogram from the right side to the left side of the entire sign.

But at any time, while a "combination holding and orientating cycle switch" is being pulsed by the "continuous pulser" an "initial-pulser group-contact relay" may be rendered operative to start display again of the same characters or of parts of that character. This is effectively accomplished by reason of the fact that when the primary "holding and orientating cycle switch" is operated it operates simultaneously a master switch which makes circuit connection successively with each of the series of "orientating cycle switches" for the several monograms, so that when an initial pulse takes place there will always be a circuit available but only one at a time for the selected element to be closed by an initial pulse and cause display of the selected element or group of elements forming a character on the first of the monograms, and which is thereafter caused to be displayed successively on the several monograms of the sign by the continuous pulser, all as will be pointed out more in detail hereinafter.

From the above it follows that using the code tape, however the same may be punched, there will be continuously and automatically displayed, initially on the first of the monograms and successively on each of the following monograms, the character (or space) which is set up, producing the desired illuminated signwriting, and that this may continue indefinitely with constant change of material or repetition of certain material as desired. Furthermore, through the instrumentalities which will be described in detail hereafter, the matter appearing on the sign will automatically be caused to be typed on a permanent continuous record sheet of the electric typewriter.

When, however, it is proposed to use the typewriter itself for causing operation of the sign, the actions of the operator in typing out the matter to be transcribed, as clearly shown in the diagram, will render operative and cause to operate all of the instrumentalities capable of automatic operation by the interpreter, including the alternate letter and figure relays and the means for shifting from one to the other, the letter and figure initial-pulser group-contact relays and the instrumentalities rendered operative thereby, to effect display upon the sign and the several monograms thereof of the identical characters and written matter typed by the operator on the keyboard.

In the drawings illustrating some of the more desirable forms of my invention:

Fig. 4 is a general schematic diagram illustrating in part the instrumentalities and relation of instrumentalities for producing the various operations of my invention in part limited to a single letter and a single figure.

Fig. 5 shows in diagram the complete assemblage of monograms from which the traveling characters are formed together with diagrammatic showings of all the combination holding and orientating cycle switches by means of which the illumination of characters on the monogram is successively produced.

Fig. 6 illustrates the group of code interpreter relays employed for the purpose of closing sets of contacts in response to operation of the code tape for effecting selections of switching elements to light any elements or groups of elements selected by the code in the order of such selection and also to cause operation of corresponding pulsers to be hereinafter described.

Fig. 7 illustrates the group of continuous pulser relays for effecting sets of contacts corresponding to those of the interpreter to pulse or actuate groups of orientating cycle switches for characters as previously selected by the interpreter.

Figure 11:
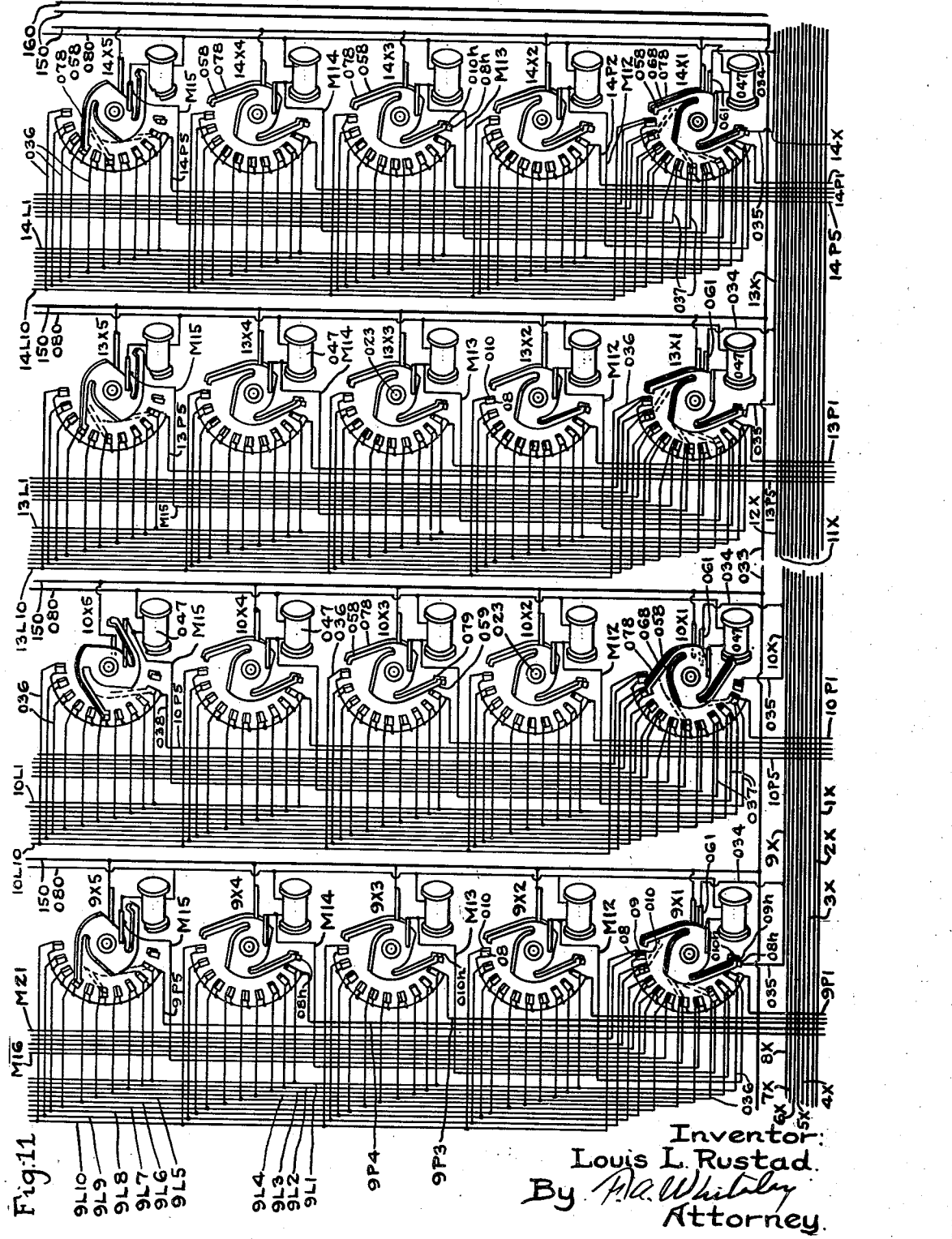
Figure 12:
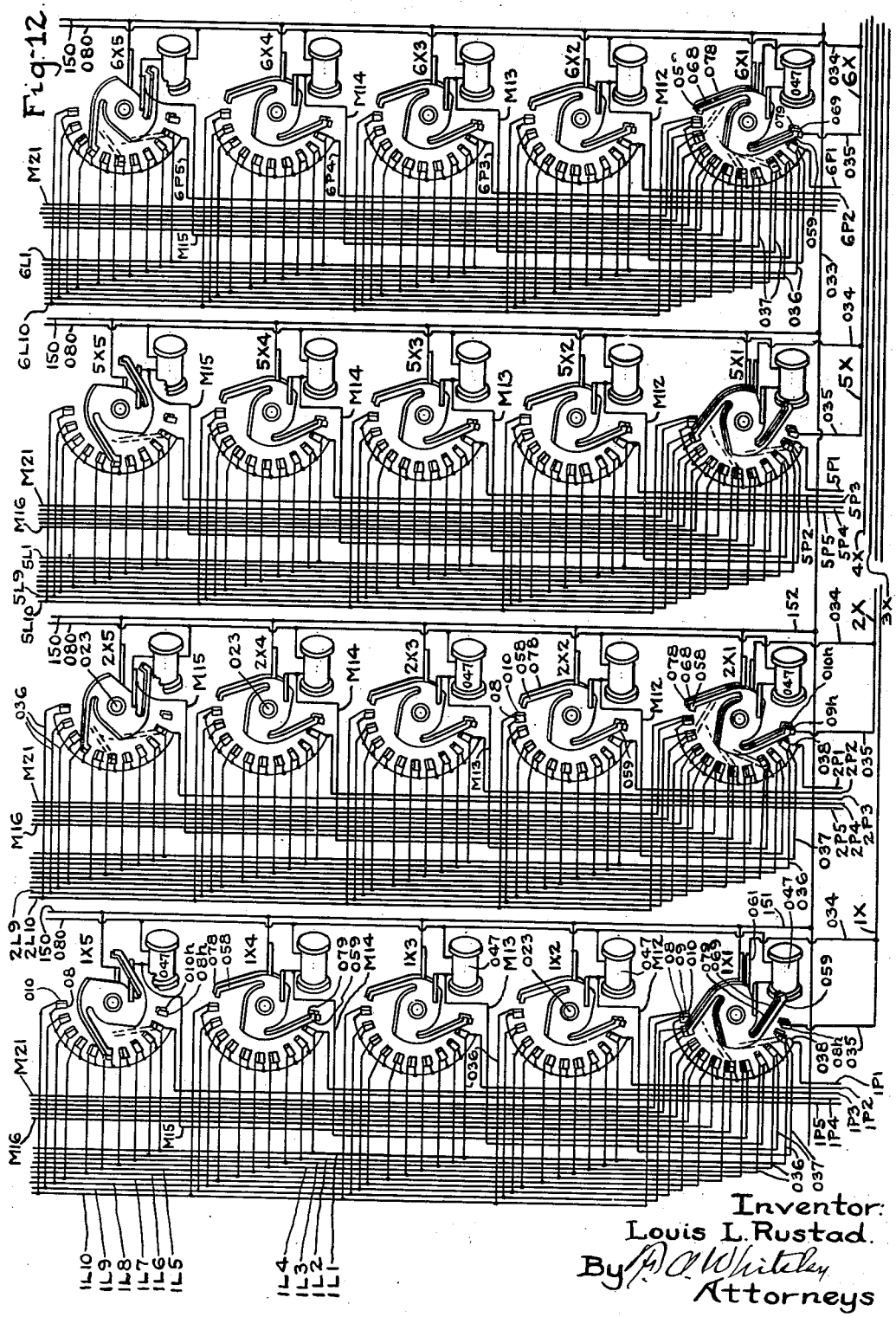
Figure 13:
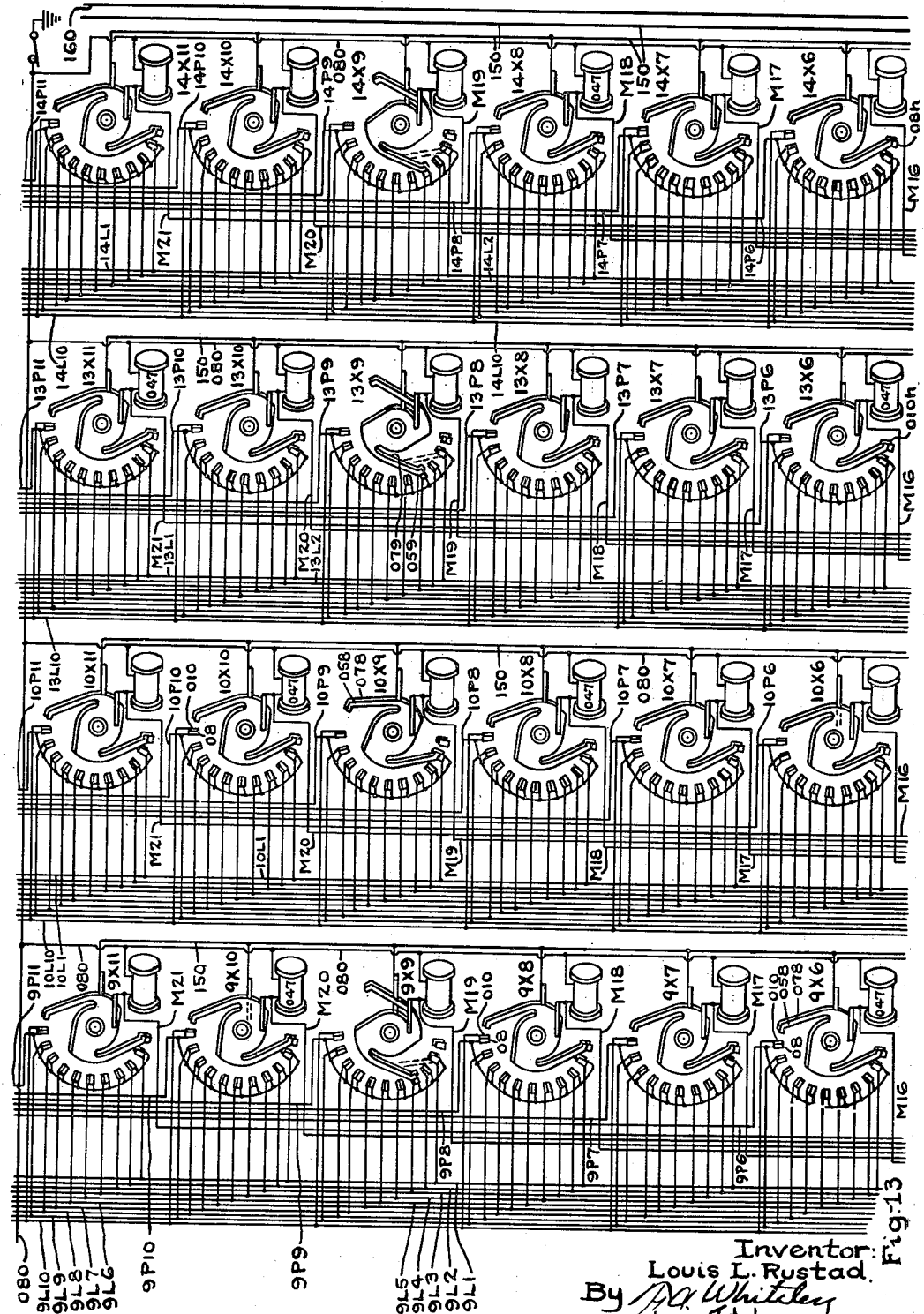

Figures 11, 12, 13 and 14 comprise four sheets of drawings to be considered as a unit when positioned to be viewed across their shorter dimension with the figure numbers adjacent one another, as written on the drawings. Figure 13 above Figure 11, Figure 14 above Figure 12 and Figures 11 and 13 at the right of Figures 12 and 14. These four figures comprise a showing of eight complete vertical series of combination holding and orientating cycle switches and connected wiring in positions to show respectively the selection for illumination of the characters "U," "space" and "7." The several positions of the parts and the closed circuits are as they would be with an initial selection of letter "U," successive selection of a "space" and a third selection of the character "7."

Figure 15:
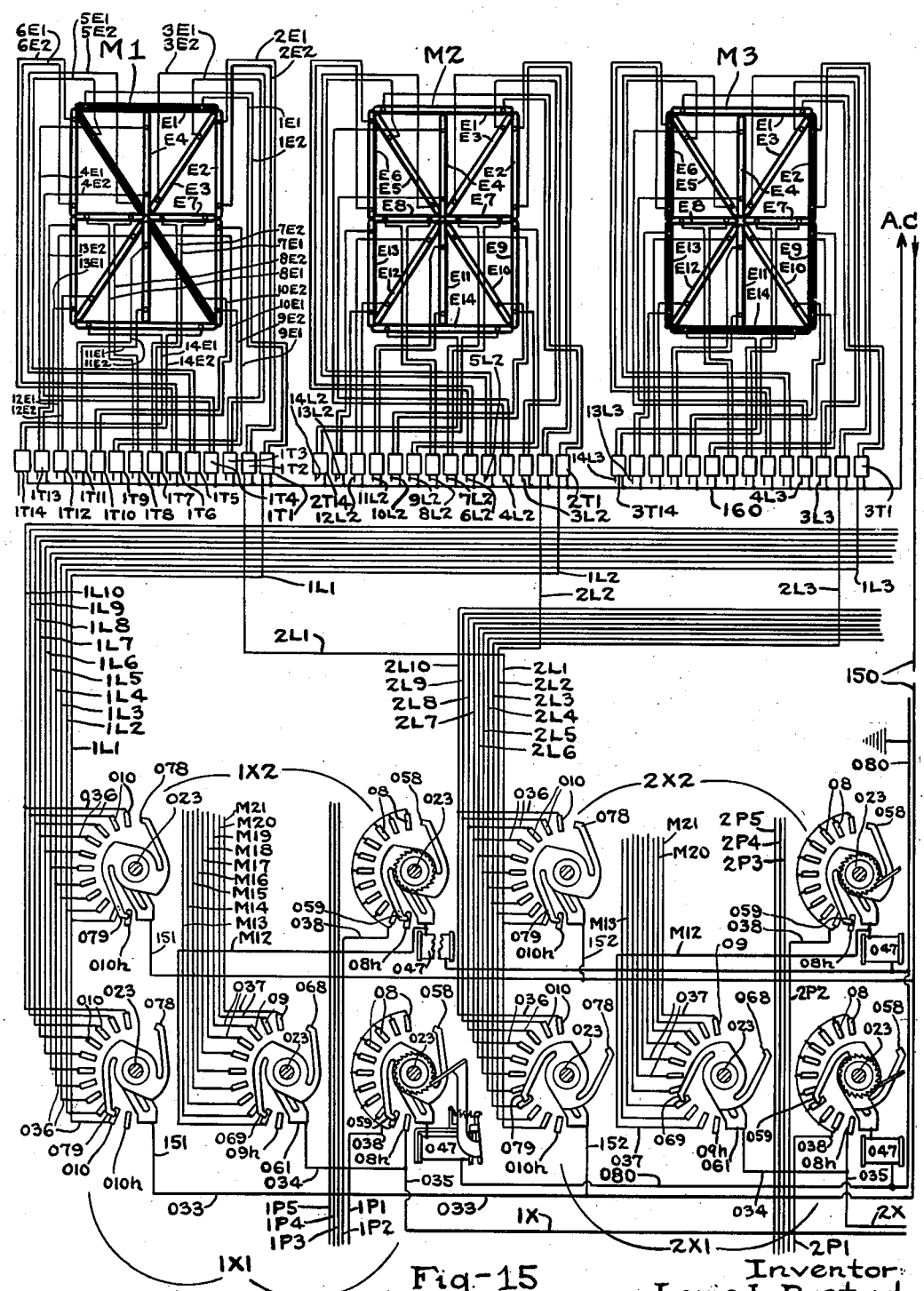

Fig. 15 illustrates in diagram the outline of the cycle switches if they were on separate shafts, and shows the manner of wiring the monograms and how the characters appear when illuminated thereon.

Fig. 16 is a general view of a code tape perforating and feeding mechanism.

Fig. 17 illustrates a portion of perforated tape as it passes through the feed.

Figure 18:
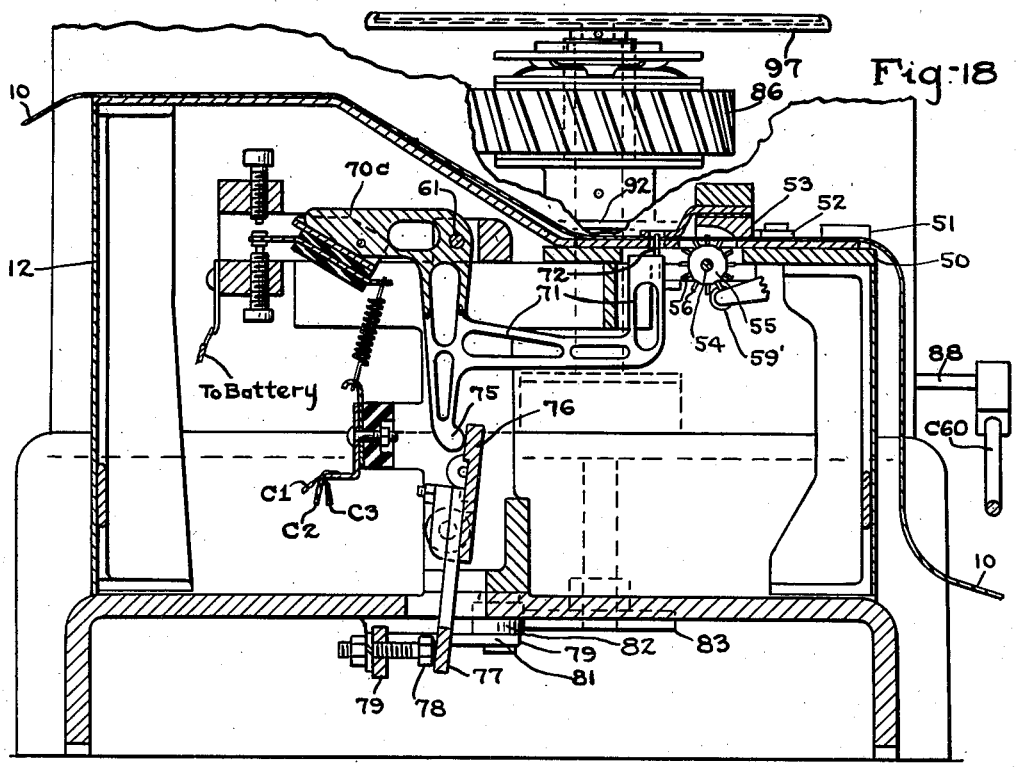

Fig. 18 is a sectional elevation view taken through the code interpreter feed.

Figure 19:
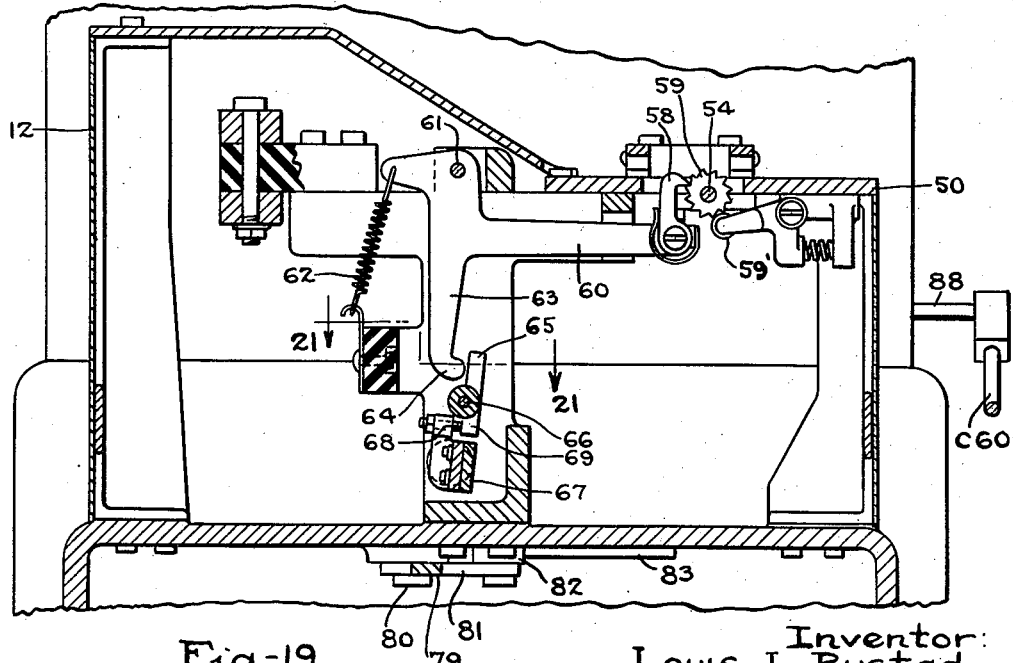

Fig. 19 is a sectional elevation view of the code interpreter feed as shown on line 19—19 of Fig. 20.

Fig. 20 is a part sectional plan view of the code interpreter feed.

Fig. 21 is a detail sectional plan view on line 21—21 of Fig. 19.

Fig. 22 is a plan view of the code tape showing thereon all possible combinations of positions for punchings of five transverse holes, with characters and operations assigned to the several code punchings.

Fig. 23 is a sectional elevation view with the outside casing in section, showing the manner of mounting and housing the various control instrumentalities other than those necessarily involving remote control, and showing the compactness and simplicity of this part of the organization.

Fig. 24 is a perspective view of one of the fuses used to control alarm signals for detecting trouble in any of certain circuits.

Fig. 25 is a sectional full-sized plan view of a part of the cabinet showing the manner of mounting one of the pulser relays and contact assemblies.

Fig. 26 is an end plan view taken on line 26—26 of Fig. 25.

Figures 27 and 28 comprise sectional fragmentary views inside the cabinet showing the mounting of the letter and figure shift relays and their contact assemblies.

Figure 29:
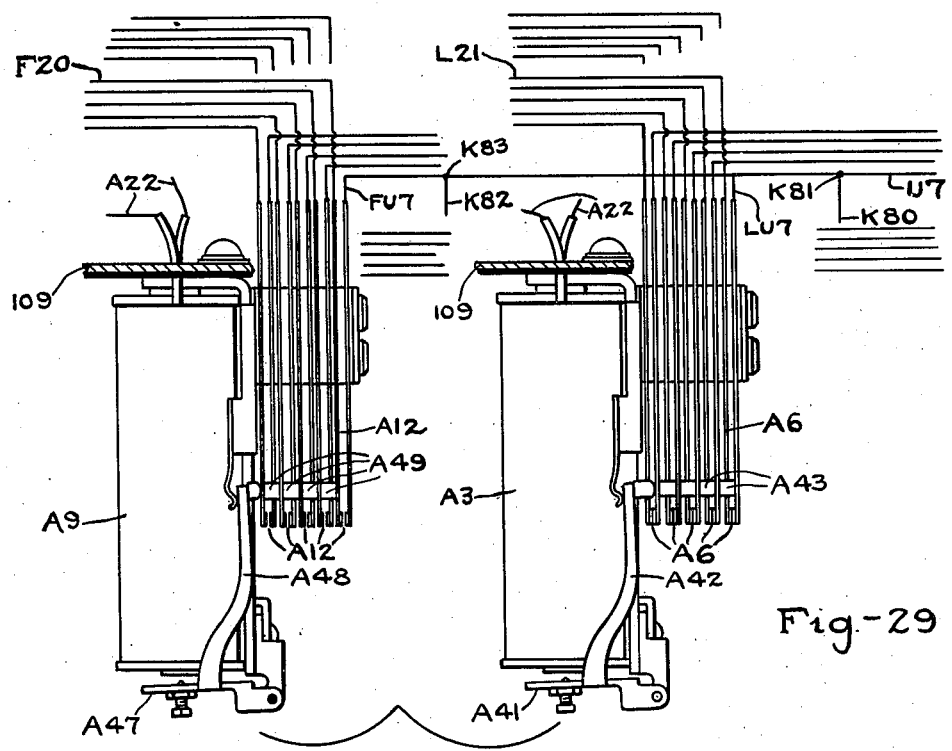

Fig. 29 is a detail part sectional plan view showing enlarged details and manner of mounting within the cabinet of a corresponding pair of alternate relays.

Figure 30:
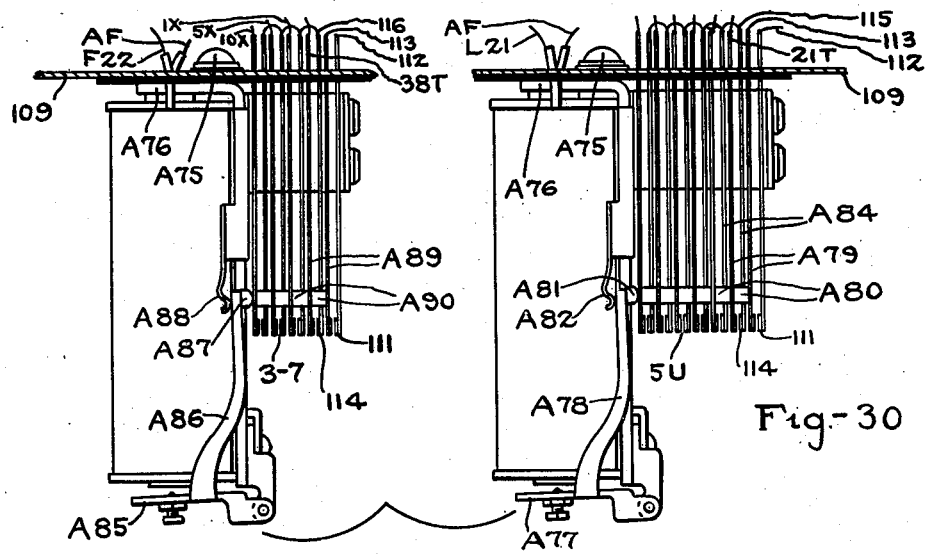

Fig. 30 is a part sectional horizontal plan view within the cabinet showing in enlarged detail a corresponding pair for figures and letters respective of "initial-pulser group-contact relays" as positioned in the cabinet.

Fig. 31 is a front elevation view of combination holding and orientating cycle switch as the same is positioned in the cabinet.

Fig. 32 is a side elevation view with some parts in section of the switch shown in Fig. 31 as mounted in the cabinet.

Fig. 33 is a sectional view taken on line 33—33 of Fig. 31.

Fig. 34 is a sectional view taken on line 34—34 of Fig. 33 showing three contacts on the stationary member.

Fig. 35 is a view similar to Fig. 34 showing only two contact plates.

Fig. 36 is a perspective elevation view of a cabinet in which is mounted the interpreter and upon which is a special electric typewriter embodying features of my invention.

Fig. 37 is a transverse sectional elevation view part way down through the center of the cabinet and supported typewriter of Fig. 36 with some parts broken away and omitted.

Fig. 38 is a sectional elevation detail of some of the specially designed mechanisms of the typewriter.

Fig. 39 is a fragmentary sectional elevation view showing the position of shift key for throwing the typewriter into operative relation with other mechanisms to display letters.

Fig. 40 is a fragmentary enlarged sectional elevation through the paper feed mechanism at one end of the roll.

Fig. 41 is a sectional view on line 41—41 of Fig. 40.

Fig. 42 is a fragmentary plan view of the continuous-form paper showing the feed guide and transport means along the side.

Figure 43:
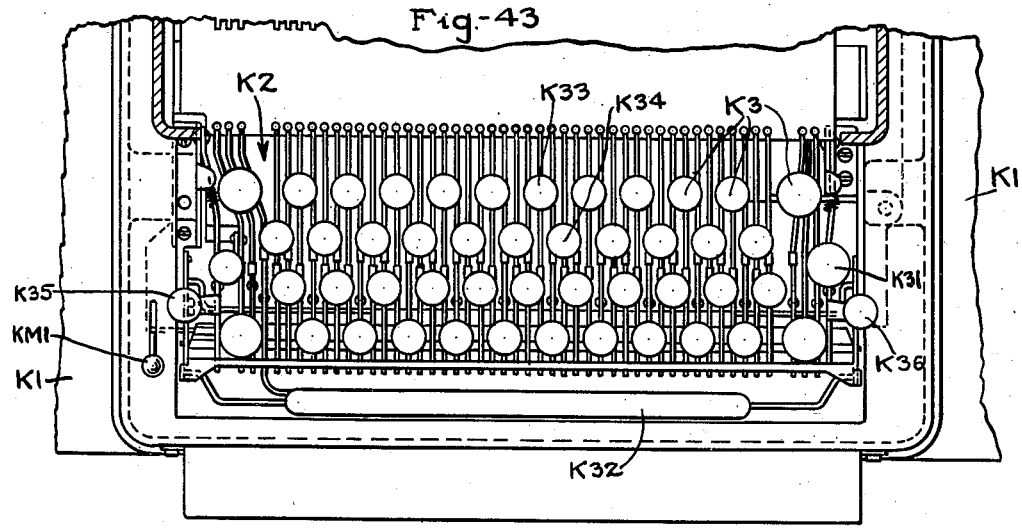

Fig. 43 is a plan view of the keyboard and keys of the typewriter showing, especially, certain keys forming part of my invention.

Figure 44:
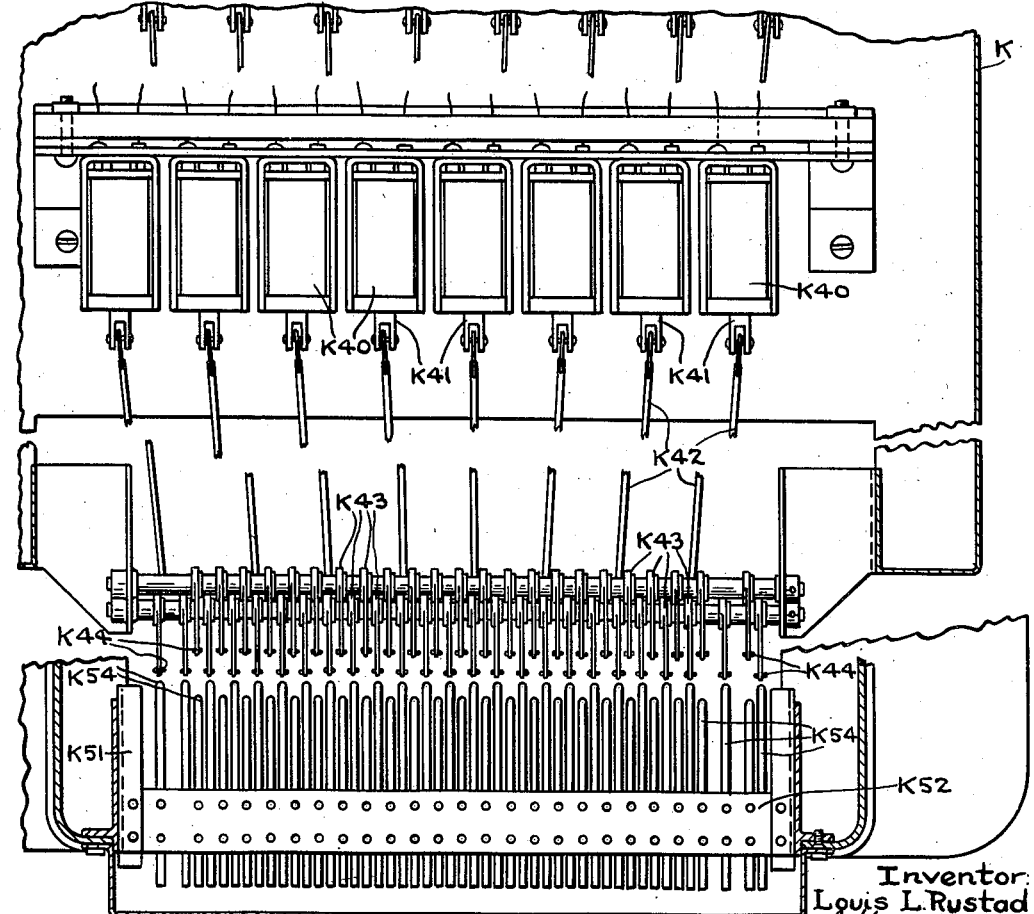

Fig. 44 is a part sectional plan view taken on line 44—44 of Fig. 37.

Figure 45:
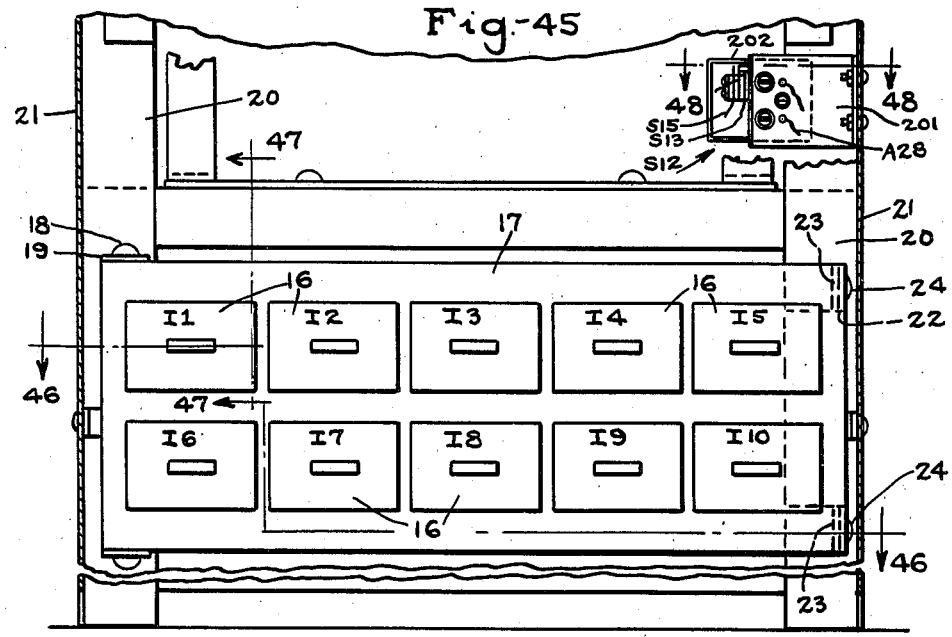

Fig. 45 is an elevational view of the rear of the cabinet with the casing partly in section and partly removed and showing the form of mounting the interpreter sections.

Figure 46:
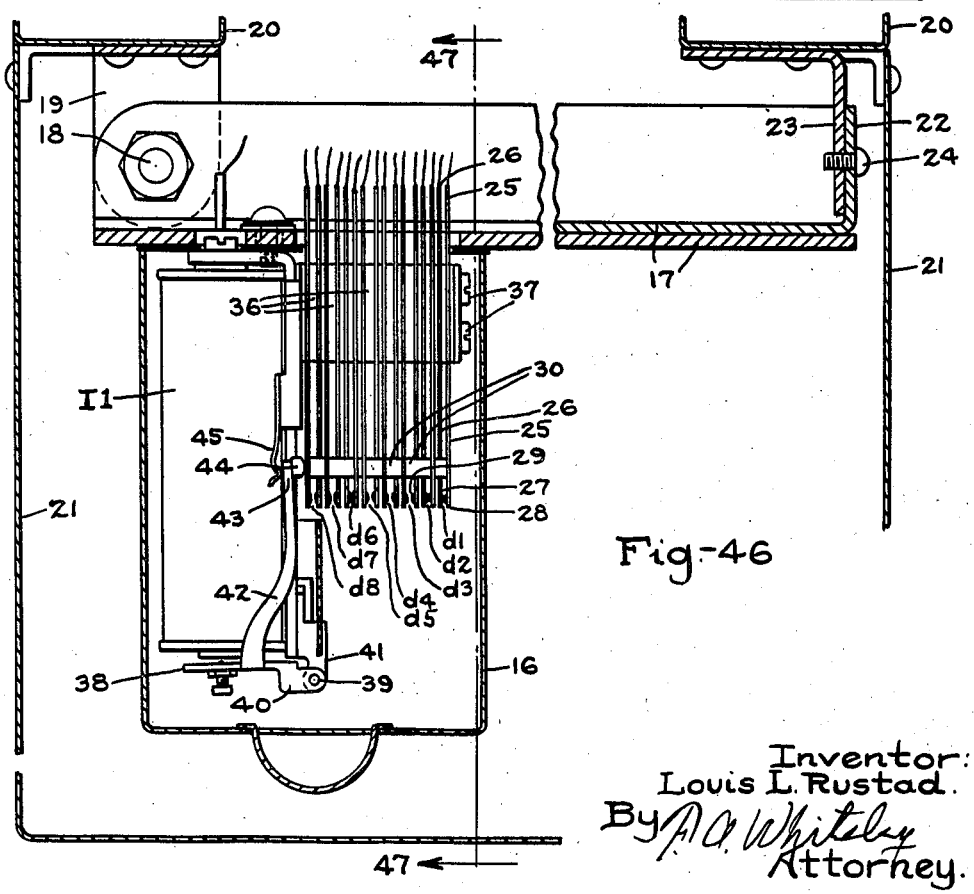

Fig. 46 is an enlarged sectional plan view taken on line 46—46 of Fig. 45 showing a detail of one of the interpreter relays.

Fig. 47 is a sectional side elevation view taken on line 47—47 of Figures 45 and 46.

Fig. 48 is a part sectional plan view on an enlarged scale shown on line 48—48 of Fig. 45.

Fig. 49 is an end elevation part sectional view taken on line 49—49 of Fig. 48.

Fig. 50 is a side elevation view of a modification comprising a combination holding tripping and re-setting cycle switch as an alternative means in the system to the combination holding and orientating cycle switches.

Fig. 51 is a perspective detail view showing one of the "stepping" wiper members.

Figure 54:
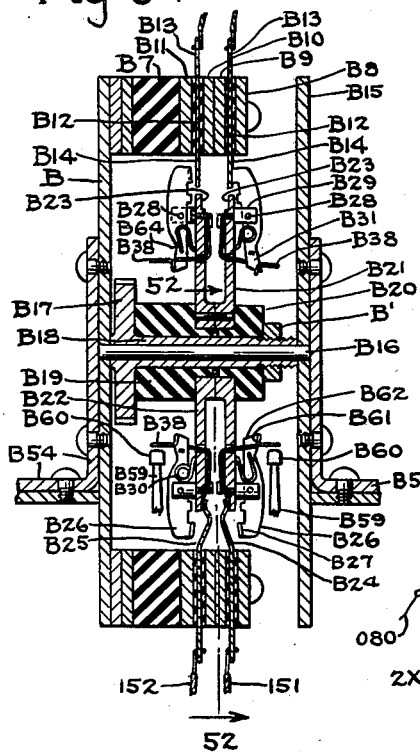

Fig. 52 is a fragmentary sectional view taken on line 52—52 of Fig. 54, showing one of the "stationary" wipers.

Figure 53:
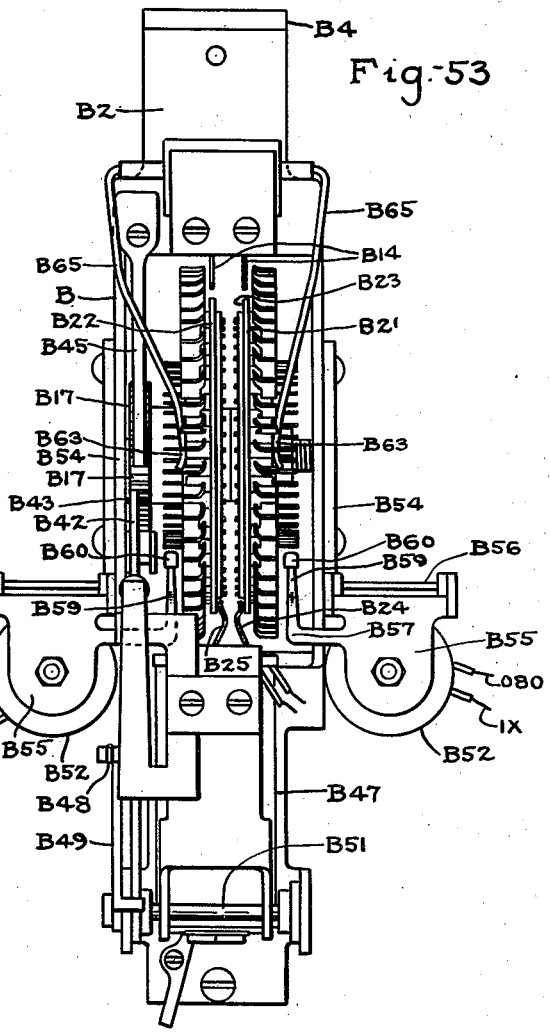

Fig. 53 is an end elevation view of parts shown in Fig. 50.

Fig. 54 is a sectional elevation view taken on line 54—54 of Fig. 50.

Figures 55, 56:
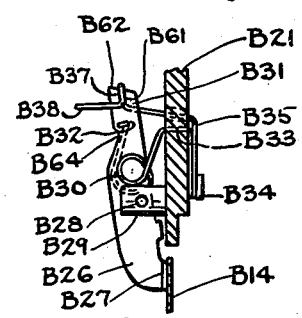

Fig. 55 is a sectional view of one of the wiper members showing the spring for actuating the same.

Fig. 56 is a view similar to Fig. 55 showing the wiper member (in dotted lines) released.

The instrumentalities illustrated by the foregoing drawings and the figures thereof will now be described in detail.

Figure 1:
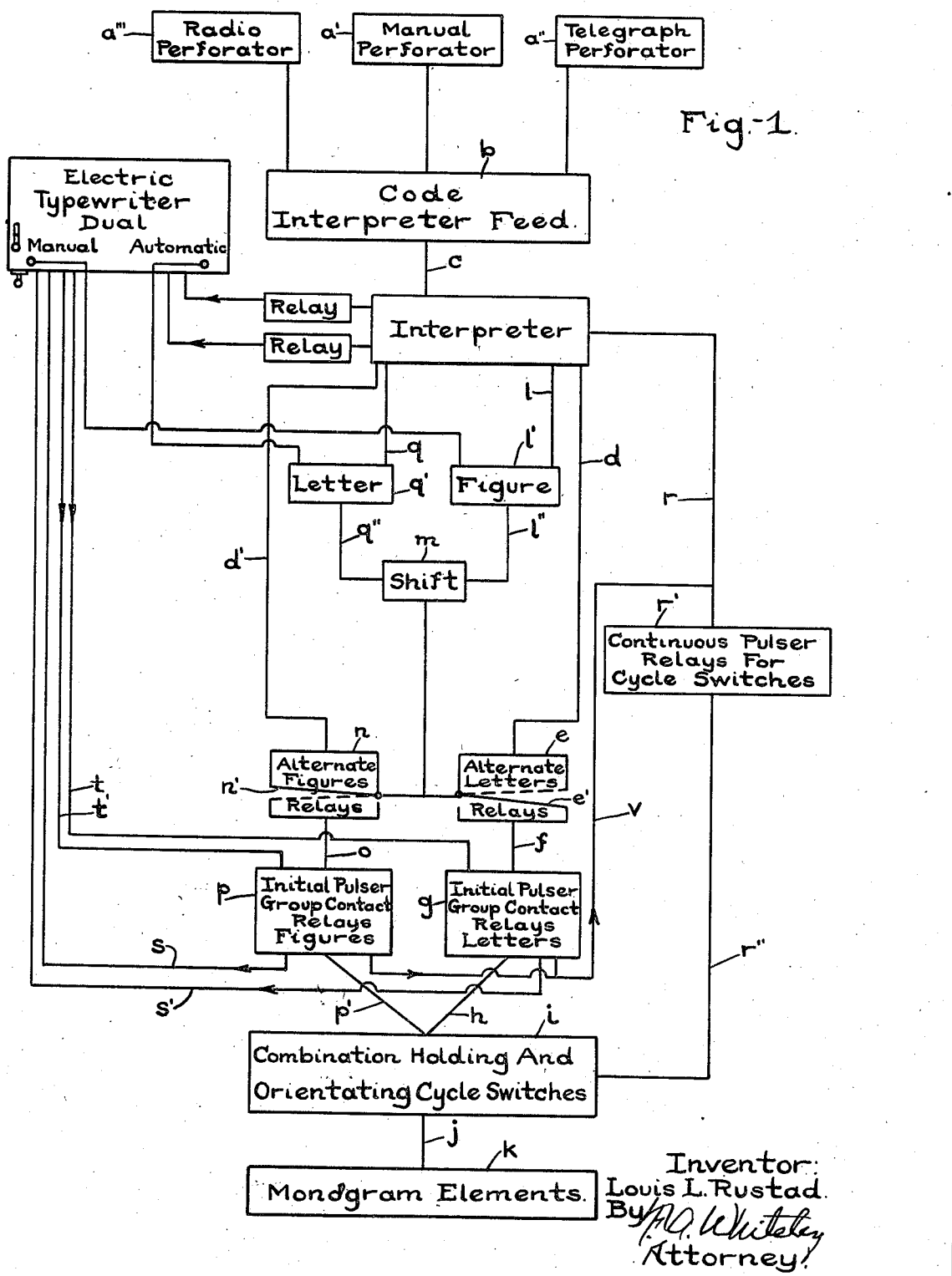
Fig. 1 is a schematic diagram with appropriate legends for giving a general conception of the order of instrumentalities and operations by which the results of the invention are attained.

*The general organization as schematically indicated on Fig. 1*

Figure 1 embodies in general a diagrammatic showing for the purpose of giving a comprehensive view of the sets of instrumentalities and their relations in the working of my system of signwriting display. In this drawing the automatic operation begins with the perforation of the sode tape, which may be effected at the outset by manual means as at $a'$, by telegraph means at $a''$, or by radio waves as at $a'''$. Whichever method of perforation is employed, or even if the perforated tape is provided from some outside source and comes already punched and rolled this tape will be passed through a code interpreter feed indicated at $b$, a machine in many respects similar in mechanical construction to well known transmitters but having different sending means and wiring plans. The tape is fed through this feed mechanism from which, as indicated by the line $c$, the code indications of the tape go to the interpreter relays. From the interpreter, as the set-up is shown on the figure, over the course indicated by line $d$ the impulse or impulses for a selected character goes to the alternate "letter" relays $e$, the contacts $e'$ of which are shown as closed. The selected impulse then travels as indicated by the line $f$ to its "initial-pulser group contact relay" indicated at $g$, from which it is transmitted as indicated by line $h$ to its "combination holding and orientating cycle switch" indicated at $i$. These switches, as indicated by the line $j$, render the lighting circuits operative to monogram elements indicated by letter $k$, and the character so selected is illuminated on the sign. If the interpreter, however, selects a figure the impulse will go through course, $l, l', l''$ to the shift mechanism $m$, which will close the circuits $n'$ of the alternate figure relays $n$ and at the same time open the contacts $e'$ of the alternate letter relays $e$. The next impulse (or code selection) will pass from the interpreter, then through the line indicated by $d'$ to and through the alternate figure relay $n$ on the route indicated by the character $o$ to the "initial-pulser group-contact relay" indicated at $p$, and thence over route $p'$ to the selected "combination holding and orientating cycle switch" for figures selected as indicated at $i$ and through $j$ to light the combination of elements in the monogram indicated at $k$. Again, when the code set-up causes the interpreter to select a letter the current going through the letter side indicated at $q, q'$ and $q''$ will cause a shift back and the impulses will go through $d, e, g$, and $h$, to $i$, and from thence through $j$ to $k$ as before. At the same time each selection in the interpreter set up by the code tape will cause a pulse to pass through the course indicated at $r''$ to the combination holding and orientating cycle switches to successively energize the lighting circuits going from monogram to monogram a step at a time when an initial pulse has set such cycle switch in operation, and thus will cause the lighting elements in each monogram forming any character to be lighted successively on each of said monograms and to appear to travel from right to left across the sign. It is, of course, the passing through of a pulse as above described from the alternate letter relay $e$ or the alternate figure relay $n$ to the combination holding and orientating cycle switch $i$ in the manner above described, and which is called an initial pulse, which causes initial operation of the cycle switches for producing a character, to be followed by the above defined step by step operation for carrying the same set of illuminations through all of the monograms.

The diagram of Figure 1 also shows the manner in which a special dual manual-automatic electric typewriter is combined in the system for selecting characters as indicated by the lines $t$ and $t'$, so that the initial-pulser group-contact relays can be manually operated from the keyboard of this special typewriter. Operation of the group-contact relays by the typewriter also operates the continuous pulser as indicated by line $v$ in the diagram. Also the automatic selection of characters by the interpreter, in automatic or code tape operation, by which impulses go through either $d$ or $d'$ to the initial-pulser group-contact relays will operate relays to complete circuits to actuate solenoids of the typewriter, indicated by the lines $s$ and $s'$ on the monogram, whereby the selected character or figure will be caused to be typed as a permanent record on a continuous-form, folding or rolling paper.

*The interpreter feed*

Figure 2:
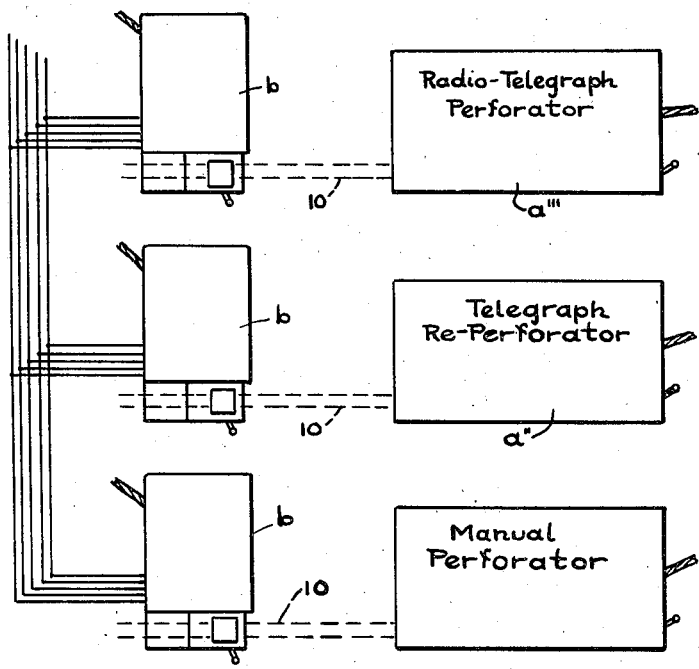
Fig. 2 is a schematic view indicating how a code tape may be variously perforated by different means before passing to the code interpreter feed.

The tape designated by numeral 10, Figs. 16, 17, 18 and 22, may be prepared or punched by any one of several well-known means as indicated diagrammatically in Fig. 2. As shown in Fig. 2, the interpreter feed $b$ is the same as is hereinafter described in detail regardless of how the code tape is punched. The punching may be effected by a manually operated perforator $a'$, by standard telegraph re-perforator $a''$ or it may be caused to be punched by a radio telegraph perforator $a'''$, all in a manner well-known to the art. Regardless of the manner in which the code tape is or may be perforated, it may be moved as perforated through and by the interpreter feed directly. Or if punched at a remote point and delivered in a roll or in any desired form already punched, the tape still will go through what I have called the interpreter feed, which, on Fig. 16, I have indicated generally by reference numeral 12.

Specifically the interpreter feed comprises a table 50 and a guide channel formed by ears 51 and a pair of blocks 52 which guide the tape 10 under a member 53, as shown in Fig. 17. Upon the shaft 54, Figs. 18 and 19, is mounted a pin wheel 55 provided with a multiplicity of pins 56. These pins are adapted to pass successively through equally spaced apertures 57 in the tape 10. The shaft 54 is intermittently rotated to give the pin wheel 55 and the pins 56 a step by step motion whereby the tape 10 is advanced in successive steps each in distance equal to the distance between adjacent perforations or openings 57. The step by step movement of shaft 54 and pin wheel 55 is effected by a pawl 58 engaging the teeth of a ratchet wheel 59. Pawl 58 is journaled on a lever arm 60 pivoted at 61 and normally held in or moved to its inactive position by a spring 62, Fig. 19. A lever 60 has a depending arm 63 with a toe 64 engaged by an arm 65 journaled on a shaft 66 and operated by a bar 67 having an adjustable pin 68 which contacts a portion 69 of lever 65 and is operated by means hereinafter described. A roller detent 59' engages the notches on the ratchet wheel 59 to hold the tape 10 exactly positioned after each movement thereof.

Upon the same shaft 61 are journaled a series of five swinging bar members 70a, 70b, 70c, 70d and 70e, all alike and similar in plan view to the member shown as 70c in Fig. 18. Each of these lever assemblages has a double arm arrangement 71 which carries a vertically upstanding pin 72 adapted to protrude through any perforations in tape 10, indicated generally at 73, Fig. 17. A depending lever portion has a toe 75 engaged by a lever board 76, which lever board has a depending portion 77. An adjustable screw head 78 is mounted upon a bent lever 79, Figs. 18, 20 and 21, which is pivoted at 80 and carries on its inner portion 81, Fig. 20, a cam roller 82 which rides upon a cam 83, Figs. 18 and 19, the shape of which is indicated in Fig. 20. A motor 84 through worm 85 and worm gear 86 operates the vertical shaft that carries the cam member 83 at its bottom. A switch 87 is operated by an external handle 88 controls the stopping and starting of the motor. When the motor is started a relay 89 is energized which pulls a stop 90 away from a notch 91 on a disk 92, permitting the vertical shaft and cam on it to rotate. When current is turned off the relay releases the detent 90 to action of spring 93, which causes it to engage the edge of disk 92 and into notch 91, stopping the cam and connected parts in fixed relation to the operative mechanism of the device. A governor of well-known construction and operation indicated generally at 94 is located on the motor shaft and is controlled in a well-known way by hand wheel 95 for varying its speed. To obtain a suitable synchronized speed the cylinder 96 may be provided having alternate black and white portions to be viewed through a tuning fork synchronizer.

I have discovered that the synchronizing adjustment can be better made by using a circular disk supporter 97 rotating on the top of the vertical shaft carrying the cam 83 and supporting thereon a cardboard target disk 98. This disk will be provided with a plurality of black segments 99 and white segments 100 and gives a better and more efficient method of synchronizing adjustment with the tuning fork synchronizing than is true of the usual cylinder top 96. It will be apparent that I may provide any desired number of white segments and each, when employed with the synchronizing tuning fork and the speed governor adjustment, causing the operation of the interpreter feed at a differently timed speed.

*The interpreter*

As shown in Fig. 18 and diagrammatically in Fig. 4 and Fig. 6, the five circuits adapted to be closed, through any one, or in grouping simultaneously, by the lever assemblages 70a, 70b, 70c, 70d and 70e, Figs. 18 and 20, caused to operate by the punchings of the code tape, are designated in the diagrams as C1, C2, C3, C4 and C5.

These circuits go through interpreter relays of an equal number designated as I—1, I—2, I—3, I—4 and I—5. Each of the relays I—1, I—2, I—3, I—4 and I—5, is associated with sixteen circuits each of which, in a manner hereinafter described, through the alternate relays, may be closed to one or the other of two initial-pulser group-contact relays for operating the instrumentalities to close the lighting circuits to display the characters set up on the code tape and selected by the interpreter on the first of the monograms. For convenience in consideration these circuits are designated on the drawings by the characters they select as follows: A —, B ?, C , D #, E 3, F , G &, H ¢, I 8, J , , K 7, L , M , N =, O 9, P .

It is obvious that any one, any two, any three, any four, or five of the circuits C1, C2, C3, C4 and C5 may be closed according to the punchings on the tape which are shown in detail in Fig. 22, where thirty-one of such code punchings are indicated. Since there are but sixteen circuits controlled by the relays I—1, I—2, I—3, I—4 and I—5, I have found it of advantage, for simplifying the system of contacts later to be described, to employ in the first bank of interpreter relays sets of contacts to complete sixteen circuits, and to provide a second bank of such interpreter relays designated by I—6, I—7, I—8, I—9 and I—10, which are connected in series with the relays I—1, I—2, I—3, I—4 and I—5 by means of circuit extensions C6, C7, C8, C9 and C10. It follows that circuits set up by the code punchings will simultaneously energize the corresponding relays in both banks, but the contacts controlled in the second bank of relays will close other circuits to other initial-pulser group-contact relays than the circuits closed in the first bank of interpreter relays.

There are likewise sixteen circuits to be established by operation of relays I—6, I—7, I—8, I—9 and I—10. Of these ten circuits may be closed to initial-pulser group-contact relays for either letters or figures which, for convenience, are designated on the drawings as follows.

Q , R $, S , T 5, U 1, V , W 2, X /, Y 6, Z ",

The remaining six circuits of the second bank, when closed, have special functions, which are indicated in designating words on Fig. 6, to-wit, "Carriage return," operating simultaneously to return the electric typewriter carriage to beginning of line and advance it to a new line for making permanent record; "Rest," operating to hold the sign stationary for a predetermined short period; "Letter shift," operating to cause the alternate relay letter contacts to close and the alternate figure relay contacts to open; "Figure shift," operating to cause the letter alternate relays to open and the figure alternate relays to close; "Space," operating to space on the sign between characters; "Pulsers," always in circuit to render operative the continued pulsers to send a pulse through for any combination of circuits selected and operated by punchings previously set up on the code tape.

In the drawings of Fig. 6 each of the relays I—1 to I—10 inclusive is shown as being connected with sixteen pairs of contacts designated on Fig. 6 as $d1$ to $d16$ inclusive. In this diagram these contacts are shown, for purposes of ease of inspection, as extending in a single plane, and each is shown related to an armature 13 on the relays I—1 to I—10 inclusive, said armature adapted to operate an arm or arms 14 diagrammatically associated with bars 15 by which when momentary closing of the relay circuits takes place the armature is caused to snap shut and open, giving the bar or bars 15 a single kick, which simultaneously closes contacts that are open and opens contacts that were closed, whereby the circuit for the selected character is closed through the initial-pulser group-contact relay for the character so selected.

The several assemblages of contacts, relays, and operative connections between the same, diagrammatically represented as I—1, to I—10, on Fig. 6, are shown in their operative details in Figs. 45, 46 and 47. As there shown the several interpreter units under removable covers 16 are shown mounted upon a swinging frame member 17 pivoted at 18 to ears 19 on the main supporting frame pieces 20 of a cabinet 21. The swinging frame 17 has a flange 22 adapted to take over lips 23 secured to the main frame of the cabinet and to be removably secured thereto by means of screws 24.

While for the purpose of simplicity in showing of the wiring diagram the contacts $d1$ to $d16$ are shown, in Fig. 6, as extending along a single plane, the structural arrangement which I have found in practice the more satisfactory, places the contacts in two rows, contacts $d1$ to $d8$, Fig. 46, being in one row and the remaining contacts $d9$ to $d16$ being in a second row of which contact $d9$ alone appears, Fig. 47. Each of the contacts in this construction comprises two members, a movable contact plate or finger 25 and a fixed contact plate 26. The form of these plates and fingers is clearly shown in Fig. 47, wherein there is a toe or extension 27 on each fixed contact plate which comes opposite the end 28 of each movable contact finger. The adjacent portions of the end of toe 27 and the end 28 are formed with ball-like protuberances 29, Fig. 46, which are the parts actually engaged when the members are brought together. As clearly shown in Fig. 46, the several contact fingers 25 of one row of eight contacts (being identically the same for the second row of eight contacts, Fig. 47) are held to move as a unit by spacing washers 30 shown in dotted lines in Fig. 47, and which may be strung upon a pin 31 extending through the several arms 25, as indicated in Fig. 47. The fingers 25 are provided with extensions 32 and the plates 26 with similar extensions 33, Fig. 47, to which the sets of wires 34 and 35 are connected for completing a circuit when the contact balls 29 are brought into engagement. The assemblage for each row of contacts is held together by insulating spacer plates 36 secured by sets of screws 37.

As shown in Figs. 46 and 47, the relay I—1 (the same as all other interpreter relays) has its armature 38 mounted to swing upon a pintle 39 by means of separated ears 40, the pintle being mounted on a pair of standards 41. Secured to the armature 38 in spaced relation are a pair of arms 42 of the shape shown in Fig. 46, and the relation of the two arms is shown in dotted lines in Fig. 47. The ends 43 of these arms have secured thereto a pusher piece 44 which is caused to engage the first of the spring arms 25 by means of a pressure spring 45, Fig. 46, the force of all of spring contact arms 25 being greater than the force of the spring 45 so as to hold the parts in the position indicated in Fig. 46, wherein some of the contacts are held closed and some are held open. Wiring posts 46 and 47 for the relay connect with circuit wires C1 and C6, respectively, for the first of the bank of relays I—1 to I—10 inclusive, and with a wire C17, Fig. 6, which goes through a manual switch to ground C19.

It follows, with the above arrangement of parts, that when the relay coil is energized by closing circuit C1 (or any of the other circuits C2 to C10 inclusive) the armature will be drawn down and released, giving in effect a quick kick to the arms 42 depending from the armature, with the result that the entire group of sixteen spring fingers 25 will be moved against the pressure of those spring fingers to open such circuits as already are closed and close such circuits as already are open. There will be simultaneously operated either any one, any two, any three, any four or five of the double sets of relays according to the combinations set up on the code tape. In each instance this will result in setting up a single closed circuit through either the contacts and wiring of the group of interpreter relays I—1 to I—5 or the contacts and wiring of the group of interpreter relays I—6 to I—10, said circuits corresponding to the letter or character or operation which is thereby selected, there being thus thirty-two original selections which it is possible for the interpreter to make. But by operation of the alternate relays the thirty-two possible selections may be doubled according to whether the circuit closed is caused to continue through the alternate letter relays or the alternate figure relays.

*The alternate relays*

As above pointed out, the interpreter banks of relay-operated switches are capable of selecting and opening through for operative functioning, individual circuits, which, in the operation of the machine, cause ultimately a selected character on the monogram. There may be in any case a sufficient number of interpreter banks of relay-operated switches to effect illumination of any number of characters. By increasing the number of interpreter relays to a six-pair unit combination, in pairs for convenience of assembling, I would be able to select sixty-four independent characters. In order to make the system conform to the five unit code which is the standard commercial printing-telegraphic code used throughout the country and the world, I employ what I have called alternate relays. This makes news casting on the sign capable of receiving commercial transmitted messages stored on a code tape through the adaptability of such perforated tape to relay directly from any place over present communicating systems.

Figure 8:
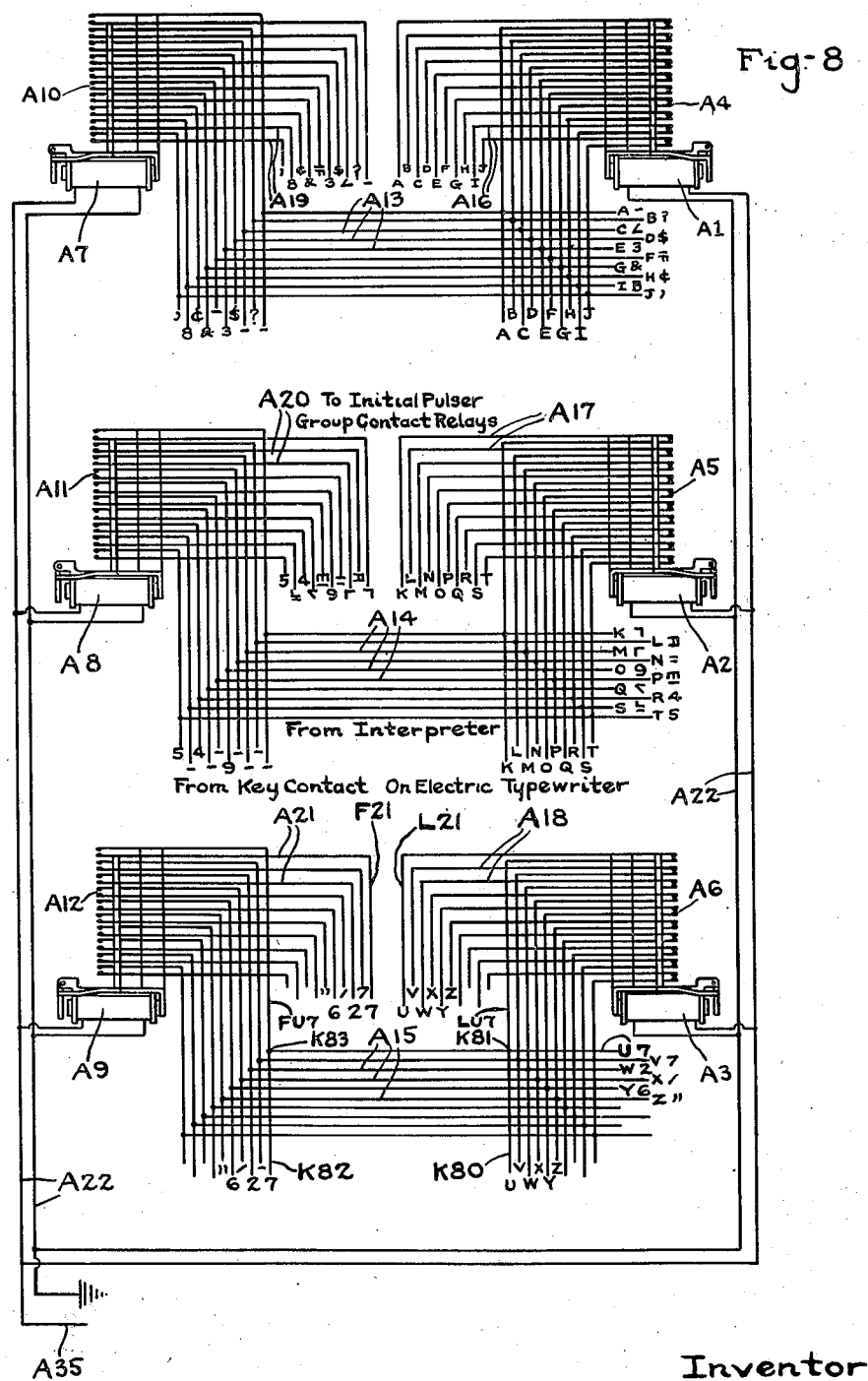
Fig. 8 illustrates the group of what is called alternate relay switches whereby circuits selected in the interpreter by combinations on the code tape causes current to pass through one or the other of said sets of alternate relays and thereby double the available characters to be selected on the interpreter such as shown in Fig. 6.

The general arrangement of these alternate relays in wiring diagram is shown on Fig. 8. Three pairs of such alternate relays are shown and are all that are requisite for the purpose desired. Three of the alternate relays, designated as A1, A2 and A3 include groups of switch contacts A4, A5 and A6, which altogether when the switch contacts are closed provide continuations of the circuits set up in the interpreter for each of the letter characters called for by the code punchings. It follows that when the letter alternate relays are set as normally to close the contacts A4, A5 and A6 the letter character circuits will be closed through to the initial-pulser group-contact relays for letters.

Correspondingly, a second set of three alternate relays, A7, A8 and A9 is provided having a second set of switch contacts A10, A11 and A12, and these contacts when closed carry through to the initial-pulser group-contact relays for figures the figure circuits set up in the interpreter. As clearly shown in Fig. 8 groups of wires A13 connect with switch contacts A4 and A10 of relays A1 and A7, groups of wires A14 connect with switch contacts A5 and A11 of relays A2 and A8, and groups of wires A15 connect with switch contacts A6 and A12 of alternate relays A3 and A9. Correspondingly, groups of wires A16 lead from contact A4; other groups of wires A17 lead from contacts A5; and still other groups of wires A18 lead from contacts A6 to the several initial-pulser group-contact relays for the several letter characters which may be selected and illuminated. Other groups of wires A19 lead from contacts A10, and groups of wires A20 lead from contacts A11, and groups of wires A21 lead from contacts A12 to the several initial-pulser group-contact relays for effecting operative illumination of selected figure characters. The different letter characters and the different figure characters served by any wire of any of the groups closed by a group-contact relay are individually shown applied to their appropriate wires in Fig. 8.

It follows that if the alternate relay contacts A4, A5 and A6 are all closed and the alternate relay contacts A10, A11 and A12 are all open the circuits set up in the interpreter will go through alternate relays A4, A5 and A6 to the initial-pulser group-contact relays for letters. Likewise, when alternate relay contacts A10, A11 and A12 are closed and alternate relay contacts A4, A5 and A6 are open the same circuits set up in the interpreter will now go to the initial-pulser group-contact relays for figures. Hence, by shifting the opening and closing of the respective contacts for letters and for figures in the alternate relays each circuit set up by the interpreter may go through either of two initial-pulser group-contact relays to cause illumination either of a letter character or a figure character.

In practice the set-up is such that letter relay contacts A4, A5, A6 are normally held closed, and figure relay contacts A10, A11 and A12 are normally open, as clearly indicated in the diagram of Fig. 8. The several relays A1, A2 and A3 for the letter contacts, and A7, A8, A9 for the figure contacts are all connected in the same circuit A22, as clearly shown in Fig. 8. Hence, all the relays may be simultaneously energized, and when so energized the shifting will be effective, relays A1, A2 and A3 operating to open all contacts A4, A5, A6 and relays A7, A8, A9 operating to close all contacts A10, A11, A12.

Details of the mechanical operating arrangements of the alternate relays are shown in Fig. 29. See also, Fig. 23, the cabinet for housing the different instrumentalities in which the several alternate relays A1 to A3 and A7 to A9 are placed in convenient arrangement for ready access and repair. Fig. 29 shows letter alternate relay A1, and figure alternate relay A7, not in diagram as in Fig. 8, but in the actual assemblage, in which there are double sets of contacts A4 and double sets of contacts A10, operated in general in a manner similar to the operation of the interpreter relays, as shown in Fig. 47. In the position of Fig. 29 it will be noted that neither relay A1 nor A7 is energized, and that the normal positions when not energized are such that the letter contacts A4 are held closed, thus closing the lines through for the letter indications while the figure contacts A10 are held open, thus preventing current passing through the alternate figure contacts. The current path selected and closed by the interpreter for any desired characters set up by the code tape goes to the contacts of both sets of alternate relays, but can go through only one of the two alternate relays in such sets, because only one set of contacts will be closed and when that one set of contacts is closed the other set of contacts always is open.

In the position of the parts shown in Fig. 29, if the interpreter selects the figure shift circuit both relays, A1 and A7, will be energized in the manner hereinbefore pointed out, with the result that the respective armatures A41 and A47 will be drawn down and levers A42 and A48 will be moved. This, through a pusher member A43 actuated by lever A42 will cause all the contacts A4 to be opened, and at the same time through pusher member A49 actuated by lever A48, will cause all the contacts A10 to be closed, contacts for automatic operation, and also for showing various operations effected directly from the electric typewriter as later pointed out.

Before following through the circuit or current lines, "letter shift" or "figure shift," it must be understood that when the parts are as illustrated in Fig. 4, that is, with letter contacts closed, this is a normal position in which no current is passing. When the shift is made from alternate letter relays to alternate figure relays current passes continuously through all the alternate relays and through the shift relays. On the other hand, when current is passed through the "letter shift" circuit to restore to the normal position of Fig. 4, there is only a pulse of current which operates to break the continuous current for rendering operative the alternate figure relays and restores the contacts A4, A5 and A6 for the alternate letter relays.

The current line designated "figure shift" is caused to be selected and closed by the interpreter from a code punching on the code tape. This carries current through a branch A23 to the figure relay A24, which through a lead A25 therefrom goes to battery A26. This operates to close a contact A27, one side of which is in circuit with the common battery wire A25 and the other side leads through a wire A28 and a branch wire A29 to a relay A30. This closes contact A31 and permits current to flow from battery A32 through contact A33 always normally closed, through branch wire A34 to branch wire A29, and thence through branch wire A35 to alternate relay contact circuit A22 by which all of the alternate contact relays are energized, with the result that the letter contacts A4, A5, A6 are all open and the figure contacts A10, A11, A12 are all closed. But because contact A33 associated with relay A36 is normally closed, current will continue to pass from battery A32 through relay A30 and hold the contact A31 closed. Thus until an action is had to open contact A33 all the alternate relays will continue energized and the current lines selected in the interpreter will go through the alternate figure relay contacts instead of the alternate letter relay contacts.

When, however, the current line "letter shift" is selected by the interpreter in response to a punching set-up on the code tape, it will, through a branch wire A37, close the circuit through letter relay A38. This will operate to close contact A39 associated with the relay A38 and through a branch wire A40 will carry current to the shift relay A36. This is only a single pulse but that is sufficient to open and close the contact A33, but the opening of contact A33 will momentarily break the circuit going through shifter relay A30, which will release the armature of that relay, opening contact A31, and thus taking battery current away from the alternate relay circuit A22 which will de-energize all of the alternate relays A1, A2, A3 and A7, A8, A9, with the result that the letter contacts A4, A5, A6 will be closed and the figure contacts A10, A11 and A12 will be opened, so that current lines selected by the interpreter in response to a set-up from the code tape will be constrained to pass only through the alternate relays for letters and will operate only the initial-pulser group-contact relays for letters.

The details of the shift relays are shown in Figs. 27 and 28. As there shown having reference to Fig. 23, it will be noted that relay A30 is secured to a partition support 109 in the cabinet 101 by means of screws A50 and a bracket support A51 while relay A36 is secured to a supporting partition 109 in the cabinet 101 by means of screws A52 and a bracket support A53. As clearly shown in Fig. 27, the contact A31 is normally open, at which time the contacts A4, A5 and A6, Fig. 8, for letter alternate relays are normally closed and current lines must go through to letters. On the other hand, as shown in Fig. 4, the relay A36 when normally de-energized has its contact A33 normally closed. When relay A30 is energized through closing the circuit by "figure shift" relay A24 armature A 54 of relay A30 is drawn down and armature lever A55 operates simultaneously to close contact A31 to open contact A56 and to close contact A57. The closing of contact A31, as hereinbefore pointed out puts the relay A30 in circuit with current from battery A32 passing through contact A33 controlled by relay A36, whereby relay A30 will be continuously energized until the contact A33 is broken by energization of relay A36 through "letter shift" relay A38. When this happens armature A58 is drawn down, rocking armature lever A59 and opening contact A33. This opening is for only the short unit of time which I have called a "pulse," but it is sufficient to break the circuit going through relay A30, with the result that contact A31 opens and current is then cut off from the alternate relay circuit A22 and the alternate relay contacts A4, A5 and A6 are restored to normal operative position, with current lines going through the letter alternate relay contacts.

*General assemblage of sign operating members*

Means of selecting a current line corresponding to letters and figures respectively have been traced through the alternate relays. Each current line when it is selected and set up is passed through to an individual element I have termed an initial-pulser group-contact relay, excepting those which have been designated on Fig. 6 of the drawings as "letter shift," "figure shift," "space, " "rest" and "carriage return," which do not go to the elements for lighting characters on the monograms. These elements I have designated as combination holding and orientating cycle switches. They are shown in a general diagrammatic arrangement on Fig. 5. The monograms there may be generally referred to as M1, M2, M3, M4, M5, M6, M7, M8, M9 and M10. It will be understood of course that the employment of ten monograms is merely a convenient number for the purposes of describing my invention and any other number of monograms may be employed. There are shown for convenience of illustration, Fig. 5, eleven horizontal rows lying in fourteen vertical ranks of said combination holding and orientating cycle switches. Thus, the horizontal rows correspond in number to the number of monograms with one additional row needed for functioning in a manner later to be described; and the fourteen vertical rows each corresponds to one of the fourteen elements making up the monogram, designated as E1, E2, E3, E4, E5, E6, E7, E8, E9, E10, E11, E12, E13 and E14 on Fig. 15 of the drawings. That is, each vertical row of the holding and orientating cycle switches is wired to make circuit connection with a single one of the elements E1 to E14, making up the several monograms. For convenience of illustration, I have given these several cycle switches characters 1X1, 1X2, 1X3, 1X4 to 1X11, indicating the several cycle switches in a vertical row and 2X1 to 2X11, 3X1 to 3X11, and so on through to 14X1 and 14X11, indicating the cycle switches in horizontal ranks, as shown in Fig. 5.

In this manner each of the one hundred and fifty-four cycle switches is given a designation which indicates its relative position both vertically and horizontally, or stated in another way, its position in relation to a particular one of the several monograms M1 to M10 and of the several elements of each monogram E1 to E14.

From the above it will be obvious that each of the cycle switches must provide means for closing a lighting circuit to one of the elements E1 and E14 of all of the monograms M1 to M10. It is the closing of groups of said lighting circuits causing selected groups of elements E1 to E14 to be illuminated, which produces the illuminated representation of a selected character, and it is the successive illumination of the same elements from monogram to monogram which has the effect of causing the illuminated character to travel from one end to the other of the sign. The closing of the several circuits to light a selected group of elements for a character illumination on the first of the monograms is effected by what I have termed the initial-pulser group-contact relays; and the successive energization of the same group to light the character successively on the several monograms from right to left is effected by the combination holding and orienting cycle switches in the arrangement just described.

*The pulser system and spacing*

For whatever purpose employed, and specifically when employed for traveling word display, it is an important feature of my invention that ultimate operation, that is, in traveling writing, the illumination of a character on a monogram, shall take place over a definitely limited short period of time. This illumination on one monogram is immediately followed by an illumination for a similar short period of time on a succeeding monogram. It follows that any closing of lighting circuits to effect this illumination must be over correspondingly short periods of time.

I have called this closing of circuits from its initiation by the set-up of the code tape (or the operation of a typing key of the electric typewriter as hereinafter described) through to the simultaneous closing and opening of the group of lighting circuits which produce illumination of a character, a "pulse." And I have called the means for producing the pulse, that is closing and opening the circuits for the requisite short length of time, "pulsers." These names, as will be pointed out later, fall in two divisions, first the initial pulsers, which I have designated initial-pulser group-contact relays, and, second the continuous pulsers which are operated by what I have called the continuous pulser relays.

The two sets of pulsers, initial pulsers and continuous pulsers, effect the same result, so far as timing the opening and closing of the lighting, or other main operative circuits. It is the function of the initial pulsers to set in operation what I have called the combination holding and orientating cycle switches, and it is the function of the continuous pulsers to cause continuation of that operation through the successive monograms making up the sign. The organization is such that each selection made by the interpreter in response to the element or character set up by the code tape (or by the electric typewriter) operates all the continuous pulsers, so that the continuous pulsers are, as their name implies, operating continuously as long as the interpreter feed causes selection of elements or characters by the interpreter from the set-up on the code tape, or as long as operation of the typewriter case takes place.

On the other hand, a single initial pulser is always operated by each interpreter selection excepting in those cases where the interpreter selection closes a current line through for "letter shift," for "figure shift," and for "space." In respect to each of the last three named selections no initial pulser is operated, hence no lighting circuits are closed and on the sign there will appear a space. This is as it should be, for a shift from letters to figures always will occur at the end of a word, and a shift from figures or other characters to letters always will occur before the beginning of a word.

A single space must be used between words or between words and figures, and in practice I have found it produces better results in the sign to double-space between words and double-space following illumination of figures or characters.

Referring to the general organization shown on Fig. 5, it will be noted that there are in the set-up shown 154 combination holding and orientating cycle switches. As above stated, the continuous pulser operates continuously a pulse for every selection of the code tape, which includes selections that do not go through to the initial-pulser group switch relays such as where the "letter shift" or "figure shift" or "space" are employed. This continuous pulser organization operates to transmit a pulse—that is a flash of current of predetermined short duration, simultaneously to every one of the 154 combination holding and orientating cycle switches. And it is an essential feature of my invention that these continuous intermittent pulses are transmitted to each of the respective cycle switches through its own independent circuit.

While the continuous pulser does transmit or is adapted to transmit a pulse to each of the cycle switches, that pulse will only be translated into action when the contact is closed at the cycle switch, as will be pointed out more in detail in a later section herein. The normal, or as I have called it, the "home" position of the cycle switches is one in which no continuous pulser contact is made, and for all cycle switches where the contact maker is in its "home" position the continuous pulser will have no effect, since it is the initial pulser operated by the initial-pulser group-contact relays which operates to initiate action of the cycle switch and move it from its "home" or circuit-breaking position to the first pulser-circuit closing position, where it will then be subject to be operated by pulses coming through from the continuous pulsers.

It might be stated that the result of the above action of the continuous pulser could be effected by a single pulser circuit going to all of the cycle switches. Theoretically this is true, but as a practical matter I have found that such an arrangement does not give satisfactory results. This is for the reason that a large number of cycle switches may be simultaneously active. There is substantial work being done on each cycle switch in connection with each pulse going to it. If this varying but frequently large number of cycle switches were fed with current from a single line it would result in serious overloading of that line and resulting failure to operate the cycle switches, or all of them, or retardation of operation of some or all of the cycle switches, which would put the whole system out of step.

Accordingly, as shown generally in Fig. 7, I provide a group of eleven pulser relays each embodying fourteen contacts corresponding with the cycle switch diagram of Fig. 5. That is, each group of contacts for a pulser relay has a contact for closing a circuit to each of the fourteen cycle switches in the eleven horizontal rows as shown in Fig. 5, there being a pulser relay for each of said rows.

The relays are designated on the drawings as P2I, P22 to P3I respectively, controlling contacts for current lines to respective horizontal rows I to II of cycle switches diagrammed on Fig. 5. I have numbered the groups of fourteen contacts operated by each relay PI, P2 to PII, respectively, corresponding in the final figure of each designation with the row of cycle switches with which the pulser circuits are connected. There are fourteen contacts for each such horizontal row, and I have designated on the drawings these several current lines going to the several cycle switches as IPI, 2PI to I4PI, IP2 to I4P2, IP3 to I4P3, IP4 to I4P4, IP5 to I4P5, IP6 to I4P6, IP7 to I4P7, IP8 to I4P8, IP9 to I4P9, IPI0 to I4PI0 and IPII to I4PII.

There is thus shown a numbered current-lead or wire going to each of the cycle switches, as is clearly indicated by the application of said reference characters to some of the cycle switches diagrammatically shown on Fig. 5.

All of the pulser relays P2I to P3I are connected by branch wires P32 with a common ground wire P33, and by branches P34 with common lead wire P35, which is a continuation of the wire marked "pulsers" on Fig. 6 leading from the interpreter, and which is connected to the battery wire P36, Fig. 6, by closing of any of the contacts P37, P38, P39, P40 and P4I, all of which contacts are in parallel circuits and are normally open and one of which is always closed whenever current goes to the interpreter for any selection set-up by the code tape. It follows that with each set-up of the code tape operating the interpreter the common pulser circuit is closed and each of the eleven pulser relays P21 to P31 inclusive is operated to close the contacts of each of the groups of contacts P1 to P11 inclusive. A main battery or current wire P42, Fig. 7, is connected by branch wires P43 with one side of each contact of the group of contacts P1 to P11 inclusive. And the several individual current leads 1P1–14P1 to 1P11–14P11 are connected with the respective cycle switches, 1X1 to 1X11 through to 14X1 to 14X11. It follows that from each operation of any of the interpreter circuits, resulting from a set-up on the code tape, each of the entire number of individual pulsers, as designated on Fig. 7, is connected on the battery side with its respective cycle switch, so that if that cycle switch has been put in circuit with a ground through the operation of an initial-pulser group-contact relay the pulse which passes through will thus be effective to operate that cycle switch, and all pulses passed to cycle switches which have had the circuit so closed to the ground side will simultaneously operate all the cycle switches so put in complete circuit.

Specific details of the pulser relays and contacts are shown in Figs. 25 and 26, in respect to the pulser relay designated as P21, which is like all the other pulser relays P22 to P32 inclusive. The group of contacts P1 are shown in Fig. 7, for convenience of inspection as being in a straight line. In actual mechanical construction these contacts are as indicated in Figs. 25 and 26 wherein there are two rows of contacts P44 and P45. The various pulser relays as P21 are secured to supporting partitions 109 by bracket arms P46 and screws P47. The armature P48 rocks lever P49, which is provided with forked arms P50, P51, Fig. 26, engaging rods P52 and P53 held to engage movable parts of contacts P44 and P45, respectively, by means of spacers P54. A spring stop P55 tends to hold the contact ends P56 of lever arms P50 and P51 in proper contact, hence when the armature P48 is drawn down by energization of relay P21 all of the contacts P44 and P45 are simultaneously closed, giving the operation heretofore described.

Referring to the drawings Figs. 4 and 6, it will be noted that the third from the bottom current line of the bottom bank of interpreter relays is marked "space," and this goes through the line S1 to the space relay S8, which operates the pulser relays when the system is being worked from the electric typewriter, as will be later pointed out in detail. There is, of course no cycle switch for producing a "space," since each of the cycle switches acts to close a lighting circuit to one of the fourteen neon tube elements E1 to E14 inclusive. It follows that, since the interpreter in response to a code set-up for a "space" closes the circuit to all of the pulser relays, a pulse takes place which does not produce illumination of a new character on the first monogram. When a following selection of the interpreter calls for a character that character will be illuminated on the monograms but a pulse behind the character that immediately preceded it, which leaves one of the monograms dark between two illuminated monograms, which constitutes a "space" and the monogram is left dark progressively clear across the sign, thus producing a "space" between adjacent words or characters. The same result follows when the interpreter selects the current lines designated as "letter shift" or "figure shift," and for the same reason. That is, these selections by the interpreter close the circuit to the continuous pulser relays and although a pulse (i. e., a definite time period and a definite part of the cycle of operations by the cycle switches) takes place, no new character is illuminated on the first monogram, which produces the effect of a blank monogram, i. e., a "space" passing across the sign between illuminated letters or characters.

I have found it advantageous in rendering the traveling words and characters more easily readable, to provide for two spaces between the words and characters, and this is effected when the interpreter closes the current lines to "space" twice in succession or the current line to either "letter shift" or "figure shift" followed by the current lines to "space." This applies to operation of "carriage return."

*Initial-pulser group-contact relays*

As has appeared from the foregoing parts of this specification, in reference to the drawings, see particularly Fig. 8, a single current line is closed through the alternate letter relays for each of the letters of the alphabet, and a single current line is closed through the alternate figure relays for each figure and character other than letters which may be employed. Each of these so selected and closed electric circuits goes to one only initial-pulser group-contact relay. Hence, there are as many such relays as there are letters or figures (including other characters) to be illuminated. All of the initial-pulser group-contact relays and their wiring connections are shown diagrammatically on Figs. 9 and 10, which are to be considered together taken longitudinally of the drawing Fig. 9 above Fig. 10. In these drawings it is deemed simpler for reference to designate each of the relays by the letter or character it will cause to be illuminated on the sign. As shown in the diagram of these two sheets of drawings the letter initial-pulser group-contact relays from A to Z inclusive are indicated by the respective letters in the right-hand column and the figure and character initial-pulser group-contact relays are shown in the left-hand column.

Figure 9:
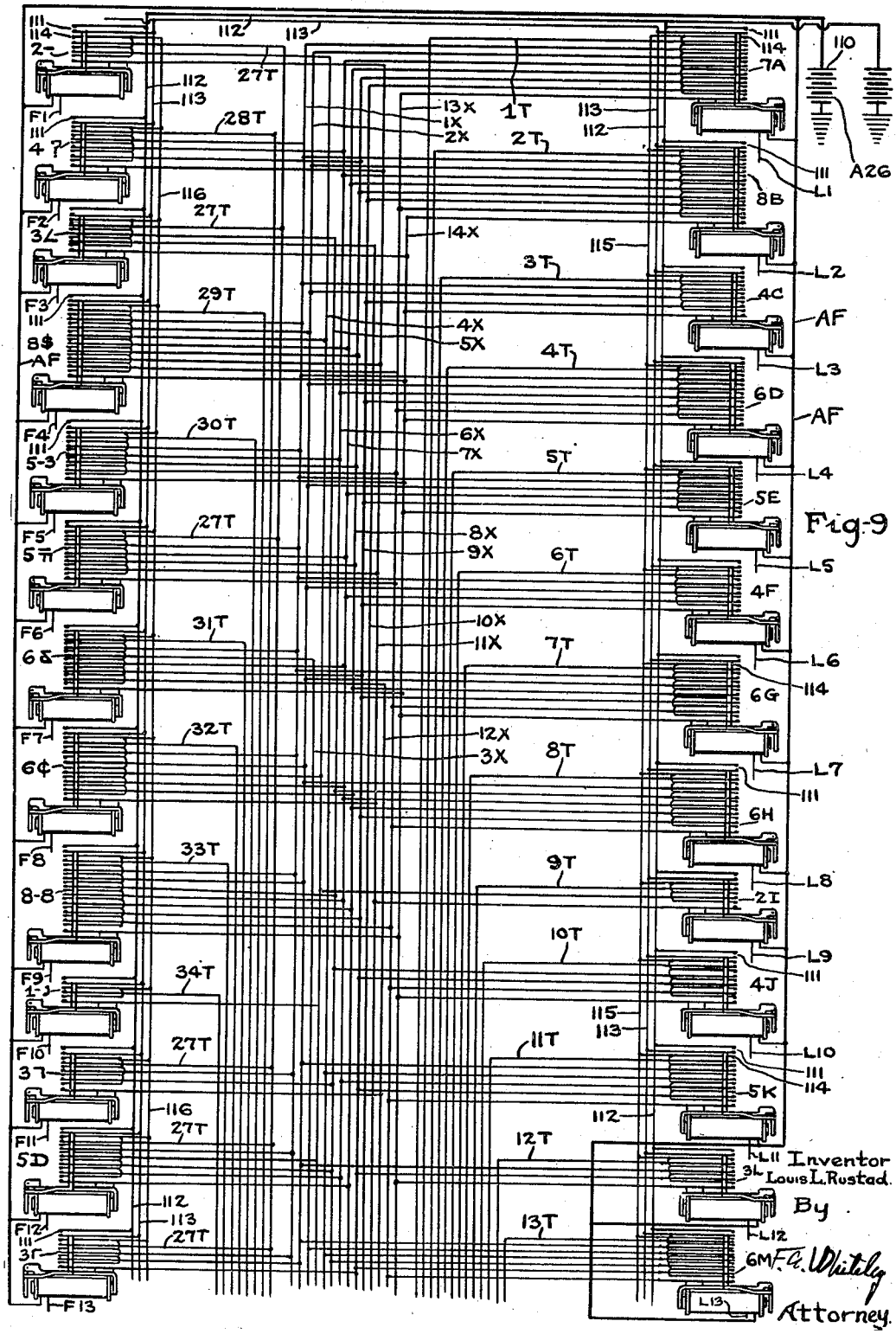
Fig. 9 and Fig. 10 are to be considered together, and comprise a showing of a complete set of relay switches rendered effective by current selected by the interpreter in passing through one or the other of the alternate relays, and which are termed in this specification initial-pulser group-contact relays, there being one of such relays for each character which is to be shown on the sign.
Figure 10:
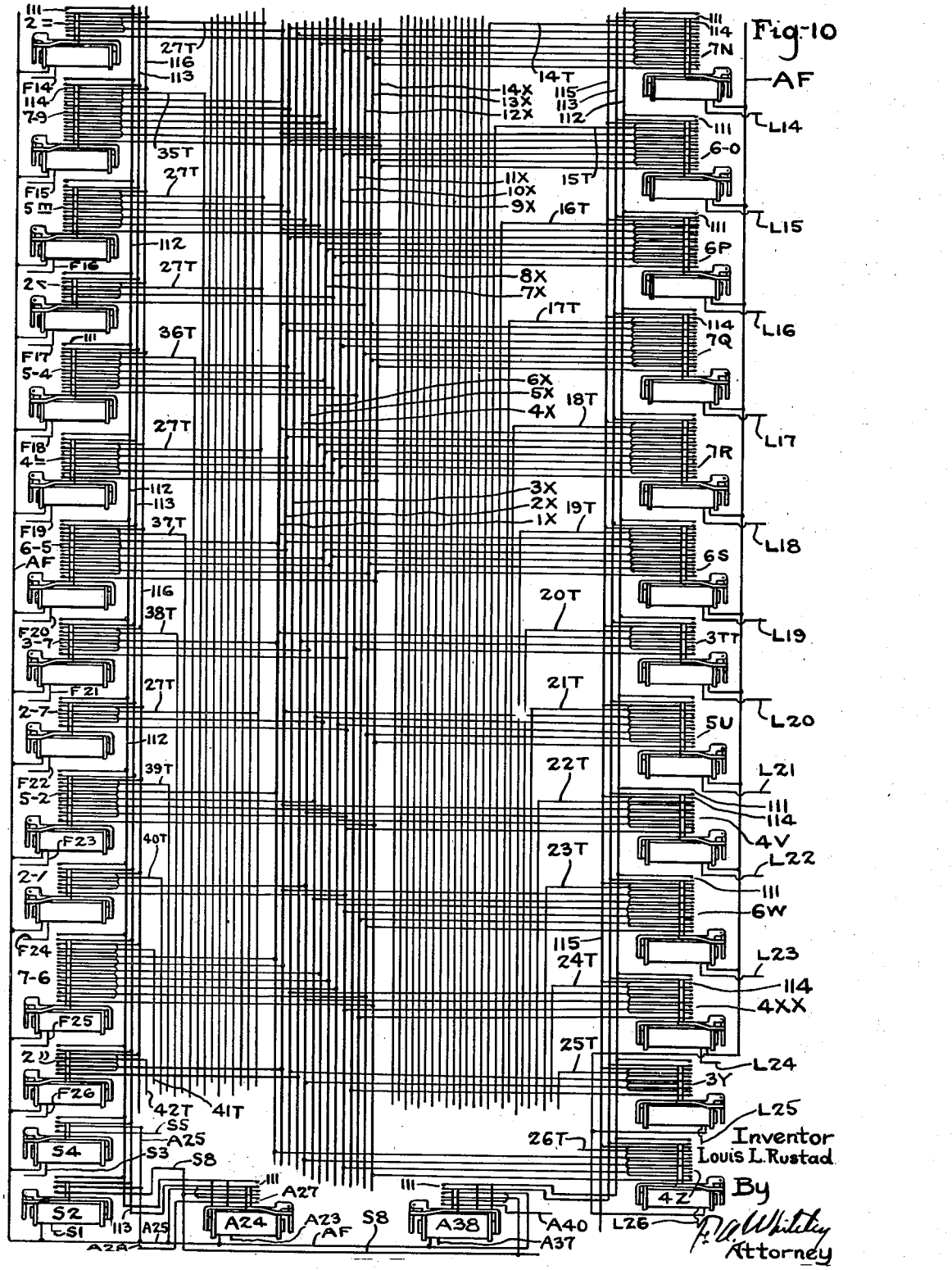

The several current lines (wires) designated in Fig. 8, A16, A17, A18, leading from the contacts of the letter alternate relays, A1, A2 and A3, for the letters of the alphabet, individually appear on Figs. 9 and 10 as L1 to L26 inclusive, and the several current lines (wires) designated on Fig. 8 as A19, A20 and A21, leading from the contacts of the alternate figure relays A7, A8, A9 are designated on Figs. 10 and 11 as F1 to F26 inclusive.

An inspection of the diagram will show that these several current lines close the circuit through the initial-pulser group-contact relays as above defined through branch wires running to a common wire AF, which goes to battery or other current source 110.

Referring to the diagram heretofore discussed, Fig. 5, the vertical ranks of combination holding and orientating cycle switches each provides means for closing a lighting circuit to a different one of the fourteen elements found in each of the monograms M1 to M10 inclusive. The bottom row horizontally of these fourteen rows of switches is designated 1X1, 2X1 and so on to 14X1. The group of wires or current paths going to the holding and orientating switches 1X1 to 14X1 inclusive is designated generally on Fig. 5 as X. The individual wires as shown on Figs. 9 and 10 going to these several holding and orientating cycle switches 1X1 to 14X1 are designated on Figs. 9 and 10 as 1X, 2X, 3X to 14X inclusive. In the same order the individual switches of each vertical rank of combination holding and orientating cycle switches of the several ranks 1X1 to 14X1 inclusive close lighting circuits respectively to the several individual elements E1 to E14 inclusive, as shown in detail on Fig. 15, and the operation of the switches to close these respective lighting circuits in the same order is effected by the circuit wires 1X to 14X inclusive shown in detail on Figs. 9 and 10.

Now it will be obvious that all characters appearing as illuminated on any monogram must be composed of one or more of the neon tubes elements E1 to E14, making up the monogram, usually by more than one such element and sometimes by a group of a considerable number of such elements. It follows that the initial-pusher group-contact relays either for figures or for characters in operating must simultaneously close circuits to one or all of the holding and orientating cycle switches corresponding to the element or group of elements which when illuminated on the monogram will produce the selected character so illuminated.

It will be apparent that each of the line wires 1X to 14X inclusive is or may be a common lead from any number of the initial-pulser group-contact relays for both letters and figures. Each of these relays has an opening and closing contact 111 for closing a circuit through to the continuous pulsers and all the contacts 111 have connection with the common battery wire 112 and the common pulser wire 113. Each of the initial pulser cycle switch relays also has a contact 114 which for letters is connected to a common battery wire 115 and for figures is connected with a common battery wire 116, and each of contacts 114 has a separate wire for letters designating 1T to 26T inclusive, and for figures designated as 27T to 42T inclusive, as clearly shown in Figs. 9 and 10. These last-named contacts 114 and circuit wires 1T to 42T respectively each closes a circuit through to a solenoid for operating a key of the electric typewriter to make a permanent record of the characters illuminated on the sign, as will be pointed out in detail in a later section.

In addition to the contacts above recited each initial-pulser group-contact relay has groups of contacts for closing circuits through the respective common wires 1X to 14X inclusive, which lead to the several combination holding and orientating cycle switches controlling the closing of circuits to the monograms for the respective elements thereof E1 to E14 inclusive. In order to simplify nomenclature I have designated these groups of contacts by the letter or character of the relay accompanied by the number of contacts in each case—thus, 7A; 8B; 4C; 6D; 5E; 4F; 5G; 6H; 2—I; 4J; 5K; 3L; 6M; 7N (Fig. 10); 6—O; 6P; 7Q; 7R; 6S; 3TT; 5U; 4V; 6W; 4XX; 3Y; 4Z; for letters, 2—(Fig. 9); 4?; 3 ; 8$; 5—3; 5⊤; 6&; 6¢; 8—8; 1—,; 3⏋; 5□; 3; 2=(Fig. 10); 7—9; 5m; 2 ; 5—4; 4—; 6—5; 3—7; 2—; 5—2; 2—/; 7—6; and 2″, for figures.

As clearly shown in Figs. 9 and 10 the several groups of contacts close groups of circuits from the entire group 1X to 14X inclusive going to the combination holding and orientating switches as follows: Group 7A for the letter A closes circuits 1X, 2X, 6X, 7X, 8X, 9X and 13X. Group 8B for the letter B closes circuits 1X, 2X, 6X, 7X, 8X, 9X, 13X and 14X. Group 4C for the letter C closes circuits 1X, 2X, 9X and 14X. Group 6D for the letter D closes circuits 1X, 2X, 6X, 9X, 13X and 14X. Group 5E for the letter E closes circuits 1X, 2X, 7X, 9X and 14X. Group 4F for the letter F closes circuits 1X, 2X, 7X and 9X. Group 6G for the letter G closes circuits 1X, 2X, 8X, 9X, 13X and 14X. Group 6H for the letter H closes circuits 2X, 6X, 7X, 8X, 9X and 13X. Group 2I for the letter I closes circuits 4X and 11X. Group 4J for the letter J closes circuits 6X, 9X, 13X and 14X. Group 5K for the letter K closes circuits 2X, 5X, 7X, 9X and 12X. Group 3L for the letter L closes circuits 2X, 9X and 14X. Group 6M for the letter M closes circuits 2X, 3X, 5X, 6X, 9X and 13X. Group 6N for the letter N closes circuits 2X, 3X, 6X, 9X, 12X and 13X. Group 6—O for the letter O closes circuits 1X, 2X, 6X, 9X, 13X and 14X. Group 6P for the letter P closes circuits 1X, 2X, 6X, 7X, 8X and 9X. Group 7Q for the letter Q closes circuits 1X, 2X, 6X, 9X, 12X, 13X and 14X. Group 7R for the letter R closes circuits 1X, 2X, 6X, 7X, 8X, 9X and 12X. Group 6S for the letter S closes circuits 1X, 2X, 7X, 8X, 13X and 14X. Group 3TT for the letter T closes circuits 1X, 4X, 11X. Group 5U for the letter U closes circuits 2X, 6X, 9X, 13X and 14X. Group 4V for the letter V closes circuits 2X, 5X, 9X and 10X. Group 6W for the letter W closes circuits 2X, 6X, 9X, 10X, 12X and 13X. Group 4XX for the letter X closes circuits 3X, 5X, 10X and 12X. Group 3Y for the letter Y closes circuits 3X, 5X and 11X. Group 4Z for the letter Z closes circuits 1X, 5X, 10X and 14X. Group 2— closes circuits 4X and 11X. Group 4? closes circuits 1X, 6X, 8X, and 11X. Group 3∠ closes circuits 5X, 10X and 14X. Group 8$ closes circuits 1X, 2X, 4X, 7X, 8X, 11X, 13X and 14X. Group 5—3 closes circuits 1X, 6X, 8X, 13X and 14X. Group 6⊤ closes circuits 1X, 7X, 8X, 11X and 13X. Group 6& closes circuits 1X, 3X, 7X, 9X, 12X and 14X. Group 6¢ closes circuits 1X, 2X, 4X, 7X, 8X and 11X. Group 8—8 closes circuits 1X, 2X, 6X, 7X, 8X, 9X, 13X and 14X. Group 1, closes circuits 4X, Group 3—⏋ closes circuits 1X, 6X and 13X. Group 5□ closes circuits 1X, 4X, 6X, 7X and 8X. Group 3⌈ closes circuits 1X, 2X, and 9X. Group 2= closes circuits 1X and 14X. Group 7—9 closes circuits 1X, 2X, 6X, 7X, 8X, 13X and 14X. Group 5m closes circuits 1X, 2X, 4X, 6X and 14X. Group 2⌵ closes circuits 8X and 12X. Group 5—4 closes circuits 1X, 3X, 6X, 7X and 11X. Group 4⌊ closes circuit 2X, 7X, 8X and 14X. Group 6—5 closes circuits 1X, 2X, 7X, 8X, 13X and 14X. Group 3—7 closes circuits 1X, 5X and 10X. Group 2—7 closes circuits 7X and 10X. Group 5—2 closes circuits 1X, 6X, 8X, 10X and 14X. Group 2—1 closes circuits 4X and 11X. Group 7—6 closes circuits 1X, 2X, 7X, 8X, 9X, 13X and 14X. Group 2″ closes circuits 2X and 4X.

The above comprise the entire set of groups of circuits 1X to 14X inclusive closed first by the initial-pulser group-contact relays to the several combination holding and orientating cycle switches, which in each instance produces an initial pulse and an illumination of a character on the right-hand monogram M1 as one faces the sign.

The details of the initial-pulser group-contact relays as the same are employed in practical construction are shown in Fig. 30. The relays themselves are secured in the cabinet to the supporting bars 109 by screws A75 through bracket arms A76. The two relays shown are for the letter U and for the figure 7 respectively, and the contacts are respectively groups 5U and 3—7. Operatively the structure of these relays and contacts is similar to that heretofore given for the alternate relays and contacts, in which an armature A77 for the U relay operates an arm A78 engaging a set of movable contact fingers A79 which are held in suitable spaced position by insulating washers A80. The spring of members A79 against the pusher end A81 of lever A78 holds the same against a spring stop member A82. When the relay is energized the armature A77 is pulled down and the contact faces of spring member A79 are momentarily brought against contact faces on relatively stationary members A84, which sends a pulse of electric current through the circuit wires connected in the contacts of group 5—U (corresponding in operation to that of any of the other group contact relays).

Similarly, for figure 7 relay the armature A85 has secured thereto an arm A86 with a pusher head A87 thereon which is held in engagement with spring stop member A88 by means of movable spring fingers A89 held in separated spaced position by insulating washers A90. It follows that when the figure 7 relay (corresponding to all other figure relays) is energized the arm A86 will momentarily close the contacts 3—7, causing a short pulse of current to pass through the circuits closed by the closing of said contacts as hereinbefore described.

*Combination holding and orientating cycle switches*

The general organization of the cycle switches has been given heretofore. The details of each switch are shown on Figs. 31, 32, 33, 34, and 35, and their specific relation to the lighting circuits of the monograms is given on Fig. 15. One of the 154 cycle switches IXI to 14X11, designated on Fig. 32 as OX (a universal symbol for all of the cycle switches), is supported on transverse supporting bars 117, 118 held in the cabinet 101. As clearly indicated in dotted lines in Fig. 23 there are eleven horizontal rows of such cycle switches connected to eleven horizontal pairs of bars 117, 118, and there are fourteen cycle switches in each of said rows. The main frame of each cycle switch comprises side plates O1, O2, held spaced by front tie-plate construction O3 and rear tie-plate O4 and secured to the cabinet supporting members 117, 118 by being bolted thereto through ears O5, Fig. 31.

In the detail construction of all of the cycle switches OX a pair of plates O6 and O7 of semi-circular contour are bolted together to enclose electrical contact fingers O8, O9 and O10 with intervening spacers of insulating material O11 and O12, as clearly shown in Figs. 34 and 35. It is noted that in one form of cycle switch to be outlined hereafter the three fingers O8, O9, O10, as shown in Fig. 34, are used, while in another form only the two fingers O8 and O10, as shown in Fig. 35, are used. The bar O6 is provided with extension ends O13 and O14, which have slots O15 and O16 adapted to fit over bolts O17 and O18 screwed into the plate O1. Other bolts O19, O20, O21, in conjunction with screws O22, Fig. 33, unite the arcuate members O6 and O7. As clearly shown in Figs. 32 and 33 there are eleven sets of the contact fingers O8, O9 and O10 corresponding to the diagrammatic showing of eleven horizontal rows of cycle switches on Fig. 5. In the example shown there are only ten monograms, and, hence, only ten sets of fourteen neon-tube lighting circuits. But in my system there must be eleven sets of cycle switches, since, as will hereinafter be pointed out, each cycle switch provides for an inactive or non-circuit making position, which I have called its "home" position, as well as for ten active positions completing lighting circuits successively to the lighting neon tube circuit to be closed for each successive monogram. Furthermore, the "home" or inactive position of the cycle switch is found in every one of the one hundred and fifty-four cycle switches IXI to 14X11, from which it follows that all cycle switches which are not in operation closing circuits to light neon elements on the monograms have their circuit closing wipers or contact makers in their "home" positions. The complete cycle of their operation is from "home" position of one of their opposite contact arms to "home" position of the other such contact arms.

The contact makers are mounted on a rotatable shaft O23 around which is a cylinder O24 of insulating material. The contact makers comprise plates having hub portions O25 and oppositely-extended arms O26, O27 each provided with contact toes O28, O29 of the form clearly shown in plan in Fig. 33. The plates O25 and arms O26, O27 are in complementary pairs, as indicated at O30 on Fig. 31, each pair adapted to engage and wipe the contact fingers O8, O9, O10 running in a successive series of ten, as shown in Figs. 32 and 33. Each pair of hub portions O25 of the contact makers is continuously engaged by spring fingers O31 and O32, Fig. 33, and each set of said spring fingers is respectively connected with a line wire O33, O34, O35. Corresponding feed wires O36, O37 and O38 lead from each of the contact fingers O8, O9 and O10, respectively. The line wire O33 carries lighting current, which when the circuit is closed on a finger O10 closes the lighting circuit through the wire O36 to a neon tube element on the sign whereby that element is illuminated. Line wire O38 runs to the continuous pulser and feeds a circuit through to a cycle switch relay, as will hereinafter be described. Line wire O34 and the contact finger O9 and wire O37 are present only in what I have termed the "master" cycle switch, and this operates to complete successively extended circuits to each of the successive cycle switch relays through the "master" switch whereby a current line is established from the initial-pulser group-contact relays successively to each cycle switch relay of the series for lighting a given neon tube element on the monogram, so that the same neon tube element may be brought in from the initial-pulser group-contact relays on any of the eleven cycle switches for that element according to the position of the contact toe O28 or O29 in relation to the contact fingers O9. In this manner the same neon tube element may be lighted simultaneously on any number of the monograms from any two up to all of them.

For giving the shaft O23 a suitable rotation to effect successive wiping contacts of toes O28 or O29 with contact fingers O8, O10 or contact fingers O8, O9 and O10 the following mechanism is provided: A ratchet wheel O39 is fast on shaft O23 and has its teeth engaged by two spring fingers O40 and O41. The spring finger O40 acts as a detent and stop to assure definitely spaced movement of the ratchet wheel O39 and shaft O23. The spring finger O41 is secured at O42 to an arm O43 pivoted at O44 to a frame member on motor magnet O47. Arm O43 has secured to a bent end O45 thereof the armature O46 of the magnet O47. The arm O43 is brought firmly in contact with an adjustable stop O48 by a fairly strong tension spring O49 which is secured to an extended finger O50 on the armature O46 and to an adjustable finger O51 carried by the frame piece and having a screw O52 for effecting adjustment of its tension. As clearly shown in Figs. 31 and 32, a limit stop O53 is held in adjusted position by a bolt O54 so as to hold the pusher finger O41 in firm engagement with the teeth of the ratchet wheel O39.

From the above recited construction it will be apparent that when the motor magnet O47 (typical of all magnets for all the cycle switches) is energized it rocks the arm O43 upon its pivot O44 and in doing so simultaneously extends spring O49 and draws back the pusher finger O41, causing it to be positioned against a preceding tooth of the ratchet wheel O39. Thus the energization of relay O47 does not rotate the shaft O23 or move the wiper fingers O26 and O27. This is accomplished when the current of the pulse coming from the pulser to relay O47 is interrupted. Hence, although the continuous pulser is the cause of operation of the cycle switches, except for the initial operation to take one of the wiper feet O28 or O29 from "home" position to number one active position, the actual work of rotating the shaft O23 and moving the contact fingers is performed by the spring O49 operating the pusher member O41 after current has been interrupted in the relay O47. This is of great importance in my system, as it insures perfect timing of operation.

*The orientating system*

I do not claim that the cycle switch members OX, merely as rotary switches, constitute any part of my invention, as such rotary switches have been used in other relations than in conjunction with my invention. The use made of and the results obtained from these switches in my system are, however, so far as I know, entirely novel. That use is shown in detail in Fig. 3 and in Figs. 11, 12, 13 and 14, which comprise four sheets of drawings to be considered as a unit with the figure designations at respective corners of the drawings placed in juxtaposed position with Fig. 14 above Fig. 12 at the left and Fig. 13 above Fig. 11 at the right. In these four figures there are shown only eight of the fourteen rows, making up the several sets of cycle switches, as shown in diagram in Fig. 5. While there are only ten monograms, and therefore ten neon tubes circuits of any one element, I employ, as shown, eleven cycle switches any one of which at any time may be active for closing lighting circuits of the neon tube element it serves. There must be, however, always available one inactive cycle switch having its wiper toes in its "home" position; hence the necessity for having one more cycle switch than the total number of monograms or monogram elements which any group of cycle switches is adapted to operate.

As heretofore pointed out there are fourteen such sets of cycle switches, one set for each neon element to be lighted on the monogram. The eight shown in the diagram of Figs. 11, 12, 13 and 14 comprise neon elements (in the arrangement shown) for lighting the figure 7 and for lighting the letter U, with the necessary intervening spaces, as represented in successive spaced positions on the ten monograms shown on Fig. 5. Considering that the monograms of Fig. 5 are viewed from the rear, as is true of the monograms of Fig. 15, it will be apparent that viewed from left to right, as shown on Fig. 5, but actually moving from right to left as viewed from the front of the monograms, there will be represented in the position shown "7," "space," "U," "space," "7," "space," "U," "space," "7," "space." And it is the purpose of the composite showing on the four sheets of drawings, Figs. 11, 12, 13 and 14, to illustrate how each one of the cycle switches in any set (shown diagrammatically in vertical rows) may become the initial or starting cycle switch for closing the circuit to light the neon tube element of the first monogram M1 and then successively to close the circuits for lighting said neon tube elements on the successive monograms M2 to M10 inclusive. These drawings also show how in going through that cycle the switch arms of any one of the set of switches, after taking successively active or circuit-closing positions to close circuits to elements of the ten monograms in succession, goes to the number 1 inactive or "home" position. There it will remain until again, by operation of one of the initial-pulser group-contact relays, in conjunction with closing or extending the circuit from the group relay by the master switch as hereinafter described, the same selected cycle switch may be caused to move from the inactive to the active position to repeat the same cycle of circuit-closing operations and return again to the inactive or "home" position.

It will be noted that each of the cycle switches of the bottom horizontal row, Figs. 11 and 12, comprises the three contact wipers adapted to engage fixed contact fingers O8, O9 and O10 of Fig. 34 to close the respective circuits O36, O37 and O38, Fig. 33. But all the other cycle switches except those designated as in the bottom horizontal row embody only wipers to contact fixed contact members O8 and O10, as shown in Fig. 35, and close only the circuits O36 and O38 shown in Fig. 33. These three-contact cycle switches of the bottom row I have designated as "master" cycle switches, to distinguish from the two-contact cycle switches which are referred to merely as cycle switches or in full terminology as "combination holding and orientating cycle switches."

For simplicity of explanation, in Fig. 15 two of the "master" switches are shown in diagram as composed of their three sets of contact wipers disassociated, it being understood that all three wipers of each switch are mounted upon the common shaft O23 in the relation shown in Figs. 31 and 33 specifically for making contacts with the three fixed contact plates O8, O9, O10, as shown in Fig. 34. While the ordinary cycle switches are similarly shown with their contact fingers disassociated for making the dual contacts shown in Fig. 35, it is to be understood that both switch sets are actually on the common shaft O23. As so diagrammatically shown, the switch including the contact fingers O68 and O69 may itself alone be referred to as the "master" switch.

For the purpose of aiding description, the individual members of the respective sets of wiper arm fingers referred to in group, Fig. 33, as O28, and O29 are designated individually in the diagrammatic separated showing, on Fig. 15, as O58 and O59, and O68 and O69, and O78 and O79.

In this set-up one or the other of the fingers O58 and O59 is adapted to engage successive members of the fixed contact plates O8. The fingers O68 and O69 are adapted to engage successive fixed contact plates O9 and the fingers O78 and O79 are adapted to contact successive contact fingers O10. The fingers O58 are caused to move from the inactive or "home" position O8h to the first of the ten contacts O8 by the closing of a circuit thereto by the selected initial-pulser group-contact relays. In this instance the circuit is completed by action of the motor magnet O47 by means of battery wire as 2X or 1—X (Fig. 15) for an element of letter U and figure 7 respectively put in circuit by an initial-pulser group-contact relay, which connects through arm O59 through relay O47 with ground wire O80. This effects the initial pulse which carries the arm from the "home" position O8h to the first of the O8 contacts.

The O8 contacts are also constantly in circuit with one another and in circuit with the wires running from the continuous pulsers. It follows that after the initial pulse is effected by closing of the circuit by an initial-pulser group-contact switch, the continuous pulser will continuously send energizing pulses to the cycle switch relay to cause the same to operate the cycle switch in a step-by-step manner to successively contact each of the O8 contacts, until finally the arm O59 leaves the last or the tenth O8 contact and the arm O58 comes to rest on the O8h contact which is its "home" position, and the cycle switch will have gone through its whole course or cycle of operations.

Meanwhile the second outside set of fingers O79 will have traveled with the fingers O58, making in succession contacts with each of the ten O10 contacts, successively closing the circuits through the selected monogram element of each of the ten monograms M1 and M10. Thus, as shown in Fig. 15, finger O79 at the left is shown on the first of contacts O10, having just been moved there from the "home" position on contact O8h by closing of circuit 1X through an initial-pulser group-contact relay. The finger O79 on the first of the O10 contacts closes lighting circuit 1L1 going to monogram M1. Similarly, Fig. 15, when the finger O79 passes to the second contact O10 it will close the circuit 1L2 to monogram M2. When the finger O79 goes to the third contact O10 it will close the circuit 1L3 to monogram M3, all as shown in Fig. 15. Obviously the succeeding movement of finger O79 to contact the 4th, 5th, 6th, 7th, 8th, 9th and 10th contacts O10 will close successively the lighting circuits 1L4, 1L5, 1L6, 1L7, 1L8, 1L9 and 1L10 to the corresponding element of each of the succeeding monograms M4, M5, M6, M7, M8, M9 and M10. Line wire 150, Fig. 15, feeds alternating current through branches 151, 152 and other similar branch wires (corresponding to wire O33 of Figs. 33, 34 and 35) through each of the entire number of cycle switches. And in the example shown in Fig. 15 the alternating current is conducted from the line wire 150 through the first of contact members O10 to and through wire 1L1 to and through a transformer 1T1 and thence through element wires 1E1 and 1E2 to light the monogram element E1. The transformers are all connected with the common return line wire 160.

As shown in Fig. 5, the several monogram element circuits pass through additional transformers 1T1, 1T2, 1T3, 1T4, 1T5, 1T6, 1T7, 1T8, 1T9, 1T10, 1T11, 1T12, 1T13, 1T14 and for the succeeding monograms transformers are designated 2T1 to 2T14, respectively, 3T1 to 3T14, respectively, through the ten monograms, each transformer so designated connecting with an element E1 to E14 inclusive of the several monograms M1 to M10, through circuit wires 1E1, 1E2, 2E1, 2E2, 3E1, 3E2 for each of the fourteen elements and circuits of the monograms M1 to M10.

The central member on shaft O23 including the contact fingers O68 and O69, and which by itself may be referred to as a "master switch," has an unusual and highly important function in my system. Referring to Fig. 15 and the bottom thereof it will be noted that the wires 2X and 1X there shown and coming from initial-pulser group-contact relays are provided with branches which may be designated, as in Fig. 33, as lead-in wires O34 and which connect with plates O61 in circuit with the arms O68 and O69. When these arms are on the home position O9h, nothing happens, because, as shown, no circuit wire leads from the contact O9h. A circuit wire leads from contact O8h to a group-contact relay as 2X, by which an initial pulse is given causing the relay O47 to operate the cycle switch one step which brings the contact arm O69 upon the first of the contact fingers O9.

This first finger O9, as clearly shown in Fig. 15, is connected by a wire M12 with the relay of the cycle switch 2X2 (as shown in Fig. 15) or any relay of the other cycle switches in the second rank 3X2 to 14X2, according to the element that has been selected. There has thus been effected through a branch wire O34, a plate O61, a wiper O69, a contact finger O9, and a wire M12 an extension of the circuit line from the group contact relays to the relay 2X2 of the No. 2 rank of cycle switches. If then, a pulse is sent through from an initial-pulser group-contact relay immediately after the first actuation of the "master" switch arms O68 and O69, that pulse will have a path through to the selected cycle switch relay of the second rank, which is then caused to operate to move its arms O59 and O79 from the "home" contact position to contact the first of the O8 and O10 contact fingers of a cycle switch in the second rank. A circuit is thereby closed to the first monogram M1 by the contact of finger O79 with the first of the O10 contact plates to light an element in monogram M1. By reason of the operation of the continuous pulser through contact fingers O8 and wiper arm O59, there follows successive operation of the cycle switch and successive lighting of the succeeding monograms from M2 to M10, at which point the contact arms O59 and O79 will leave their contacting position with the last O8 and O10 contact fingers and the contact arms O58 and O78 will be positioned upon the "home" contact plates O8h and O10h.

From the second O9 contacts of the first or master switch row runs a circuit extension wire M13, Fig. 12, which connects or extends the group-contact relay circuit to the third row of cycle switch relays. From the third O9 contact finger runs a wire M14 which extends the group contact circuits to the cycle switch relays of the fourth row. From the fourth contacts O9 run wires M15 which extend the group contact circuit to the fifth row of cycle switches. From the fifth O9 contacts run wires M16, Figs. 12 and 14, which extend the group contact circuits to the sixth row of cycle switch relays. From the sixth O9 contacts run wires M16, Fig. 14, which extend the group contact circuits to the seventh row of cycle switch relays. From the seventh O9 contact fingers run wires M18 which extend the group contact circuits to the eighth row of cycle switch relays. From the eighth O9 contacts run wires M19 which extend the group contact circuits to the ninth row of group contact relays. From the ninth O9 contacts run wires M20 which extend the group contact circuits to the tenth row of cycle switch relays. From the tenth and last O9 contacts run wires M21, which extend the group contact circuits to the eleventh or last row of cycle switch relays.

From the above it will be apparent that no matter where the "master" switch contact fingers O69 (or O68) may be making contact with a contact plate O9, there will always be an extension of the initial-pulser group-contact circuit to one cycle switch motor magnet of any of the vertical ranks wherein selection of its neon tube element has been made and which cycle switch has its contact arms positioned in the inactive or "home" position. In this manner there is always a circuit connected through for the initial-pulse effected by the initial-pulser group-contact relay for that particular rank, which means for the particular element of the monogram selected. And at any time there is only one such cycle switch having an initial pulser circuit extended thereto.

It follows that always, in the operation of the sign, there is one, and only one cycle switch at any time with its wiper arm at the "off" position ready to receive an initial pulse to go through its cycle of closing lighting circuits successively step by step to the same identical neon tube element of each of the ten monograms. That is, there is always one and only one cycle switch relay in any vertical rank (identified with a particular monogram element) having its contact arm in the "home" or "off" position, but ready to receive the initial pulse through a circuit from an initial pulser relay contact where the element of the monogram to be lighted by that cycle switch has been selected by its initial-pulser group-contact relay. It follows that when the initial pulse from the initial pulser has set a cycle switch in operation to move from the "home" position to the "number one" lighting contact position, the "continuous pulser" will effect continuous operation of that cycle switch throughout its cycle to effect successive lighting of the element (associated with that certain cycle switch) called for on each of the monograms making up the sign.

*Operation of the orientating system*

Turning now to Figs. 11, 12, 13 and 14 the full eleven horizontal rows are shown, but only eight vertical ranks, the bottom members of which are respectively designated 1X1, 2X1, 5X1, 6X1, .9X1, 10X1, 13X1 and 14X1. Taking any of these vertical ranks of cycle switches the bottom cycle switches in each case embody the three sets of contact arms O58, O68, and O78, and arms O59, O69 and O79 while rows two to eleven inclusive include only the arms O58, and O78, and O59 and O79, respectively. It will be apparent that the description just given may be readily applied to any of the ranks shown, as for example, the rank beginning with the cycle switch designated as 2X1, wherein the several lighting wire leads 2L1 to 2L10 are shown each connected with each of the respective first to tenth O10 contact plates of each of the cycle switches 2X1 to 2X11 inclusive. Also, these figures show very clearly how each of the "master" switch contact arms O69 or O68 extends the initial-pulser circuits successively, from the first to the tenth O9 contact surfaces, through connected extension wires M12 to M21, to each cycle switch relay of the rank 2X1 to 2X11 respectively and correspondingly to each of the other vertical ranks shown in the four sheets of drawings to wit; 1X1, 5X1, 6X1, 9X1, 10X1, 13X1, 14X1.

The four Figs. 11 to 14 show all the parts of cycle switches in position to reproduce the characters shown in heavy lines on the monograms of Fig. 5. Reading from left to right in the figure, since in the figure it is the back of the monograms that is shown, and reading from right to left as viewed from the front, there appears on the several monograms the following: 7 "space" U "space" 7 "space" U "space" 7 "space." Now referring to Fig. 10, it will be seen that the initial-pulser group-switch designated as 3—7 closes three circuits which are respectively 1X, 5X and 10X. The neon tube elements to be lighted are therefore controlled by vertical ranks of cycle switches beginning with 1X1, with 5X1 and with 10X1. Hence, since all of these elements are controlled by the single initial-pulser group-switch 3—7, the contact arms of the cycle switches which are closing lighting circuits to produce this character, will necessarily occupy the same position for each of ranks beginning with 1X1, 5X1 and 10X1. And since three characters "7" are being simultaneously displayed upon the several monograms of the sign, there will necessarily be three sets of cycle switches having the contact arms of each set in active positions and in the same positions, it being understood of course that the showing of Figs. 11-14 is with all cycle switch elements at rest.

Likewise, the initial-pulser group-switch 5—U closes circuits through to five cycle switches (Fig. 10), namely circuits 2X, 6X, 9X, 13X and 14X. It follows that the lighting of the selected letter "U" upon the monograms will employ the ranks of cycle switches beginning with 2X1, 6X1, 9X1, 13X1 and 14X1 respectively. And since there are two letters "U" displayed on the screen, there must be two sets of cycle switches in each of the above named ranks in horizontal rows; in which all cycle switches of a set have contact arms in the same position.

Referring to Sheets 11 to 14 inclusive and to vertical ranks 1X1, 5X1 and 10X1 it will be noted that the groups of switch arms O59, O69 and O79 for the bottom or "master" switches are shown in full lines making contact with the ninth O8, O9 and O10 contact plates respectively, and in dotted lines are shown making contact with the fifth of the O8, O9, O10 contact plates, and also in dotted lines are shown making contact with the first of the O8, O9 and O10 contact plates. Likewise, the arms O59 and O79 of the cycle switches 1X5, 5X5 and 10X5 are shown in full lines as making contact with the fifth O8 and O10 contact plates, and in dotted lines with making contact with the first of the O8, O9 contact plates. And the cycle switches 1X9, 5X9 and 10X9 are shown with the contact arms O59 and O79 making contact in full lines with the first of the contact plates O8 and O10.

To trace through the operations which so positioned these parts, it may be assumed that the character "7" was selected by the interpreter and brought in by the initial-pulser group-contact switch 3—7, to put the "master" switch contact fingers O59, O69 and O79 upon the first of the contacts O8, O9 and O10, in which position the figure "7" will be lighted on the first monogram 1M. The initial pulser carries the arm of the cycle switches 1X1, 5X1 and 10X1 forward step-by-step, making successive contacts with the O8 and O9 contact plates. The next step to the second O8, O10 contact results in a space, because the interpreter has called for shift from figures to letters, the letter "U" being selected. The next step carries the figure "7" to the third monogram 3M. At the same time the initial-pulser group-contact switch 5U has effected the initial pulse to move the O59, O69, O79 arms of cycle switches 2X1, 6X1, 9X1, 13X1 and 14X1 from the bottom position to the first of the O8, O10 positions and with it the master switch arm to the corresponding O9 position, closing lighting circuits to the elements making up the letter U and causing it to be illuminated on the sign. The next step calling for a figure "7" requires a shift from letters to figures which will produce a space on the sign.

Still considering the ranks of cycle switches 1X1, 5X1 and 10X1 for lighting, the figure 7, the next pulse, will step the contact arms to the fifth O8, O10 positions, illuminating the figure 7 on the fifth monogram M5. And since the interpreter has called for a shift from letters to figures a space will follow on the sign the lighting of the letter U on the second monogram M2 at the same time that the figure 7 is lighted on the fifth monogram M5. At this point the interpreter has called for a shift from letters to figures and has selected the figure 7 to come in on the next pulse. But there are no contact arms on the "home" positions of cycle switches 1X1, 5X1 and 10X1, the contact arms of the above named cycle switches then being on the fourth contact plates O8, O9, O10. At that time the initial-pulser group-contact switch 3—7 has been energized and it finds extensions of the initial-pulser circuits through connectors O34 and O61 (Fig. 15) and wire M15 to the relays of cycle switches 1X5, 5X5 and 10X5, whereby the relays of these cycle switches are energized with an initial pulse which carries the O58, O78 contact arms to the first of the O8, O10 contacts of cycle switches 1X5, 5X5 and 10X5, thereby lighting the figure 7 on the first of the monograms M1 at the same time that the figure 7 is being lighted on the fifth monogram M5, and the letter U is being lighted on the third monogram M3. The arms O58 and O78 of cycle switches 1X5, 5X5 and 10X5 are shown in dotted lines in this first or initial lighting position.

The next five pulses will produce a repetition of what has been described, except that the two figures 7 now on the sign will be simultaneously advanced at the same time that the letter U on the sign is being advanced, with spaces between them. When the master contact arms O59, O69 and O79 reach the eighth O8, O9, O10 contact plates of cycle switches 1X1, 5X1 and 10X1 the interpreter will again have shifted from figures (7) to letters (U) and back to figures (7). Again there are no contact arms O8, O9, O10 in the "home" position of cycle switches 1X1, 5X1 and 10X1. But this time the pulser circuit is extended through connections O34 and O61 (Fig. 15), contact arm O69, the eighth O9 contact plate, and extends circuits M19 to the relays of cycle switches 1X9, 5X9 and 10X9, which relays are energized by the initial pulse from the initial-pulser group-contact switch 3—7 and that initial pulse together with the next pulse of the continuous pulser carries the contact arms O59 and O79 to the first of the O8, O10 contact plates of cycle switches 1X9, 5X9 and 10X9, thereby lighting a third figure 7 upon the first of the monograms M1.

Figure 14:
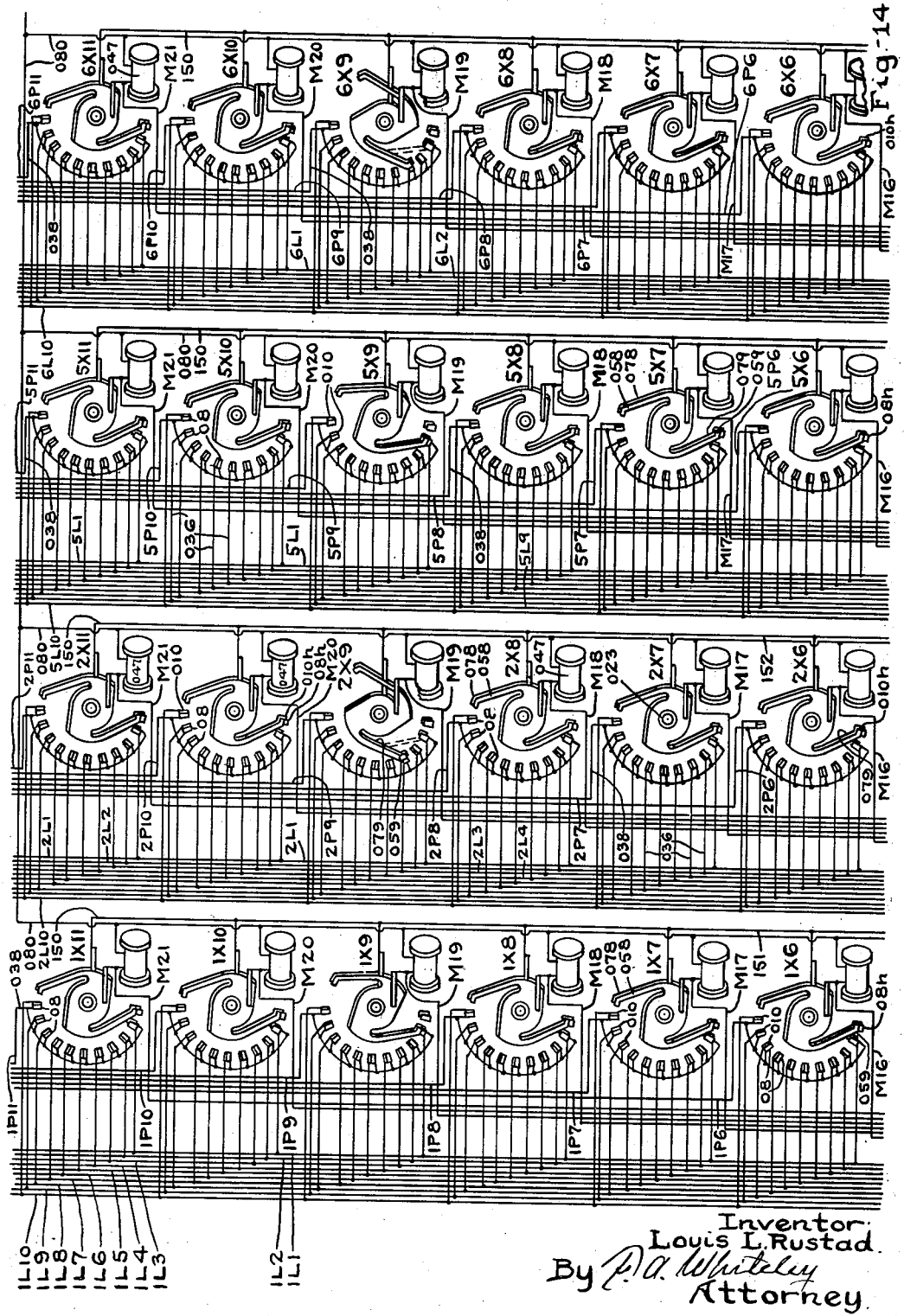

This is the full line positions of the contact arms on Figs. 12 to 14 inclusive, where the fingers of cycle switches 1X1, 5X1 and 10X1 are upon the ninth O9, O10 contact plates lighting figure 7 on the ninth monogram, where the contact fingers O59, O79 of cycle switches 1X5, 5X5 and 10X5 are on the fifth O8 and O10 contact plates lighting the figure 7 on the fifth monogram M7, and where the contact fingers O59, O79 of the cycle switches 1X9, 5X9 and 10X9 are on the first of the O8, O10 contact plates lighting the figure 7 upon the first of the monograms M1. In these positions the numeral 7 is lighted on the monograms M1, M5, and M9, as shown in Fig. 5.

In like manner, as above pointed out, in the positions shown in Figs. 12 to 14 the letter U is brought in. It must be assumed that the initial pulse for lighting up the letter U on the first monogram M1 through cycle switches 2X1, 6X1, 9X1, 13X1 and 14X1 comes two pulses ahead of the initial pulse for lighting the figure 7 on the first of the monograms M1. This being true, as already stated, when the contact arms of relay switches 1X1, 5X1 and 10X1 are in the first dotted-line position lighting the figure 7 on the first monogram M1 the contact fingers O59, O69, O79 of relay switches 2X1, 6X1, 9X1, 13X1 and 14X1 will occupy the first dotted-line positions upon the third contact plates O8, O9, O10 and the letter U will be lighted on the third monogram M3. Continued pulses will produce on M1 monogram a "space" at which time the shift from figures to letters will have taken place and the interpreter will then again select the letter U. Since at this point there are no contact fingers on the "home" position of relay switches 2X1, 6X1, 9X1 and 13X1, and, 14X1, the pulser circuit on the next pulse finds its extension through connections O34, O61, O69, the fourth O8, O10 contact plates and the extension wires M15 to the relays of cycle switches 2X5, 6X5, 9X5, 12X5 and 14X5, whereby that initial pulse energizes the relays of the above-named cycle switches and moves contact arms O59, O79 to the first of the O8, O10 contacts and lights the letter U of the number one monogram M1. The next two pulses will be followed on the sign by a space and then the number 7 on the M1 monogram; and the next two pulses by a space and the letter U on M1 monogram, at which time there will be a letter U on the monograms 1, 5 and 9 and the figure 7 on monograms 3 and 7. The next two pulses will produce on the M1 monogram a space and then a figure 7, at which point the contact arms on the 2X1, 6X1, 13X1 and 14X1 cycle switches will have gone to the "home" position and there will be on the sign the figures and leters shown on Fig. 5, which is represented by the full-line positions of all the contact arms of the operated cycle switches. That is, the figure 7 is lighted on monogram 1M1, 1M5 and 1M9 and the letter U is lighted on monograms M3 and M7.

Figure 3:
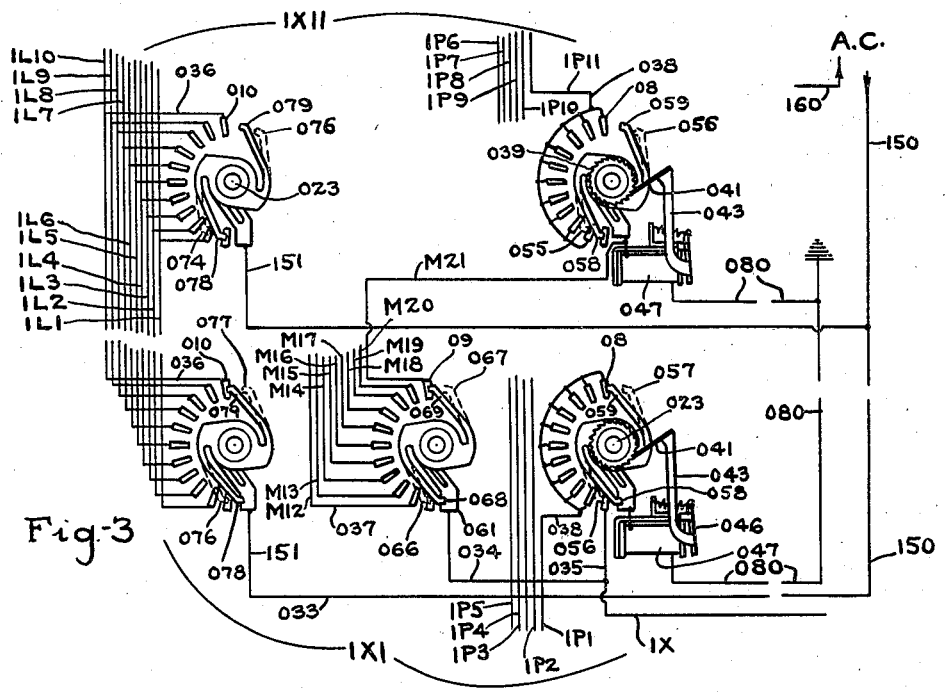
Fig. 3 is a fragmentary view of related cycle switches showing the orientation effected by said switches from a starting position back to what is called a home position.

Fig. 3 shows the relation of parts of any "master" cycle switch (or in effect any other cycle switch) when the arms O59, O69 and O79 have reached the tenth contact plate whereby circuits are closed to the last of the monograms M10. It will be noted that for the master switch the three arms O59, O69 and O79, at the next pulse will leave the tenth set of contact plates O8, O9 and O10 respectively, and will take the dotted-line positions indicated at O57, O67 and O77, and the arms O58, O68 and O78 will go to the "home" positions indicated at O56, O66 and O76, where they are ready to receive an initial pulse from an initial-pulser group-contact relay which has been selected and caused to operate by the interpreter.

The "master" cycle switch shown at the bottom of Fig. 3 may be any of the cycle switches in the first row, as, for example, IX1. The cycle switch at the top, wherein the arms O59, O79 have just left the tenth contact plates O8 and O10 is the cycle switch in the eleventh row as IX11, wherein the full line-positions of arms O59, O79, O58 and O78 show the first two arms off the tenth contact plates and show the latter two arms in contact with the "home" or initial pulsing plate. At this point, with the parts in the position shown, wherein the pulser circuit is extended through branch wire O34, plate O61, arm O69, tenth contact plate O9 and extension wire M21 to the relay of cycle switch IX11, if an initial pulse then comes through it will be carried by this extension to the relay O47 of the cycle switch IX11 and cause initial operation of the cycle switch IX11, bringing the arms O59, O79 to the dotted-line positions indicated at O56, O76 out of contact with any contact plate and the arms O58, O78 to the dotted-line positions indicated by O74 and O55, where the cycle switch IX11 will be caused to start its cycle of operations through the pulsing effect of the continuous pulser. At the same time the master switch will have had its contact arms restored to the initial-pulser "home" position ready to receive another initial pulse and start another cycle. It will be obvious that the above operation will take place in the same manner from any position of arms O59 O69 O79 or O58 O68 O78 of the last switch on any of the successive O8 O9 O10 contact plates to start a cycle of operation for any of the other cycle switches of the first rank IX2 to IX10.

It will be apparent from the above that any desired arrangement of selected characters in any order with or without spaces may be caused to appear successively on the number one monogram M1 and to travel successively from one monogram to another through the entire ten monograms M1 to M10. It will also be apparent that always when the interpreter selectes a character or a letter there will always be a cycle switch for each element of such selected character having its contact arms on the home position and in circuit with the initial pulser circuits from the initial-pulser group-contact switches. And there will be only one such cycle switch available at any time for any one element. This result is effected because of the employment of eleven rows of cycle switches, ten rows for the ten monograms and one row for the home or inoperative position of the contact arms in fourteen vertical ranks, each rank cooperating with a single element of each of the monograms, in combination with the "master" switch contacts which successively extend the pulser circuits to one and one only at one time of the cycle switch relays of each rank.

The rest operation

When the apparatus is operating automatically from a punched set-up on the code tape, there may be occasion when it is desirable to hold the matter illuminated on the sign stationary for a brief period. This is accomplished by means illustrated diagrammatically in the upper right hand portion of Fig. 4.

As shown there, and in Fig. 20, the motor for driving the code tape is indicated at 84. This motor is in a line circuit C51 and C52 controlled by a manual switch C53 of ordinary construction and when the switch C53 is closed it will be apparent that current will be passing through motor 84 continuously so that it will be continuously operated.

The circuit C52 has a branch C54 which goes through the relay 89 thence through a second wire C56 to a Mercoid switch C57 Fig. 4 mounted on a carrier C55 adapted to oscillate on an axial mounting C58. The wire C51 has a branch C59 which goes to an interrupter bar C60, Figs. 4 and 16, overlying the code tape 10 as it is fed from the punching device 11 to the interpreter feed 12. As shown in Fig. 16, the tape is adapted to run freely in looped form underneath the interrupter bar C60, but when it is caused to pull up on the loop and grow tight for any cause, it lifts the bar C60, breaking contact at the point indicated at C61, Fig. 4. From the contact C61 circuit wire C62 leads to the Mercoid switch C57. Also a manually operable switch C63 is adapted to open the circuit going to relay or magnet 89.

As heretofore pointed out when the magnet 89 is energized it holds the arm 90 out of position to engage the stop 91, Fig. 20. When, however, the circuit through the magnet 89 is broken by any of the actions here indicated, the bar 90 falls into position to engage the stop 91 and terminate operation of the interpreter feed even though the motor 84 continues to run.

It will be obvious that this circuit may be broken in any one of four places. First, when the switch C53 is open, at which time of course motor 84 will not be running; second, when the manual switch C63 is open, when the motor will be running; third when contact is broken at C61 by action of tightening the code tape, when the motor will be running; and finally by the action of the Mercoid switch C57, which is a special feature of operation of the sign itself.

Having reference to the showing of the various circuit lines produced by the interpreter it will be noted that the sixth line from the bottom is designated as "Rest." A special punching on the code tape closes this circuit line, which, as shown on Fig. 4, goes through a branch wire C64 to a solenoid C65. The plunger armature C66 of solenoid C65 engages in a notch C67 of the pivoted member C55 supporting Mercoid switch C57 pushing it up so as to swing the switch into position where the circuit between wires C56 and C62 is broken.

This puts the battery circuit C68 in circuit through a branch wire C69 with the common ground wire C70 of the interpreter relays, Fig. 6. When the rocking member C55 is lifted by the solenoid plunger armature C66, a plate C71 thereon is caused to be engaged by a bimetallic arm C72. The plate C71 is in circuit with ground wire C73 and the bimetallic arm C72 is in circuit with the battery wire C68. Contact of C71 and C72 thus closes the battery circuit which passes through a resistance C74 about the bimetallic conducting wire C72. The heat generated by resistance C74 causes the bimetallic arm C72 to straighten and simultaneously to come away from contact with conducting plate C71 and from underneath it, whereby the Mercoid switch C57 falls back to initial position and the circuit is again closed between wires C55 and C62.

By means of an adjusting screw C91 the position of the bar C72 with respect to end of plate C71 may be varied to change the length of time of the "rest" period.

During the period when a pulse from the interpreter circuit through the "rest" line rocks the Mercoid switch C57 to break the circuit and terminate movement of the tape until the resistance C74 moves away the arm C72 again to permit the Mercoid switch to drop into normal position to close the circuit again, the interpreter and continuous pulser will be inoperative because the tape will not be advanced. Therefore, whatever appears on the sign will remain there at "rest" until the circuit is again closed through magnet 89 whereupon the tape will again be given its step-by-step advance and the interpreter and continuous pulser will again be caused to operate.

This rest will be sufficient so that one watching the sign will see some word, slogan, or the like which it is desired to emphasize, held stationary for a brief time.

The electric typewriter

As heretofore pointed out, my system employs in association with the means heretofore described a special dual manual and automatic electric typewriter. This is in many ways a typewriter of standard construction with certain features added to enable the typewriter to perform special functions in connection with my traveling word display device. These special functions, as heretofore stated, are, first, that when the system is working from punchings of a code tape the typewriter will be caused to write on a permanent record characters set up by the code tape and selected by the interpreter; and, second, that the typewriter may be employed in writing out matter to appear on the sign manually and that the typing of the characters will operate instrumentalities for closing circuits to the initial-pulser group-switch relays corresponding to the characters as typed, and further will operate the continuous pulsers.

The electric typewriter apart from the features which I have added is of standard construction and is illustrated in Figs. 36, 37 and 38. A stand K is provided with a top K1, a typewriter keyboard K2 and a bank of keys K3, all of usual construction. Constantly rotated drive roller K4 on a shaft K5 is operated by a motor KM, Fig. 4, indicated in the housing K6, Fig. 37, and controlled by manual switch KM1, Fig. 4. Roller K4 is adapted to be engaged by operating cams K7 whenever a key K3 is depressed. Contact of the cam member K7 with the rotating roller K4 causes a half revolution of K7 which operates a lever system indicated generally as K8, Fig. 37, by which a type bar K9 is swung down to cause proper engagement of a type face K10 with the paper K11 wrapped about and forwarded by platen K12.

The paper is fed in a continuous strip K13 from a box K14 returning over the box to any suitable place of deposit as indicated at K15. The strip of paper K13 is provided with side perforations K16, Fig. 42, which receive the pins K17 caused to protrude at the sides of the platen K12 by the eccentric guide rib K18, as shown in Figs. 40 and 41. The above instrumentalities are or may be of well-known construction and need not be described more in detail.

It will be obvious that if the keys K3 are caused to operate or be depressed by other than manual means, as, for example, by solenoids circuited in the operation of the initial-pulser group-switch relays, the typewriter will be caused to type upon the record sheet K13 in exactly the same manner as if operated manually. Likewise, if the manual operation of the keys is caused to close circuits to the initial-pulser group-switch relays corresponding to the letter of any key which is operated, the energization of the group-switch relays will close the initial-pulser contacts for producing the same character upon the display board. Both of these functions are performed by the electric typewriter in my system.

However, the above-recited two functions cannot be operated simultaneously. When the automatic operation from the code tape through the interpreter takes place the typing keys are merely caused to type the selected characters and cannot themselves be employed for manual selection of such characters. On the other hand, when the manual function of the typewriter is employed it will be obvious that the interpreter feed and punched tape will be inactive, as if out of the system. For this reason I have provided a special switch, which is on the stand K, Fig. 36, and is provided with an operating shaft K20 and handle K21, whereby the switch may be placed in any one of three positions, as clearly illustrated in diagram on Fig. 4.

The switch embodies two parts, K22 for the automatic or code tape operation, and K23 for the manual operation. On the shaft K20 the cam K24 is shown in a central or neutral position, in which the handle K21 is vertical. When the cam is turned in one direction it will close contacts K25 for putting in operation the automatic code tape interpreter control instrumentalities. When the cam K24 is turned in the opposite direction it will close contacts K26 for putting the typewriter manually operated instrumentalities in operation.

When, as shown in Fig. 4, the cam K24 is in its neutral position, both forms of operation and both functions of the electric typewriter as employed in my system are rendered inoperative. Thus, if the code tape were operating to close any one or selected group of circuits C1, C2, C3, C4 and C5, nothing could happen because the common wire C17 for the interpreter relays I—1 to I—10 is connected by a branch wire C18 which goes to ground at C19 through a contact K25 of switch part K22, so that if the switch operating cam K24 is in neutral position that contact is broken and the punchings of the code tape key have no effect upon the interpreter relays or any of the parts connected therewith. Of course, equally, no pulses could go through to the continuous pulser.

When, however, the switch cam K24 (as viewed in Fig. 4) is moved to the right the contacts K25 will be closed and the automatic operation from the code tape may be employed. In this position of the switch-cam K24, the contacts K26 for the manual operation from the keys of the typewriter will be out of engagement and manual operation will be impossible. Likewise, when the switch-cam K24 is turned to the left, as viewed, contacts K26 will be closed and contacts K25 will be open, so that automatic operation from the code tape will be prevented and manual operation from the typewriter keys will be established.

In the descriptions here given it must be assumed that when automatic operation is being described the cam member K24 is in position to close contacts K25 and open contacts K26. And when manual operation is being described the switch cam K24 will have been moved to close contacts K26 and open contacts K25.

*Operation of electric typewriter for recording*

Referring to Figs. 9 and 10 it will be noted that each of the initial-pulser group-contact relays closes a circuit which makes a line wire connection through to a key of the typewriter corresponding to the letter or character to be illuminated upon the display board. In this connection it is to be noted that certain characters which may be produced on the monogram and are set up in the system for automatic illumination of the moving word sign to produce certain types of ornamental effects, have no corresponding characters on the typewriter, and these all are shown as connected to a single circuit wire for producing the hyphen character. This particular circuit wire is designated as 27T. All the other circuit wires are designated as IT, 2T, 3T, starting wtih the letter A to 26T for the letter Z and from 27T for the hyphen through to 42T for the quotation mark, Fig. 10.

There are, as shown in Figs. 4, 6 and 10, certain special operations that must be effected on the typewriter to keep it properly operative. One of these is the familiar "carriage return," which at the same time brings the typewriter carriage into its initial position and rotates the platen to bring a blank line of the paper to receive the type. This action is effected through the seventh from the bottom of the interpreter current lines which goes through when the code tape carries a punching which closes the "carriage return" circuit. This circuit is shown on Fig. 4 as the seventh or top line of the interpreter circuits diagrammatically shown on that figure. Branch S3 of this circuit goes to the carriage return relay S4. This relay closes a contact from the battery line A25 through a wire S5 to the carriage return solenoid S6, Fig. 4, and from there through branch wire S7 and a contact K25 to ground C19. The solenoid S6 operates the standard electric typewriter key K31 for effecting carriage return and advance of the record sheet a step or double-step as the same may be set.

There is of course no initial-pulser group-contact relay making connection with cycle switches for the carriage return, which is effected directly by the carriage return solenoid S6. There is, however, the customary operation of the continuous pulser through the closed line wire P35. Hence, whenever the "carriage return" is operated a space will necessarily appear on the sign.

In like manner the interpreter, as appears in the third line from the bottom of Fig. 6, is adapted when the punchings on the tape call for it to establish a circuit through for "spacing" on the sign as heretofore pointed out, which does not effect a showing on the sign but produces a blank monogram between pairs of lighted monograms and thus a space between words or characters. This is purely negative action so far as the showing of the sign is concerned, the "space" action being only to actuate the continuous pulser but to produce nothing on any of the monograms. In the typewriter, however, it is necessary to have the positive action of the spacing key so that the carriage and platen will be properly moved for the next letter or character to be typed.

This is effected in the same manner as above described for the "carriage return." That is the space circuit has a branch S1 which goes to the space relay S2 which closes a ciruit from the battery wire A25 through a branh wire S8 to a space solenoid S9, Fig. 4, which operates upon the space key K32 of the electric typewriter to cause the operation of spacing on the typewriter, at the same time that the continuous pulses has produced the space effect upon the sign.

Likewise, as shown in Fig. 4, when the normal position of the alternate relay shifts is such as to send current lines through to letters the closing of the circuit L21 through the initial-pulser group-contact relay for the letter U through the interpreter relays to the initial-pulser group-switch relay 5U for the letter U will close a circuit through wire 21T to the solenoid S10 for the letter U, which will operate the U type key K33 of the electric typewriter and cause the letter U to be written upon the record sheet.

In like manner when the figure shift has been operated to send current lines through the alternate relay A12, and the figure 7 is selected to close the circuit F20 to the initial-pulser group-switch relay for the figure 7, a circuit is closed through the circuit wire 38T to the solenoid S11, which operates the typewriter key K34 and causes the figure 7 to be typed on the permanent record sheet K13.

It will be noted that the above defined operations for letter U and figure 7 can only take place when ground shift relay S12, Fig. 4, is in certain positions. As shown, it is in the normal position in which contact from the U relay S10 goes through a wire S13 through closed contact S14, wire S15 and a contact K25 to ground C19, and the operation of solenoid S11 or other figure solenoids can only take place when the figure shift relay S12 has been operated so wire S16 can convey current through the closed contact S17 and thence through wire S15 and a closed contact K25 to ground C19. What is true of the letter U and the figure 7 is, of course, equally true for all other letters and characters which may be selected by the interpreter.

The relay S12 may be called the ground shift. Its mechanical details as constructed are shown in Figs. 48 and 49. The relay S12 is there shown secured within the casing 21, see Fig. 45, being attached to a bracket 201 secured to a wall of the casing. A cover 202 with a handle 203 encloses the relay and its contact parts.

These contact parts embody a spring finger S60 which is normally held positioned to form the contact S14 with finger S61. Finger S60 has its contact portion centrally positioned between spring finger S61 and a third spring finger S62, and when spring finger S60 is pushed outwardly it will form with finger S62 the contact S17. This is effected by means of an arm S63 fast on armature S64 which is pivoted at S65. The arm S63 has thereon a head S66 (shown in dotted lines in Fig. 49) which engages the spring finger S60 so that whenever electric current is sent through relay S12 and the armature S64 is operated, the contact S14 will be broken and the contact S17 will be closed.

As clearly shown, spring finger S61 is in circuit with wire S13, spring finger S60 is in circuit with wire S15, and spring finger S62 is in circuit with wire S16. The battery wire A28 goes to relay S12, and a ground S67 permits current to go through the relay. After the figure shift A24 has been operated the common wire A28 is maintained in circuit with battery A32 until the letter shift operates to break contact A33. Hence the ground shift S12 will remain set to connect through to the typewriter from the figure alternate relays until the letter shift is operated. A branch wire K68 goes to the light K70, Figs. 4 and 36, which carries a ground K69 with the result that as long as the shift is set for the figure alternate relays, the circuit will be closed to the typewriter keys for figures or other characters, and lamp K70 will be lit.

Mechanical details of the above described typewriter receiving apparatus are shown in Fig. 37, wherein the type-key operating solenoids are designated generally as K40. For each of these solenoids the armature shaft K41 has connected therewith a link K42, which may be of wire of any desired material. Each of these links connects with a bell crank arm K43 which in turn is connected by a link K44 with a typewriter key K3. When, therefore, the armature of the solenoid is drawn in the bell crank arms K43 will be rocked, and through links K44 will draw down the keys K3 to which the several solenoids are thus connected.

*The electric typewriter as a sending device*

In my system the electric typewriter has secured to plates K50, K51, Figs. 44, two sets of transverse plates K52 and K53, Fig. 37, to which are secured sets of contacts K54 and K55, as shown in Fig. 44. Contacts K54 are shorter than the contacts K55 and the sets of contacts K54 and K55 are staggered relatively so that the plunger arms K56 and K57 running from the type bars to the contacts K54 and K55 are themselves relatively staggered.

For purposes of description it may be assumed that the two contacts shown in Fig. 37 are respectively to close circuits for the letter U and the Figure 7. Referring to Fig. 4, it will be apparent that ground wire L21 goes from the letter alternate relay A6 to the initial-pulser group-contact relay for the letter U. The current is closed through from U7 current line through the interpreter, which has branches LU7 and FU7, respectively, going to contacts of the alternate letter relay A3 and the alternate figure relay A9. From the key K33 for the letter U goes a wire K80 which joins with the branch LU7 at K81 and carries the pulse through to the circuit wire L21 going to the 5U initial-pulser group-switch relay coil. Similarly, the typewriter key K34 closes circuit through wire K82 to a junction with branch wire FU7 at K83, which closes the circuit through alternate relay contacts A12 and through wire F20 to the coil of figure alternate relay 3—7.

A common sending ground wire K84 for all the typewriter keys goes through a contact K26 to ground C19 when the cam switch K24 has been turned into the position for manual operation of the sign through the typewriter. At the same time the current line will be extended through wire P35 common to all the pulsers to the entire group of continuous pulsers P1 to P11, exemplified in Fig. 4 by continuous pulser relay P1. Thus when typewriter key K33 is depressed the contact K54 will be closed for effecting by the means above described illumination of the letter U upon the first of the monograms M1, and when the key K34 is depressed the contact K55 will be closed for illuminating the Figure 7 upon the first of the monograms M1.

Obviously to go from one or the other of these characters U and 7 it will be necessary to operate the shift keys to close circuits through figure alternate relays and open circuits through letter alternate relays or reverse the operation so as to open the figure alternate relays and close the letter alternate relays. For figures this is effected by means of the figure shift key K35, which closes contact K46 and through wire K37 to the figure shift relay A24, whereby the alternate relay contacts for figures are all closed and the alternate relay contacts for the letters are all opened.

In a similar manner, when it is desired to shift from figures to letters the letter shift key K36, Fig. 4, is depressed, closing contact K47, which closes the circuit through wire K38 to energize the letter shift relay A38 and carry the shift back from letters to figures.

The figure shift key K35, Fig. 43, is associated with a colored light K70 on the typewriter (see also Fig. 4), which shows a selected color, as green, when the apparatus is set to pass current through the figure alternate relays, as heretofore described. In this way the operator at the typewriter board is always informed of what is taking place on the machine, so that when it is necessary to go from a letter to a figure or other character not a letter, or from such character to a letter, the figure shift may be operated, either before or after operation of the spacer, and the current for the indicated character or letter will be passed to its initial-pulser group-switch relay to cause proper illumination of that character or letter on the sign.

Spacing by manual operation is effected by depressing the key K32, thereby closing contact K58, Fig. 4, which carries current by wire K59 to the wire S1 for operating spacer relay S2. Similarly, by depressing key K31 contact K48 is closed, which carries current through wire K49 to the wire S3 for operating the "carriage return" relay S4.

By the above instrumentalities it will be apparent that the typewriter can very simply and efficiently be operated as a sending device in place of automatic sending through a code tape and interpreter. In this operation the typewriter keys take the place of the code tape selections set up by punchings thereon and selected by the interpreter relays. In all other respects the apparatus operates in the same manner when the typewriter is being employed as when the automatic sending is effected by the punchings on the code tape, the interpreter feed and the interpreter.

*Alternate means for closing lighting switches*

In place of the sets of combination holding and orientating cycle switches hereinbefore described for suitably closing groups of lighting circuits to the several monograms in succession I may employ an alternate arrangement which is shown in Figs. 50 to 56 inclusive. In this arrangement the various combinations and appliances for energizing the initial pulser group contact relays, either through the automatic operation of the code tape or by manual operation of the typewriter, function in the same manner as where the combined holding and orientating cycle switches are employed. The initial pulse however does not go to a cycle switch to move it from its home or inactive to an active position but rather actuates a relay which trips a wiper coacting with a series of circuit-closing members for closing circuits to an element of the monogram for lighting the same, the monogram element circuits being in all respects the same as have heretofore been described.

In carrying out this feature of my invention, frame piece B, Fig. 54, is secured, Fig. 53, to supporting ears B1 and B2. These ears are attached to brackets B3 and B4 which in turn are secured to suitable frame pieces B5 and B6 by which the assemblage is supported. Upon the member B and suitably insulated therefrom, as indicated at B7, Fig. 54, is mounted a set of arcuate holding bars B8 and B9, shown for convenience of assemblage as being duplicated by corresponding arcuate holding bars B10 and B11. And while, as stated, for convenience of assemblage I have shown the holding bars and the parts held thereby as duplicated, it will be apparent that a single set of arcuate holding bars may be employed within the purview of my invention with the same effect as if double bars were used. Between the holding bars B8 and B9 (also between bars B10 and B11), and insulated therefrom, are mounted a series of contact fingers B12, Fig. 52, having portions B13 extending radially outwardly from the arcuate supporting pieces B8, B9, and having other portions B14 extending inwardly beyond the inner margins of the arcuate supporting pieces B8, B9 (and likewise B10, B12), Fig. 54. Connected with the extended portions B13 of the contact pieces are the several wires lL1 to lL10 which close the lighting circuits for the element E1 of the successive monograms M1 to M10.

It will be noted that there are shown, Fig. 50, twenty-five of the contact pieces B12. Each of these contact pieces may have a circuit wire going to a selected element of a series of monograms up to twenty-five. On the example shown herein, where but ten monograms are designated, the lighting circuits run from one to ten. It will be obvious, however, that by increasing the number of monograms the lighting circuits going to the given element of successive monograms will be correspondingly increased in number up to twenty-five in the example shown; and that any number of contact pieces B12 and of monogram elements in successive monograms may be employed. However, regardless of the number of the monograms employed and of the number of active contact pieces B12 which may be used, the first of the contact wires designated as lL1 (and which of course might be for any of the neon tube elements making up the monograms E1 to E14 in the example shown, or any other number) will always be connected with the corresponding element of the number one monogram M1 and the contact pieces in order will successively have circuit wire connections with the successive monograms across the sign, designated lL1 to lL10, or any number used.

Secured to the frame pieces B1 and B2 is a bar B15 and supported by the piece B and bar B15 is an axle member B16. Mounted to rotate on the member 16 is a ratchet wheel B17 and its elongated hub B18, Fig. 54. Upon the hub B18 are insulating washer members B19, B20 which embrace and are caused to hold a pair of disks B21 and B22 by nut B' on the threaded end of hub B18. Here again the fact that two such disks are mounted to rotate with ratchet wheel B17 is a matter of convenience, as obviously a single disk, or even a greater number of disks than two, might be so mounted.

Since the disks B21 and B22 are identical though opposite, and carry the same parts operating in the same way, except that each is for closing a different lighting circuit going to a different monogram element, the description which follows will in general be given for but one of said disks and the parts carried thereby. It is to be noted however, that each disk is provided with an annular contact surface B23, Fig. 52, which is engaged by a spring finger B24 or B25, Fig. 54. The finger B24 is connected with the lighting current branch lead-in wire 151 and the spring finger B25 is connected with branch lead-in wire 152. It follows that whatever number of disks B21 (or B22) are employed, there being one for each lighting circuit to the several neon tube monogram elements, a branch lead-in wire such as 151 and 152 will carry current to the disk member from the main circuit wire 150, Fig. 15. In this manner each disk B21 will at all times be in circuit with the main lighting circuit. It will further be noted that the disk B21 lies in the plane of the contact fingers B12, and the portions thereof B14 which extend radially beyond the holding means B9 for the fingers are in line with the disk B21.

Upon the disk B21 (and B22) are mounted a multiplicity of oscillating members B26 each provided with a wiper face B27, as shown in detail in Fig. 51. The members B26 are pivoted at B28 to metallic split posts B29 fast on disk 21, so all members B26 are in electrically conducting circuit with disk 21 and through it with main current branch wires 151, 152, etc. The contact faces B27 are positioned to overlie ends B14 of the contact strips B12 and are urged toward the faces of said strips by a spring B30 which hooks into the shank B31 of the pivoted members B26 at B32, Figs. 51 and 55. The spring B30 may be anchored to the disk B21 in any desired manner. As shown, Fig. 55, the spring wire passage through disk B21 at B33 and is anchored to the underside of disk B21 by a screw B34. Anchored in the same manner and if desired being a continuation of spring member B30 is a spring wire B35 which passes through an enlarged aperture B36 in disk B21, Figs. 51 and 55, and is extended into a loop B37 which takes over the top of rear shank B31, as clearly shown in Figs. 51 and 55. An upstanding end B38 of the spring wire B35 forms a trigger device by which the member can be pushed back to take the loop B37 off from the top of the pivoted member B26 so as to permit the spring B30 to swing it down until the stop B39 engages the face of disc B21, as appears in Fig. 55, in which position the contact faces B27 will be held to wipe the extended portions B14 of contact pieces B12. This will, when such contact is made, close the circuit for lighting current from main current branch wire 151 through disc B21, oscillatable member B26, wiper faces B27 and B14 and contact piece B12 to the lighting circuit wire lL1 going through element E1 of monogram M1.

The disc B21 (or B22, or both together) is given a step-by-step movement by a pawl B40 engageable with ratchet wheel B17, Fig. 50. The pawl B40 is pivoted at B41 to an arm B42 and is held in engagement with the ratchet teeth 17 by means of a spring B43. A stop guide B44 holds the pawl in fixed engagement with the ratchet teeth and a check member B45 prevents backward movement of the pawl.

The arm B42 is fast on an armature of a motor magnet relay B47. A spring B48 is connected at one end to an adjustable arm B49 having a portion B50 engageable with a pin B51 on armature B46. When current to the motor magnet relay B47 from the appropriate initial pulser circuit, it will cause the armature to swing the arm B42 so as to retract the pawl B40 and extend the spring B48. When the circuit is broken, the spring B48 will move the arm B42 and the pawl B40 a step forward to advance the ratchet B17 and move the disc B21 carried thereby a step about the axle. Thus when the continuous pulsers are in operation there will need to be but one pulser circuit for each disc B21 or pair of other number of such discs, and these pulser circuits will continuously give the discs step-by-step forward motion whenever the pulser circuits are closed, either by automatic operation from the code tape through the interpreter or by manual operation from the typewriter. Thus, as long as character selections are being made, or operations such as "space," "carriage return" and the like are carried out, so that appropriate pulser circuits are thereby closed, the continuous step-by-step movement of disk B21, and all other connected disks simultaneously therewith, will be continuously effected. It must be borne in mind that there will be as many disks and as many sets of wiper faces and cooperating contact fingers as there are neon tube elements of the particular monograms employed, and, as before stated, these will be connected up to render active successive corresponding monogram elements for as many monograms as may be employed, twenty-five in the example shown, or any other number which may be desired.

For each disk, such as B21, and the pivoted wiper members B26 carried thereby, there will be an actuating relay B52, Figs. 52 and 53, which is supported by frame pieces B54 on either the frame member B or the frame bar B15, as clearly shown in Fig. 53. The armature B55 of relay B52 is pivoted at B56 and carries an arm B57 having a shape as shown in dotted lines at B58 of Fig. 50. The arm B57 has a portion B59, Figs 50 and 53, which extends substantially radially in reference to the axis of the disk B21. Upon the end of arm portion B59 is an insulated hammer head B60 which after the termination of each rotative step of disk B21 is in radial alinement with the trigger extension B38 of a spring catch B35, B37.

When, therefore, the armature B55 is caused to operate by reason of closing of a circuit effected by an initial pulser group-contact relay, the head B60 will be caused to engage the trigger arm B38 and push the catch loop B37 from the pivoted member B26, whereupon the spring B30 will swing the member B26 on its pivoted support B28 to bring the parts in the position shown at the right of Fig. 54 and in Fig. 56, where the wiper faces B27 will successively contact the inwardly extending wiper faces B14 of the contact strips. This will close a lighting circuit through to the neon tube element of the monograms served by the particular combination switching means of disk B21 (or any other such disks), causing the selected neon tube element to be illuminated. And since the disk B21 is constantly being forwarded step by step by energization of relay B47 through closing of pulser circuits, the wiper face B27 of the released pivoted member B26 will successively engage contact surfaces B14 from the 1L1 position to the 1L10 position, or to any other position according to the number of monograms employed, thus successively lighting the selected neon tube element on each of the monograms of the sign in order.

The circuit to the relays B52 is closed from an initial pulser group contact relay through one of the circuits 1X to 14X, as 1X, which connects back to the battery wire O80, thus closing the circuit through, and effecting the same result so far as rendering the means for closing the lighting circuits operative as is accomplished in closing the initial pulser circuits of the cycle switches.

Obviously, since the disks B21, B22 and the like are continuously given step by step rotative movement it will be necessary to re-set the members B26 so as to withdraw the wiper faces B27 from position to engage again contact faces B14. This is accomplished by depressing the back portion B31 of the member B26. When this is done it will be noted from Figs. 54 and 56 that when the pivoted members B26 are in wiper engaging position the loop B37 has a face portion B61 thereof engaging the end B62 of the rear portion B31 of arm B36. When, therefore, the rear portion B31 of the arm is depressed the spring of wire B35 will cause the loop B37 to snap back over the top of end B62 of the member B26 so that again it will be latched in inoperative position, where it will remain until an electric pulse to the relay B52 causes it to move the hammer head B60 to again push trigger arm B38 to release the member B26 so that wiper face B27 will go again into wiping position. This depression of the rear portion B32 of pivoted member B26 is effected by means of a bar B65, which has a curved portion B63, Fig. 53, engageable in depressions B64 of rear portions B31 of member B26, Fig. 51. It follows that as the disc B21 is rotated the depressions B64 of rear portion B31 of pivoted members B26 will be engaged by the curved portion B63 of arms B65, with the result that the part B31 will be depressed so that the loop B37 on spring B35 will snap over the end B62 again to latch the pivoted member B26 in its inactive non-wiping position.

It follows also that, since there will be as many sets of composite switching elements as there are neon tube elements making up the illuminating monogram, any number of elements which may be selected by the interpreter and called for by the initial-pulser group-contact relay may be simultaneously put into closed lighting circuits for the selected numbers of the 1L1 to 14L1 positions. In each case having once initiated lighting of the selected groups of elements on the number one monogram they will, by the means described, be successively lighted on all the other monograms from number one M1 to number ten M10, as shown, or up to number twenty-five or any other number of monograms actually employed. It is also true that the same element or group of elements may be put in lighting circuit successively with each pulse or with any successive pulse so that switch-closing means is always available for any element or any group of elements.

If it be assumed that with the switching means above described a larger number of successive operations might be called for than would be practical to arrange on a single contact holding member such as the arcuate bars B8 and B9, it is practical and within the scope of my invention to arrange a plurality of such arcuate bars and successive contact pieces with a final circuit closing device which would result in initiating the first of the operations to be successively carried through, on a second set of such contact members, and from there to a third set, or to any number of sets desired. In such an arrangement it will be understood of course that the mechanical operating features of each of these sets will be the same as those herein described, it only being necessary to provide means for shifting the operations to another set having the same means for wiper contacts as the first set. That is, the first of the wiper arms B26 of a succeeding set of such arms would be tripped by the last operation of the first set whereby the same set of operations can be extended to other monograms through a second set, and if desired through any number of sets.

The operation and advantages of my invention in its various details have been very fully given in the specification herein presented. It may be stated here that a primary advantage resides in the fact that means is provided for effecting successive identical operations in timed relation, and in varying the operations and the results obtained therefrom to set up innumerable combined operations each of which in turn is caused to be successively operated.

Specifically the operations disclosed consist of furnishing lighting current to a neon tube element or a group of neon tube elements related together in such manner that the illumination of such element or group of elements produces an illuminated character such as a letter or figure, and thereafter to repeat the illumination of said character in successive timed relation and so related to the illumination of other characters as to result in the production of words which appear to travel across a display device. In accomplishing this result it is of the highest advantage that the characters, letters or figures or other characters, are displayed with the sharply defined lines of neon tube illumination, avoiding the flickering and trailing effects which come from the attempts to outline characters or figures by means of separate spot lights such as come from electric bulbs.

Other important advantages of my invention outlined in detail in the specification herein given reside in the combination of means for effecting the results desired which are simplified to a point of reducing cost, making convenient and easily accessible the various parts for installation, repair and correction of troubles, and in general providing an efficient and relatively inexpensive combination of instrumentalities for producing the complex series of operations necessary in displaying moving word material.

I claim:

1. In a device for illuminating letters and figures, group contact switches for letters and group contact switches for figures, means rendered operative by the group contact switches for causing selective operation of letters and of figures, two groups of alternate relays, one for passing current to the letter group-contact relays, and the other for passing current to the figure-group contact relays, means for closing a circuit through one or the other of the alternate relays for a selected letter or figure, and means whereby the circuit current may be shifted to pass through the figure alternate relays when a figure is called for following a letter, and through the letter alternate relays when a letter is called for following a figure.

2. In a device for illuminating letters and figures, means for causing such illumination, means for rendering such causing means operative, including two groups of alternate relays, one for letters and one for figures, said alternate relays connected to operate groups of contacts, the contacts of the letter alternate relays being normally held closed, shifting means for closing the figure alternate relay contacts and opening the letter alternate relay contacts when a shift from letters to figures is called for, said means including a battery circuit maintained constantly operative until shift from figures to letters is called for, and means for breaking said closed circuit when shift from figures to letters is called for.

3. In a device for displaying illuminated letters and figures in successive positions, a series of monograms each consisting of a plurality of distinct illuminable elements, means for selecting a letter or figure to be illuminated, means for causing illumination of an element or group of elements successively on said monograms to display a selected letter or figure, means including a code tape for automatically selecting the element or group of elements to be illuminated and for rendering operative the means for causing such successive illumination, an electric typewriter adapted manually to cause operation of the illuminating means, and means rendered operative by the illumination-causing means when the automatic selecting means is in operation for causing the typewriter to make an automatic record of letters and figures illuminated as they are selected and illuminated.

4. In a traveling sign system the combination of a plurality of successively arranged monograms each comprising a plurality of similar electrically operated monogram elements similarly arranged in each monogram, a plurality of sets of cycle switches, each set having conjointly a switch for each monogram element and each switch having a home position and a plurality of other positions, each successive position of which corresponds to a successive corresponding monogram, selecting means for selecting successively the sets of cycle switches and for moving selected switches of the selected set out of their home positions, means for thereafter moving the switch members which have been so moved from their home positions to their succeeding positions in response to the successive set selections, and circuit means connecting the successive switch positions of each cycle switch to successive corresponding elements in each of the successive monograms, whereby when a switch is initially moved from home position by the selecting means when its corresponding set is selected it will successively render operative its corresponding element in the successive monograms and thereby produce a traveling monogram character.

5. In a traveling sign system the combination of a plurality of successively arranged monograms each comprising a plurality of similar electrically operated monogram elements similarly arranged in each monogram, a plurality of sets of cycle switches, each set having conjointly a switch for each monogram element and each switch having a home position and a plurality of other positions. a punched code tape and means to give it a step-by-step movement, the punchings of said tape and circuit-closing means associated therewith comprising means for selecting successively the sets of cycle switches and for moving selected switches of the selected set out of their home positions, means for thereafter moving the switch members which have been so moved from their home positions to their succeeding positions in response to the selections set by the code tape and the selecting means associated therewith, and circuit means connecting the successive switch positions of each cycle switch to successive corresponding elements in each of the successive monograms, whereby when a switch is initially moved from home position by the selecting means when its corresponding set is selected it will successively render operative its corresponding element in the successive monograms and thereby produce a traveling monogram character.

6. In a traveling sign system the combination of a plurality of successively arranged monograms each comprising a plurality of similar electrically operated monogram elements similarly arranged in each monogram, an independent lighting circuit for lighting each element of each of the monograms, a plurality of sets of cycle switches, each set having conjointly a switch for closing the lighting circuit of each monogram element, means to effect initial operation of a cycle switch or a selected group of cycle switches to effect lighting of an element or group of elements of the first of the monograms, means for thereafter moving the switch member or members which has or have been initially selected and moved to their selected positions in response to the successive set selections, whereby when a switch is initially moved by the selecting means when its corresponding set is selected it will successively close the lighting circuits for lighting its corresponding elements in the successive monograms and thereby will produce a traveling monogram character.

7. In a traveling sign system the combination of a plurality of successively arranged monograms each comprised of a plurality of similar electrically operated monogram elements similarly arranged in each monogram, a lighting circuit for each of said elements, a cycle switch for each of the elements having means for closing successively the lighting circuits of an element in each of the monograms for successively lighting said element, means for selecting an element or set of elements to be illuminated, means rendered operative by said selecting means to cause initial operation of the cycle switch or cycle switches for closing circuits to said selected element or elements, means rendered operative by said initial operation for moving the cycle switch to cause closing of circuits successively of the same element or group of elements on each of the monograms, a series of said cycle switches for closing circuits to light the same element, and means operating in association with said cycle switch to make successive connection with the initial position of each first-named cycle switch of each series, whereby if the same element is again selected while the initially operated cycle switch is in operation a circuit line connection is made with the initial position of one and only one other cycle switch for again effecting the lighting of that element.

8. In a traveling sign system, the combination of a plurality of successively arranged monograms each comprised of a plurality of similar electrically operated monogram elements similarly arranged in each monogram, a lighting circuit for each of said elements, means to select an element or group of elements to form when illuminated a displayed character, means for causing the circuits of the selected element or elements to be closed successively on all of the monograms, including a rotary switch carrying a multiplicity of normally inactive contact members arranged in a complete circle, continuously operating means to give said switch member a continuous step-by-step motion, a plurality of fixed contact surfaces each in a circuit for lighting an element successively in said monograms, means to position any of said inactive faces to engage said fixed contact faces, and means to restore the same to inoperative position.

9. In a traveling sign system, the combination of a plurality of successively arranged monograms each comprised of a plurality of similar electrically operated monogram elements similarly arranged in each monogram, continuously operating means for selecting an element or group of elements to be illuminated for outlining a character, a lighting circuit for each of said elements, a cycle switch for each of the elements having means for closing successively the lighting circuits of an element in each of the monograms for successively lighting said element, means for causing said successive operation of the cycle switch including means for producing regular pulses of electric current, and means whereby operation of said selecting means causes operation of the pulser means.

10. In a device of the class described, a code tape provided with successive sets of transverse punchings indicating selected operations, a multiplicity of electric circuits corresponding in number to the maximum number of different punching combinations in said transverse rows, means for closing the circuits corresponding to the punching combination of the tape, a pulser device for continuously producing successive uniform pulses of electrical current operated by the closing of any circuit through punchings in the tape, multiple contacts and a relay for operating same having its coil in each of said circuits, and operable to shift contacts when any circuit or group of circuits is closed by the operation of the code tape, means whereby said shifting of contacts closes a single selected circuit line for causing a single pulse of electric current corresponding to the operation indicated by the code tape punchings and in addition to the pulse of the continuous pulser, and means rendered operative by said selected pulse to effect the operation indicated by the punching on the code tape.

11. In a traveling sign system, the combination of a plurality of successively arranged monograms each comprised of a plurality of similar electrically operated monogram elements similarly arranged in each monogram, a series of electric circuits running through the several elements of each monogram and means for closing the same to light successively on each monogram, an element or series of elements to outline any one of two groups of characters, said characters being respectively letters and figures, means for selecting the circuits for illuminating letters or figures including an interpreter transmitter embodying a multiplicity of circuits and of contacts therefor, relays controlling said contacts, circuits running through the punchings in the tape to said relays, means for causing illumination of the letters and figures selected including a group switch for each formed with sets of contacts and relays for operating the same and a circuit for each of said relays running through the interpreter transmitter, whereby the closing of a circuit or group of circuits effected by punchings in the code tape will shift a selected group of contacts in the group switches to close a circuit or group of circuits for causing operation of the illuminating means to illuminate the selected group.

LOUIS L. RUSTAD.